(12) United States Patent
Horelik et al.

(10) Patent No.: US 11,641,575 B2
(45) Date of Patent: May 2, 2023

(54) EMERGENCY DATA MANAGEMENT AND ACCESS SYSTEM

(71) Applicant: RapidSOS, Inc., New York, NY (US)

(72) Inventors: Nicholas Edward Horelik, Long Island, NY (US); BingJun Perry Sy, Flushing, NY (US); Henry Katz, Brookline, MA (US); Vinson Koo, Brooklyn, NY (US); Lucas Richard Eager Leavitt, Forest Hills, NY (US); Michael John Martin, Long Island City, NY (US)

(73) Assignee: RAPIDSOS, INC., NY, NY (US)

( * ) Notice: Subject to any disclaimer, the term of this patent is extended or adjusted under 35 U.S.C. 154(b) by 0 days.

(21) Appl. No.: 17/545,244

(22) Filed: Dec. 8, 2021

(65) Prior Publication Data
US 2022/0103995 A1    Mar. 31, 2022

Related U.S. Application Data

(63) Continuation of application No. 16/384,600, filed on Apr. 15, 2019, now abandoned.
(Continued)

(51) Int. Cl.
| H04W 4/90 | (2018.01) |
| H04W 68/00 | (2009.01) |
| H04W 4/021 | (2018.01) |

(52) U.S. Cl.
CPC ............ H04W 4/90 (2018.02); H04W 4/021 (2013.01); H04W 68/005 (2013.01)

(58) Field of Classification Search
CPC ..... H04W 4/90; H04W 4/021; H04W 68/005; H04W 4/18
See application file for complete search history.

(56) References Cited

U.S. PATENT DOCUMENTS

| 5,379,337 A | 1/1995 | Castillo et al. |
| 5,479,482 A | 12/1995 | Grimes |
| (Continued) | | |

FOREIGN PATENT DOCUMENTS

| CA | 2662606 A1 | 10/2009 |
| CA | 2697986 A1 | 9/2010 |
| (Continued) | | |

OTHER PUBLICATIONS

Abel et al. Semantics + Filtering + Search = Twitcident exploring information in social web streams. HT'12—Proceedings of 23rd ACM Conference on Hypertext and Social Media (10 pgs) (Jun. 25-28, 2012).
(Continued)

*Primary Examiner* — Umair Ahsan
(74) *Attorney, Agent, or Firm* — Cygan Law Offices PC

(57) ABSTRACT

Described herein are systems, servers, devices, methods, and media for providing and managing access to emergency data. In some embodiments, a method for managing access to emergency data for emergency service providers by an emergency management system includes the steps of: determining a first set of data categories to be made accessible to an emergency service provider (ESP), wherein the first set of data categories is selected from a second set of data categories; detecting an emergency alert from an electronic device; associating the ESP with the emergency alert; gathering emergency data associated with the emergency alert available for the first set of data categories; and securely transmitting, to the ESP, the emergency data associated with the emergency alert available for the first set of data categories.

17 Claims, 28 Drawing Sheets

Related U.S. Application Data

(60) Provisional application No. 62/658,357, filed on Apr. 16, 2018.

(56) References Cited

U.S. PATENT DOCUMENTS

| | | |
|---|---|---|
| 5,563,931 A | 10/1996 | Bishop et al. |
| 5,596,625 A | 1/1997 | LeBlanc |
| 5,710,803 A | 1/1998 | Kowal et al. |
| 5,742,666 A | 4/1998 | Alpert |
| 6,014,555 A | 1/2000 | Tendler |
| 6,133,853 A | 10/2000 | Obradovich et al. |
| 6,249,674 B1 | 6/2001 | Verdonk |
| 6,252,943 B1 | 6/2001 | Johnson et al. |
| 6,256,489 B1 | 7/2001 | Lichter et al. |
| 6,292,687 B1 | 9/2001 | Lowell et al. |
| 6,363,138 B1 | 3/2002 | Aprile |
| 6,459,782 B1 | 10/2002 | Bedrosian et al. |
| 6,477,362 B1 | 11/2002 | Raith et al. |
| 6,502,030 B2 | 12/2002 | Hilleary |
| 6,510,315 B1 | 1/2003 | Arnson |
| 6,556,816 B1 | 4/2003 | Gafrick et al. |
| 6,571,092 B2 | 5/2003 | Faccin et al. |
| 6,574,323 B1 | 6/2003 | Manuel et al. |
| 6,587,545 B1 | 7/2003 | Antonucci et al. |
| 6,594,666 B1 | 7/2003 | Biswas et al. |
| 6,600,812 B1 | 7/2003 | Gentillin et al. |
| 6,628,933 B1 | 9/2003 | Humes |
| 6,680,998 B1 | 1/2004 | Bell et al. |
| 6,707,421 B1 | 3/2004 | Drury et al. |
| 6,731,610 B2 | 5/2004 | Sajikawa et al. |
| 6,993,118 B2 | 1/2006 | Antonucci et al. |
| 7,054,611 B2 | 5/2006 | Eisner et al. |
| 7,058,385 B2 | 6/2006 | Lauper |
| 7,177,400 B2 | 2/2007 | Eisner et al. |
| 7,224,773 B2 | 5/2007 | Croak et al. |
| 7,271,704 B2 | 9/2007 | McSheffrey et al. |
| 7,277,705 B2 | 10/2007 | Casaccia et al. |
| 7,313,402 B1 | 12/2007 | Rahman |
| 7,324,801 B2 | 1/2008 | Droste et al. |
| 7,349,706 B2 | 3/2008 | Kim et al. |
| 7,409,044 B2 | 8/2008 | Leduc |
| 7,436,938 B2 | 10/2008 | Savaglio et al. |
| 7,437,143 B1 | 10/2008 | Williams |
| 7,469,138 B2 | 12/2008 | Dayar et al. |
| 7,483,519 B2 | 1/2009 | Binning |
| 7,519,351 B2 | 4/2009 | Malone et al. |
| 7,519,372 B2 | 4/2009 | MacDonald et al. |
| 7,548,158 B2 | 6/2009 | Titus et al. |
| 7,565,131 B2 | 7/2009 | Rollender |
| 7,646,854 B2 | 1/2010 | Anderson |
| 7,676,215 B2 | 3/2010 | Chin et al. |
| 7,684,782 B2 | 3/2010 | Ashley, Jr. et al. |
| 7,848,733 B2 | 12/2010 | Bull et al. |
| 7,937,067 B2 | 5/2011 | Maier et al. |
| 7,949,326 B2 | 5/2011 | Gallagher et al. |
| 8,009,810 B2 | 8/2011 | Seidberg et al. |
| 8,041,335 B2 | 10/2011 | Khetawat et al. |
| 8,041,341 B1 | 10/2011 | Malackowski et al. |
| 8,045,954 B2 | 10/2011 | Barbeau et al. |
| 8,068,881 B2 | 11/2011 | Schrager |
| 8,102,972 B2 | 1/2012 | Poremba |
| 8,126,424 B2 | 2/2012 | Piett et al. |
| 8,150,367 B1 | 4/2012 | Malladi et al. |
| 8,165,560 B2 | 4/2012 | Stenquist |
| 8,165,562 B2 | 4/2012 | Piett et al. |
| 8,185,087 B2 | 5/2012 | Mitchell, Jr. et al. |
| 8,195,121 B2 | 6/2012 | Dunn et al. |
| 8,219,135 B2 | 7/2012 | De Amorim et al. |
| 8,244,205 B2 | 8/2012 | Wu |
| 8,249,546 B1 | 8/2012 | Shah et al. |
| 8,249,547 B1 | 8/2012 | Fellner |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,396,970 B2 | 3/2013 | Black et al. |
| 8,401,565 B2 | 3/2013 | Sandberg et al. |
| 8,417,090 B2 | 4/2013 | Fleming |
| 8,417,212 B2 | 4/2013 | Cepuran et al. |
| 8,442,481 B2 | 5/2013 | Maier et al. |
| 8,442,482 B2 | 5/2013 | Maier et al. |
| 8,472,973 B2 | 6/2013 | Lin et al. |
| 8,484,352 B2 | 7/2013 | Piett et al. |
| 8,489,062 B2 | 7/2013 | Ray et al. |
| 8,509,729 B2 | 8/2013 | Shaw |
| 8,516,122 B2 | 8/2013 | Piett et al. |
| 8,538,370 B2 | 9/2013 | Ray et al. |
| 8,538,468 B2 | 9/2013 | Daly |
| 8,594,015 B2 | 11/2013 | Dunn et al. |
| 8,606,218 B2 | 12/2013 | Ray et al. |
| 8,625,578 B2 | 1/2014 | Roy et al. |
| 8,626,112 B2 | 1/2014 | Ray et al. |
| 8,630,609 B2 | 1/2014 | Ray et al. |
| 8,644,301 B2 | 2/2014 | Tamhankar et al. |
| 8,682,279 B2 | 3/2014 | Rudolf et al. |
| 8,682,281 B2 | 3/2014 | Dunn et al. |
| 8,682,286 B2 | 3/2014 | Dickinson et al. |
| 8,712,366 B2 | 4/2014 | Greene et al. |
| 8,747,336 B2 | 6/2014 | Tran |
| 8,751,265 B2 | 6/2014 | Piett et al. |
| 8,755,767 B2 | 6/2014 | Maier et al. |
| 8,760,290 B2 | 6/2014 | Piett et al. |
| 8,811,935 B2 | 8/2014 | Faccin et al. |
| 8,825,687 B2 | 9/2014 | Marceau et al. |
| 8,848,877 B2 | 9/2014 | Seidberg et al. |
| 8,866,606 B1 | 10/2014 | Will et al. |
| 8,868,028 B1 | 10/2014 | Kaltsukis |
| 8,880,021 B2 | 11/2014 | Hawkins |
| 8,890,685 B1 | 11/2014 | Sookman et al. |
| 8,903,355 B2 | 12/2014 | Biage et al. |
| 8,918,075 B2 | 12/2014 | Maier et al. |
| 8,948,732 B1 | 2/2015 | Negahban et al. |
| 8,971,839 B2 | 3/2015 | Hong |
| 8,984,143 B2 | 3/2015 | Serra et al. |
| 9,008,078 B2 | 4/2015 | Kamdar et al. |
| 9,014,657 B2 | 4/2015 | Rohde et al. |
| 9,019,870 B2 | 4/2015 | Khan et al. |
| 9,071,643 B2 | 6/2015 | Saito et al. |
| 9,077,676 B2 | 7/2015 | Price et al. |
| 9,078,092 B2 | 7/2015 | Piett et al. |
| 9,094,816 B2 | 7/2015 | Maier et al. |
| 9,167,379 B1 | 10/2015 | Hamilton et al. |
| 9,244,922 B2 | 1/2016 | Marceau et al. |
| 9,258,680 B2 | 2/2016 | Drucker |
| 9,277,389 B2 | 3/2016 | Saito et al. |
| 9,351,142 B2 | 5/2016 | Basore et al. |
| 9,369,847 B2 | 6/2016 | Borghei |
| 9,384,491 B1 | 7/2016 | Briggs et al. |
| 9,402,159 B1 | 7/2016 | Self et al. |
| 9,408,051 B2 | 8/2016 | Finney et al. |
| 9,420,099 B1 | 8/2016 | Krishnan et al. |
| 9,503,876 B2 | 11/2016 | Saito et al. |
| 9,544,750 B1 | 1/2017 | Self et al. |
| 9,591,467 B2 | 3/2017 | Piett et al. |
| 9,635,534 B2 | 4/2017 | Maier et al. |
| 9,659,484 B1 | 5/2017 | Mehta et al. |
| 9,693,213 B2 | 6/2017 | Self et al. |
| 9,734,721 B2 | 8/2017 | Stenneth et al. |
| 9,736,670 B2 | 8/2017 | Mehta et al. |
| 9,756,169 B2 | 9/2017 | Mehta et al. |
| 9,794,755 B1 | 10/2017 | South et al. |
| 9,805,430 B2 | 10/2017 | Miasnik et al. |
| 9,838,858 B2 | 12/2017 | Anand et al. |
| 9,924,043 B2 | 3/2018 | Mehta et al. |
| 9,942,739 B2 | 4/2018 | Bozik et al. |
| 9,986,404 B2 | 5/2018 | Mehta et al. |
| 9,992,655 B2 | 6/2018 | Anand et al. |
| 9,998,507 B2 | 6/2018 | Mehta et al. |
| 10,002,375 B1 | 6/2018 | Scythes et al. |
| 10,136,294 B2 | 11/2018 | Mehta et al. |
| 10,140,482 B2 | 11/2018 | Mehta et al. |
| 10,142,213 B1 | 11/2018 | Hart et al. |
| 10,142,469 B2 | 11/2018 | Klaban |
| 10,165,431 B2 | 12/2018 | Bozik et al. |

(56) References Cited

U.S. PATENT DOCUMENTS

| | | |
|---|---|---|
| 10,375,558 B2 | 8/2019 | Katz et al. |
| 10,419,915 B2 | 9/2019 | Mehta et al. |
| 10,425,799 B2 | 9/2019 | Anand et al. |
| 10,447,865 B2 | 10/2019 | Mehta et al. |
| 10,498,894 B1 | 12/2019 | Mongrain |
| 10,524,106 B1 | 12/2019 | Skertich et al. |
| 10,582,343 B1 | 3/2020 | Patton et al. |
| 10,657,799 B2 | 5/2020 | Mehta et al. |
| 10,701,541 B2 | 6/2020 | Mehta et al. |
| 10,701,542 B2 | 6/2020 | Martin et al. |
| 10,805,786 B2 | 10/2020 | Pellegrini et al. |
| 10,820,181 B2 | 10/2020 | Horelik et al. |
| 10,861,320 B2 | 12/2020 | Martin et al. |
| 10,911,926 B2 | 2/2021 | Pellegrini et al. |
| 10,922,776 B2 | 2/2021 | Kumar et al. |
| 11,146,680 B2 | 10/2021 | Leavitt et al. |
| 11,153,742 B1 | 10/2021 | Ekl et al. |
| 11,197,145 B2 | 12/2021 | Martin et al. |
| 11,218,584 B2 | 1/2022 | Martin et al. |
| 11,330,664 B1 | 5/2022 | Martin et al. |
| 11,445,349 B2 | 9/2022 | Mehta et al. |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang et al. |
| 2002/0120698 A1 | 8/2002 | Tamargo |
| 2003/0069035 A1 | 4/2003 | Shurvinton |
| 2003/0109245 A1 | 6/2003 | McCalmont et al. |
| 2004/0166828 A1 | 8/2004 | Yosioka |
| 2004/0203572 A1 | 10/2004 | Aerrabotu et al. |
| 2004/0229620 A1 | 11/2004 | Zhao et al. |
| 2004/0266390 A1 | 12/2004 | Faucher et al. |
| 2005/0085215 A1 | 4/2005 | Kokko et al. |
| 2005/0104745 A1 | 5/2005 | Bachelder et al. |
| 2005/0151642 A1 | 7/2005 | Tupler et al. |
| 2005/0190892 A1 | 9/2005 | Dawson et al. |
| 2005/0192746 A1 | 9/2005 | King et al. |
| 2005/0220277 A1 | 10/2005 | Blalock et al. |
| 2006/0085275 A1 | 4/2006 | Stokes et al. |
| 2006/0109960 A1 | 5/2006 | D'Evelyn et al. |
| 2006/0154642 A1 | 7/2006 | Scannell, Jr. |
| 2006/0217105 A1 | 9/2006 | Kumar et al. |
| 2006/0234726 A1 | 10/2006 | Ashley, Jr. et al. |
| 2006/0293024 A1 | 12/2006 | Benco et al. |
| 2007/0003024 A1 | 1/2007 | Olivier et al. |
| 2007/0030144 A1 | 2/2007 | Titus et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0081646 A1 | 4/2008 | Morin et al. |
| 2008/0166990 A1 | 7/2008 | Toiv |
| 2008/0194238 A1 | 8/2008 | Kwon |
| 2008/0253535 A1 | 10/2008 | Sherry et al. |
| 2008/0274721 A1 | 11/2008 | Stagnetto |
| 2008/0294058 A1 | 11/2008 | Shklarski |
| 2008/0309486 A1 | 12/2008 | McKenna et al. |
| 2009/0094602 A1 | 4/2009 | Ziskind et al. |
| 2009/0134982 A1 | 5/2009 | Robertson et al. |
| 2009/0186596 A1 | 7/2009 | Kaltsukis |
| 2009/0214000 A1 | 8/2009 | Patel et al. |
| 2009/0257345 A1 | 10/2009 | King |
| 2009/0322513 A1 | 12/2009 | Hwang et al. |
| 2010/0002846 A1 | 1/2010 | Ray et al. |
| 2010/0003946 A1 | 1/2010 | Ray et al. |
| 2010/0003964 A1 | 1/2010 | Khare et al. |
| 2010/0093305 A1 | 4/2010 | Reich et al. |
| 2010/0156626 A1 | 6/2010 | Story |
| 2010/0159976 A1 | 6/2010 | Marocchi et al. |
| 2010/0161727 A1 | 6/2010 | Shaffer et al. |
| 2010/0166153 A1 | 7/2010 | Guleria et al. |
| 2010/0190468 A1 | 7/2010 | Scott et al. |
| 2010/0202368 A1 | 8/2010 | Hans |
| 2010/0238018 A1 | 9/2010 | Kelly |
| 2010/0261448 A1 | 10/2010 | Peters |
| 2010/0262668 A1* | 10/2010 | Piett .................. H04W 4/90 709/219 |
| 2011/0009086 A1 | 1/2011 | Poremba et al. |
| 2011/0029600 A1 | 2/2011 | Theimer |
| 2011/0051658 A1 | 3/2011 | Jin et al. |
| 2011/0071880 A1 | 3/2011 | Spector |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2012/0002792 A1 | 1/2012 | Chang |
| 2012/0028599 A1 | 2/2012 | Hatton et al. |
| 2012/0029970 A1 | 2/2012 | Stiles et al. |
| 2012/0040636 A1 | 2/2012 | Kazmi |
| 2012/0066139 A1 | 3/2012 | Guzman et al. |
| 2012/0092161 A1 | 4/2012 | West |
| 2012/0144019 A1 | 6/2012 | Zhu |
| 2012/0202428 A1 | 8/2012 | Mirbaha et al. |
| 2012/0210325 A1 | 8/2012 | De Lind Van Wijngaarden et al. |
| 2012/0218102 A1 | 8/2012 | Bivens et al. |
| 2012/0256745 A1 | 10/2012 | Piett et al. |
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0309341 A1 | 12/2012 | Ward |
| 2012/0320912 A1 | 12/2012 | Estrada et al. |
| 2013/0005295 A1 | 1/2013 | Park et al. |
| 2013/0030825 A1 | 1/2013 | Bagwandeen et al. |
| 2013/0065569 A1 | 3/2013 | Leipzig et al. |
| 2013/0072144 A1 | 3/2013 | Berger et al. |
| 2013/0084824 A1 | 4/2013 | Hursey |
| 2013/0102351 A1 | 4/2013 | Mo |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0185368 A1 | 7/2013 | Nordstrom et al. |
| 2013/0203373 A1 | 8/2013 | Edge |
| 2013/0203376 A1 | 8/2013 | Maier et al. |
| 2013/0222133 A1 | 8/2013 | Schultz et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0309994 A1 | 11/2013 | Hellwig et al. |
| 2013/0331055 A1 | 12/2013 | McKown et al. |
| 2013/0331058 A1 | 12/2013 | Harvey |
| 2014/0045450 A1 | 2/2014 | Ballantyne et al. |
| 2014/0051379 A1 | 2/2014 | Ganesh et al. |
| 2014/0057590 A1 | 2/2014 | Romero |
| 2014/0086108 A1 | 3/2014 | Dunn et al. |
| 2014/0086145 A1 | 3/2014 | Ramkumar et al. |
| 2014/0087680 A1 | 3/2014 | Luukkala et al. |
| 2014/0087780 A1 | 3/2014 | Abhyanker et al. |
| 2014/0113606 A1 | 4/2014 | Morken et al. |
| 2014/0126356 A1 | 5/2014 | Lee et al. |
| 2014/0142979 A1 | 5/2014 | Mitsunaga |
| 2014/0148117 A1 | 5/2014 | Basore et al. |
| 2014/0148120 A1 | 5/2014 | Buck |
| 2014/0155017 A1 | 6/2014 | Fan et al. |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0248848 A1 | 9/2014 | Mufti et al. |
| 2014/0253326 A1 | 9/2014 | Cho et al. |
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2014/0368601 A1 | 12/2014 | Decharms |
| 2014/0370839 A1 | 12/2014 | Hatton |
| 2015/0029836 A1 | 1/2015 | Hans et al. |

(56) References Cited

U.S. PATENT DOCUMENTS

| | | |
|---|---|---|
| 2015/0038109 A1 | 2/2015 | Salahshour |
| 2015/0055453 A1 | 2/2015 | Chaki et al. |
| 2015/0081209 A1 | 3/2015 | Yeh et al. |
| 2015/0081927 A1 | 3/2015 | Xu et al. |
| 2015/0085997 A1 | 3/2015 | Biage et al. |
| 2015/0099481 A1 | 4/2015 | Maitre et al. |
| 2015/0109125 A1 | 4/2015 | Kaib et al. |
| 2015/0111524 A1 | 4/2015 | South |
| 2015/0112883 A1 | 4/2015 | Orduna et al. |
| 2015/0137972 A1 | 5/2015 | Nepo et al. |
| 2015/0140936 A1 | 5/2015 | Sachs et al. |
| 2015/0147995 A1 | 5/2015 | Bontu et al. |
| 2015/0172897 A1 | 6/2015 | Mariathasan et al. |
| 2015/0181401 A1 | 6/2015 | Dhandu et al. |
| 2015/0201316 A1 | 7/2015 | Khatibi et al. |
| 2015/0289121 A1 | 10/2015 | Lesage et al. |
| 2015/0289122 A1 | 10/2015 | Friesen |
| 2015/0296351 A1 | 10/2015 | Tham et al. |
| 2015/0304827 A1 | 10/2015 | Price et al. |
| 2015/0317392 A1 | 11/2015 | Fernandez |
| 2015/0350262 A1 | 12/2015 | Rainisto et al. |
| 2015/0350836 A1 | 12/2015 | Smith |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0057595 A1 | 2/2016 | Ahmed et al. |
| 2016/0065748 A1 | 3/2016 | Li et al. |
| 2016/0173689 A1 | 6/2016 | Klaban |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0337831 A1 | 11/2016 | Piett et al. |
| 2016/0345171 A1 | 11/2016 | Kulkarni et al. |
| 2016/0353266 A1 | 12/2016 | Winkler et al. |
| 2016/0363931 A1 | 12/2016 | Yang et al. |
| 2017/0004427 A1 | 1/2017 | Bruchal et al. |
| 2017/0012815 A1 | 1/2017 | Nekrestyanov et al. |
| 2017/0046216 A1 | 2/2017 | Stenneth et al. |
| 2017/0099579 A1 | 4/2017 | Ryan et al. |
| 2017/0108862 A1 | 4/2017 | Mikkelsen |
| 2017/0124670 A1 | 5/2017 | Becker et al. |
| 2017/0140637 A1 | 5/2017 | Thurlow et al. |
| 2017/0142568 A1 | 5/2017 | Saito et al. |
| 2017/0142570 A1 | 5/2017 | Self et al. |
| 2017/0150335 A1 | 5/2017 | Self et al. |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0188218 A1 | 6/2017 | Corley et al. |
| 2017/0208543 A1 | 7/2017 | Zhang et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0287085 A1 | 10/2017 | Smith et al. |
| 2017/0310827 A1 | 10/2017 | Mehta et al. |
| 2017/0316698 A1 | 11/2017 | Stenneth et al. |
| 2017/0323209 A1 | 11/2017 | Rinzler et al. |
| 2017/0325056 A1* | 11/2017 | Mehta ............... H04W 4/024 |
| 2017/0331954 A1 | 11/2017 | Kotnis et al. |
| 2017/0359712 A1 | 12/2017 | Meredith et al. |
| 2017/0374538 A1 | 12/2017 | Gellens et al. |
| 2018/0020091 A1 | 1/2018 | Self et al. |
| 2018/0020329 A1 | 1/2018 | Smith |
| 2018/0039737 A1 | 2/2018 | Dempers et al. |
| 2018/0077282 A1 | 3/2018 | Herron et al. |
| 2018/0077553 A1 | 3/2018 | Gideon, III |
| 2018/0150928 A1 | 5/2018 | Dejewski et al. |
| 2018/0160267 A1 | 6/2018 | Immendorf et al. |
| 2018/0176271 A1 | 6/2018 | Laurent |
| 2018/0262544 A1 | 9/2018 | Mehta et al. |
| 2018/0352408 A1 | 12/2018 | Baer et al. |
| 2019/0020993 A1 | 1/2019 | Nguyen |
| 2019/0130719 A1 | 5/2019 | D'Amico |
| 2019/0149661 A1 | 5/2019 | Klaban |
| 2019/0166244 A1 | 5/2019 | Ravichandran |
| 2019/0166480 A1 | 5/2019 | Rauner |
| 2019/0174288 A1 | 6/2019 | Bozik et al. |
| 2019/0174289 A1 | 6/2019 | Martin et al. |
| 2019/0230476 A1 | 7/2019 | Qi et al. |
| 2019/0246260 A1 | 8/2019 | Edge et al. |
| 2019/0261145 A1 | 8/2019 | South et al. |
| 2019/0306664 A1 | 10/2019 | Mehta et al. |
| 2019/0320310 A1 | 10/2019 | Horelik et al. |
| 2019/0335310 A1 | 10/2019 | Anand et al. |
| 2019/0342526 A1 | 11/2019 | Drako et al. |
| 2020/0100084 A1 | 3/2020 | Martin et al. |
| 2020/0126174 A1 | 4/2020 | Halse et al. |
| 2020/0135005 A1 | 4/2020 | Katz et al. |
| 2020/0221279 A1 | 7/2020 | Mehta et al. |
| 2020/0258374 A1 | 8/2020 | Mehta et al. |
| 2021/0006961 A1 | 1/2021 | King-Berkman et al. |
| 2021/0037368 A1 | 2/2021 | Leavitt et al. |
| 2021/0110686 A1 | 4/2021 | Slavin et al. |
| 2021/0127228 A1 | 4/2021 | Baarman et al. |
| 2021/0266722 A1 | 8/2021 | Pellegrini et al. |
| 2021/0289334 A1 | 9/2021 | Martin et al. |
| 2022/0030109 A1 | 1/2022 | Leavitt et al. |
| 2022/0201458 A1 | 6/2022 | Leavitt et al. |
| 2022/0210272 A1 | 6/2022 | Horelik et al. |
| 2022/0322061 A1 | 10/2022 | King-Berkman et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CA | 2697986 C | 5/2018 |
| CN | 104487976 A | 4/2015 |
| CN | 104539776 A | 4/2015 |
| CN | 106021508 A | 10/2016 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | WO-0022593 A1 | 4/2000 |
| WO | WO-0165763 A2 | 9/2001 |
| WO | WO-0167419 A2 | 9/2001 |
| WO | WO-2004057853 A2 | 7/2004 |
| WO | WO-2007109599 A2 | 12/2007 |
| WO | WO-2012129561 A1 | 9/2012 |
| WO | WO-2014025563 A1 | 2/2014 |
| WO | WO-2014063121 A1 | 4/2014 |
| WO | WO-2014074420 A1 | 5/2014 |
| WO | WO-2014176646 A1 | 11/2014 |
| WO | WO-2015127867 A1 | 9/2015 |
| WO | WO-2015196155 A1 | 12/2015 |
| WO | WO-2016044540 A1 | 3/2016 |
| WO | WO-2017079354 A1 | 5/2017 |
| WO | WO-2017083571 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |

(56) References Cited

FOREIGN PATENT DOCUMENTS

| WO | WO-2019113129 A1 | 6/2019 |
|---|---|---|
| WO | WO-2020172612 A1 | 8/2020 |
| WO | WO-2020205033 A1 | 10/2020 |

OTHER PUBLICATIONS

Chowdhury et al. Tweet4act: Using incident-specific profiles for classifying crisis-related messages. Proceedings of the 10th International ISCRAM Conference (pp. 834-839) (2013).
Homeland Security Science and Technology. Using Social Media for Enhanced Situational Awareness and Decision Support. Virtual Social Medial Working Group and DHS First Responders Group. (44 pgs.) (Jun. 2014).
Marcus et al. TwitInfo: Aggregating and Visualizing Microblogs for Event Exploration. ACM CHI Conference 2011 May 7-12, 2011, (10 pgs).
Meier. MatchApp: Next Generation Disaster Response App? iRevolution (12 pgs.) (Feb. 27, 2013).
National Emergency Number Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (May 8, 2012).
PCT/US2017/029465 International Search Report and Written Opinion dated Aug. 9, 2017.
PCT/US2018/063935 International Search Report and Written Opinion dated Mar. 22, 2019.
PCT/US2019/027538 International Search Report and Written Opinion dated Aug. 2, 2019.
PCT/US2019/036403 International Search Report and Written Opinion dated Oct. 4, 2019.
PCT/US2020/013176 International Search Report and Written Opinion dated May 8, 2020.
Song. Next Generation Emergency Call System with Enhanced Indoor Positioning, Columbia University. Thesis [online] [retrieved Apr. 20, 2020 from <url:https://scholar.google.co.kr/citations/?user=h_4uUqAAAAAJ&hl=ko (156 pgs) (2014) </url:. < a > .
U.S. Appl. No. 16/209,892 Office Action dated Feb. 8, 2019.
U.S. Appl. No. 16/271,634 Office Action dated Dec. 16, 2019.
U.S. Appl. No. 16/271,634 Office Action dated Jun. 13, 2019.
U.S. Appl. No. 16/384,600 Office Action dated Apr. 2, 2020.
U.S. Appl. No. 16/384,600 Office Action dated Jun. 9, 2021.
U.S. Appl. No. 16/384,600 Office Action dated Oct. 2, 2020.
U.S. Appl. No. 16/421,355 Office Action dated May 12, 2021.
U.S. Appl. No. 16/436,810 Office Action dated Aug. 9, 2019.
U.S. Appl. No. 16/436,810 Office Action dated Dec. 17, 2019.
U.S. Appl. No. 16/537,377 Office Action dated Apr. 16, 2021.
U.S. Appl. No. 16/537,377 Office Action dated Dec. 27, 2021.
U.S. Appl. No. 16/539,946 Office Action dated Oct. 6, 2021.
U.S. Appl. No. 16/684,366 Office Action dated Dec. 23, 2020.
U.S. Appl. No. 16/684,366 Office Action dated Oct. 5, 2021.
U.S. Appl. No. 16/740,207 Office Action dated Aug. 17, 2020.
U.S. Appl. No. 16/740,207 Office Action dated Mar. 11, 2020.
U.S. Appl. No. 16/834,914 Office Action dated Dec. 2, 2020.
U.S. Appl. No. 16/936,856 Office Action dated Aug. 16, 2021.
U.S. Appl. No. 16/936,856 Office Action dated Aug. 5, 2021.
U.S. Appl. No. 17/065,337 Office Action dated Nov. 8, 2021.
U.S. Appl. No. 17/115,098 Office Action dated Mar. 9, 2021.
U.S. Appl. No. 17/143,819 Office Action dated Dec. 6, 2021.
Botega et al. Saw-Oriented User Interfaces for Emergency Dispatch Systems. Computer Vision—Eccv 2020 : 16th European Conference, Glasgow, UK, Aug. 23-28, 2020 : Proceedings; Part of the Lecture Notes in Computer Science (Jul. 21, 2015).
U.S. Appl. No. 15/976,600 Office Action dated Jan. 28, 2022.
U.S. Appl. No. 16/684,366 Office Action dated Jul. 1, 2022.
U.S. Appl. No. 17/143,819 Office Action dated May 26, 2022.
Co-pending U.S. Appl. No. 17/932,993, inventors Pellegrini; William et al., filed Sep. 16, 2022.
U.S. Appl. No. 16/539,946 Office Action dated Jul. 28, 2022.
U.S. Appl. No. 17/065,337 Office Action dated Aug. 12, 2022.
U.S. Appl. No. 17/448,610 Office Action dated Oct. 5, 2022.
U.S. Appl. No. 17/479,471 Ex Parte Quayle dated Oct. 14, 2022.
U.S. Appl. No. 17/566,859 Office Action dated Mar. 18, 2022.

* cited by examiner

EMERGENCY DATA MANAGEMENT AND ACCESS SYSTEM

CROSS-REFERENCE

The present application claims priority to, and is a Continuation of, co-pending U.S. patent application Ser. No. 16/384,600, filed Apr. 15, 2019, entitled "EMERGENCY DATA MANAGEMENT AND ACCESS SYSTEM," which further claims priority to U.S. Provisional Pat. App. No. 62/658,357, filed Apr. 16, 2018, entitled "EMERGENCY DATA MANAGEMENT AND ACCESS SYSTEM," both of which are assigned to the same assignee as the present application, and both of which are hereby incorporated by reference herein in their entirety.

BACKGROUND

A person in an emergency may request help using a mobile communication device such as a cell phone to dial a designated emergency number like 9-1-1 or a direct access phone number for a local emergency service provider (e.g., an emergency dispatch center). This emergency call is assigned to one or more first responders by the emergency service provider. To dispatch emergency personnel to aid the person in the emergency, the emergency service provider must determine the location of the emergency. However, these communications are typically limited to audio calls with narrow functionality because most emergency service providers that receive emergency calls currently lack the capacity for more sophisticated communications. Accordingly, emergency service providers are typically limited to verbally receiving emergency locations from the person in the emergency during the emergency call. Unfortunately, there are a great many instances in which a person in an emergency does not know or is otherwise incapable of articulating their location. With technological advances, the amount and types of data, which may provide situational awareness about emergencies, has expanded considerably. Therefore, there is a need for managing access to data for emergency response.

SUMMARY OF THE INVENTION

One advantage provided by the systems, servers, devices, methods, and media of the instant application is the ability to gather and deliver device-based hybrid locations (hereinafter, "enhanced locations") and additional data that may be pertinent to emergency situations to emergency service providers (ESPs; e.g., public safety answering points, fire departments, police departments, paramedics, police officers, etc.). In some embodiments, an emergency management system (EMS) includes a clearinghouse (also referred to as an "Emergency Clearinghouse") that functions to receive enhanced locations and additional data from various sources and at various times before, during, or after emergency situations and distribute enhanced locations and additional data to ESPs to aid the ESPs in responding to live emergency situations. In some embodiments, the enhanced locations and additional data are delivered by the EMS to the ESP at a public safety answering point (PSAP). In some embodiments, the enhanced locations and additional data are displayed within a preexisting ESP system, such as an Automatic Location Identification (ALI) display. In some embodiments, the enhanced locations and additional data are displayed through a window (also referred to as an "Enhanced Data Window") within a desktop application installed at the ESP.

Another advantage provided by the systems, servers, devices, methods, and media of the instant application is the ability to allow ESP administrators to control the types of data delivered from the Emergency Clearinghouse and received by an ESP. In some embodiments, the EMS includes an emergency data management portal (hereinafter, "management portal") that receives a selection of one or more ESPs and a selection of one or more types of data to be delivered to the one or more ESPs during an emergency. In some embodiments, at the management portal, an ESP administrator selects one or more ESPs from a plurality of ESPs under the ESP administrator's authority. In some embodiments, at the management portal, an ESP administrator defines one or more roles within an individual ESP and selects one or more types of data to be delivered from the Emergency Clearinghouse to the one or more roles within the individual ESP. In some embodiments, the management portal is further used to upgrade an ESP without requiring the installation of new or additional hardware or software. For example, as new types of data become available to or provided by the Emergency Clearinghouse, an ESP administrator can access the management portal to select the new types of data to be delivered to the ESPs under the ESP administrator's authority.

Another advantage provided by the systems, servers, devices, methods, and media of the instant application is the ability to access an emergency response application provided to authorize emergency service providers (ESPs) for receiving and displaying emergency data, such as enhanced locations, and accessing a management portal to manage or customize roles within an ESP. In some embodiments, the emergency response application functions to verify emergency service providers, generate emergency data requests, and display emergency data received from the Emergency Clearinghouse, as described below. In some embodiments, the emergency response application includes a management portal, as described below. In some embodiments, the emergency response application provides a graphical user interface to a computing device that is accessible by members of emergency service providers. In some embodiments, the emergency response application integrates with one or more preexisting ESP systems to provide a seamless and comprehensive emergency data delivery system.

Another advantage provided by the systems, servers, devices, methods, and media of the instant application is the ability to dynamically visualize emergency data (e.g., enhanced locations and additional data) to further aid ESPs in responding to emergency situations. ESP personnel, such as a call taker at a PSAP, are often required to make quick decisions in high pressure situations. While access to additional data may help ESP personnel make better informed decisions, sifting through additional information may take additional time. Therefore, it is useful to display additional information to ESPs in advantageous ways. In some embodiments, a dynamic visualization is applied to emergency data at an enhanced data window at an ESP. In some embodiments, the dynamic visualization emphasizes different elements of emergency data at different times during an emergency. In some embodiments, the dynamic visualization is applied to the emergency data by highlighting, bolding, enlarging, underlining, moving, or coloring the emergency data. In some embodiments, the dynamic visualization is customizable through settings in the corresponding role defined by the ESP administrator. In some embodiments, the dynamic visualization is customizable by a user such as the ESP personnel who utilizes the emergency data when responding to emergency calls.

In various embodiments, described herein are systems, servers, devices, methods, and media for providing and managing access to emergency data. In one aspect, disclosed herein is a method for managing access to emergency data for emergency service providers by an emergency management system, the method comprising: a) determining a first set of data fields to be made accessible to an emergency service provider (ESP), wherein the first set of data fields is selected from a second set of data fields; b) detecting an emergency alert from an electronic device; c) associating the ESP with the emergency alert; d) gathering emergency data associated with the emergency alert available for the first set of data fields; and e) securely transmitting, to the ESP, the emergency data associated with the emergency alert available for the first set of data fields. In some embodiments, the method further comprises receiving an emergency data request from the ESP; and securely transmitting the emergency data associated with the emergency alert to the ESP in response to receiving the emergency data request. In some embodiments, the emergency data request comprises credentials associated with the ESP; and determining the first set of data fields to be made accessible to the ESP further comprises verifying the credentials associated with the ESP. In some embodiments, gathering emergency data further comprises obtaining ingestion data from one or more electronic devices associated with a user of the electronic device, wherein: the ingestion data comprises location data, user data, or sensor data; the ingestion data is marked with data sources; and the emergency data securely transmitted to the ESP is restricted to a particular data source. In some embodiments, the method further comprises: at a management portal: receiving selection of the ESP by an administrator of the ESP; displaying the second set of data fields; and receiving selection of the first set of data fields from the second set of data fields, wherein the first set of data fields is a subset of the second set of data fields. In some embodiments, the ESP is selected from a plurality of ESPs by the administrator of the ESP. In some embodiments, the method further comprises: at a management portal: receiving credentials from the administrator of the ESP; validating the credentials from the administrator of the ESP; and providing access to the management portal to the administrator of the ESP in response to validating the credentials from the administrator of the ESP. In some embodiments, the management portal is a web application. In some embodiments, the method further comprises: at a management portal: receiving definition of a role for the ESP; displaying the second set of data fields; and receiving selection of the first set of data fields to be accessible for the role from the second set of data fields, wherein the first set of data fields is a subset of the second set of data fields. In some embodiments, the method further comprises providing a data display to the ESP; receiving credentials from the ESP; identifying, based on the credentials, the ESP as having the role; and displaying the emergency data securely transmitted to the ESP through the data display. In some embodiments, the management portal is distinct from the data display wherein the emergency data associated with the emergency alert is displayed. In some embodiments, the ESP is associated with the emergency alert using a phone number associated with the electronic device. In some embodiments, the method further comprises displaying the emergency data transmitted to the ESP through a data display. In some embodiments, the method further comprises applying a dynamic visualization to the emergency data associated with the emergency alert displayed through the data display. In some embodiments, applying the dynamic visualization further comprises displaying the data fields included in the first set of data fields sequentially in separate groups. In some embodiments, the data fields included in the first set of data fields are displayed sequentially according to a predetermined timing schedule. In some embodiments, applying the dynamic visualization further comprises emphasizing a data field. In some embodiments, emphasizing a data field further comprises highlighting, bolding, enlarging, underlining, moving, or coloring the data field. In some embodiments, the dynamic visualization is applied in response to user input at the ESP. In some embodiments, the dynamic visualization is applied in response to contextual cues detected during an emergency session associated with the emergency alert. In some embodiments, the method further comprises determining a data source for the emergency data associated with the emergency alert available for the first set of categories; and transmitting, to the ESP, only the emergency data associated with the emergency alert available for the first set of data fields received from the data source. In some embodiments, the method further comprises receiving an emergency data request from the ESP, wherein the emergency data request comprises credentials associated with the ESP and provided to the ESP by a software vendor. In some embodiments, determining the first set of data fields to be made accessible to the ESP further comprises verifying the credentials associated with the ESP. In some embodiments, transmitting the emergency data associated with the emergency alert to the ESP further comprises transmitting the emergency data associated with the emergency alert through a network provided by the software vendor. In some embodiments, the method further comprises displaying the emergency data associated with the emergency alert through a data display, wherein the data display is accessed through a desktop application provided by the software vendor. In some embodiments, the emergency data request from the ESP is generated by the ESP in response to the ESP receiving the emergency alert. In some embodiments, the emergency data request from the ESP is generated in response to user input at the ESP. In some embodiments, the data display is a web page accessed through a desktop application. In some embodiments, the data display is selected from a tab within the desktop application. In some embodiments, the data display is selected from a tool button within the desktop application. In some embodiments, the method further comprises updating the data display when new emergency data associated with the emergency alert available for the first set of data fields is received by the emergency management system. In some embodiments, the emergency data associated with the emergency alert is received from the electronic device. In some embodiments, the emergency data associated with the emergency alert is generated by the electronic device. In some embodiments, the emergency data associated with the emergency alert is generated by a second electronic device communicatively coupled to the electronic device. In some embodiments, the emergency data associated with the emergency alert is generated by a second electronic device associated with a user of the electronic device. In some embodiments, the second electronic device is a vehicle, wearable, or IoT device. In some embodiments, the emergency data associated with the emergency alert is generated by a mobile application installed on the electronic device. In some embodiments, the first set of data fields comprises one or more of photo, name, address, date of birth, phone number, gender, height, weight, ethnicity, languages spoken, occupation, email, notes, emergency contacts, allergies, blood type, disabilities, existing conditions, and medications. In some embodiments, the first set of data fields comprises one or more of caller phone number, probable civic address, probable civic address likelihood, last location update time, latitude and longitude, uncertainty radius, confidence, and altitude. In some embodiments, the first set of data fields comprises an audio or video feed. In some embodiments, the audio or video feed is received from an IoT device associated with a user of the electronic device. In some embodiments, the audio or video feed is received from an IoT device communicatively coupled to the electronic device. In some embodiments, the audio or video feed is received from the electronic device. In some embodiments, the emergency alert is an emergency call made from a mobile phone. In some embodiments, the method further comprises securely transmitting the emergency data associated with the emergency alert to an electronic device associated with an emergency responder. In some embodiments, the method further comprises displaying the emergency data associated with the emergency alert on the electronic device associated with the emergency responder. In some embodiments, the emergency alert comprises one of: an emergency wireless call, an emergency landline call, a text call, and an emergency call back. In some embodiments, the data source is a mobile application installed on the electronic device. In some embodiments, the data source is a second electronic device communicatively coupled to the electronic device. In some embodiments, the data source is a second electronic device associated with a user of the electronic device. In some embodiments, the second electronic device is a vehicle, wearable, or IoT device.

In another aspect, disclosed herein is a method for managing access to emergency data for emergency service providers by an emergency management system, the method comprising: a) detecting an emergency alert from an electronic device; b) gathering emergency data associated with the emergency alert; c) identifying an emergency service provider (ESP) associated with the emergency alert; d) determining a set of data fields selected to be made accessible to the ESP; and e) transmitting, to the ESP, the emergency data associated with the associated with the emergency alert available for the set of data fields.

In another aspect, disclosed herein is a method for managing access to emergency data for emergency service providers by an emergency management system, the method comprising: a) at a management portal: i) receiving selection of an emergency service provider (ESP) by an administrator of the ESP; ii) displaying a first set of data fields; and iii) receiving selection by the administrator of the ESP of a second set of data fields to be made accessible to the ESP from the first set of data fields, wherein the second set of data fields is a subset of the first set of data fields; b) detecting an emergency alert from an electronic device; c) receiving an emergency data request for the emergency alert from the ESP; d) determining the second set of data fields selected by the administrator of the ESP to be made accessible to the ESP; e) gathering emergency data associated with the emergency alert available for the second set of data fields; and f) transmitting, to the ESP, the emergency data associated with the emergency alert available for the second set of data fields. In some embodiments, the emergency data associated with the emergency alert is gathered from one or more data sources and associated with the emergency alert using a phone number associated with the emergency alert. In some embodiments, a data source within the one or more data sources is a second electronic device communicatively coupled to the electronic device. In some embodiments, the second electronic device is a vehicle, wearable, or IoT device. In some embodiments, a data source within the one or more data sources is a mobile application installed on the electronic device. In some embodiments, the emergency data request comprises credentials associated with the EPS; and determining the second set of data fields further comprises verifying the credentials associated with the ESP. In some embodiments, the method further comprises: at the management portal: receiving credentials from the administrator of the ESP; validating the credentials from the administrator of the ESP; and providing access to the management portal to the administrator of the ESP in response to validating the credentials from the administrator of the ESP. In some embodiments, the method further comprises: a) at the management portal: i) receiving definition of a role for the ESP; ii) displaying the second set of data fields; and iii) receiving selection by the administrator of the ESP of a third set of data fields to be made accessible for the role from the second set of data fields, wherein the third set of data fields is a subset of the second set of data fields; b) identifying the ESP as having the role; and c) transmitting, to the ESP, emergency data associated with the emergency alert available for the third set of data fields. In some embodiments, the emergency data request comprises an identifier of the role; and determining the second set of data fields further comprises referencing the identifier of the role with the management portal. In some embodiments, the method further comprises providing an enhanced data display through a desktop application installed on a computing device at the ESP; and displaying the emergency data transmitted to the ESP through the enhanced data display. In some embodiments, the management portal is a web application accessed by a URL; and the enhanced data display is a webpage accessed through the desktop application installed on the computing device at the ESP. In some embodiments, the method further comprises applying a dynamic visualization to the emergency data transmitted to the ESP displayed through the enhanced data display. In some embodiments, the dynamic visualization further comprises emphasizing a data field; and emphasizing a data field further comprises highlighting, bolding, enlarging, underlining, moving, or coloring the data field. In some embodiments, the dynamic visualization is applied in response to user input at the ESP. In some embodiments, the emergency alert is an emergency call made from a mobile device.

In another aspect, disclosed herein is a system for managing access to emergency data for emergency providers, the system comprising: a) a network server; b) an emergency service provider (ESP) communicatively coupled to the network server; c) an electronic device communicatively coupled to the network server and configured to generate an emergency alert; and d) an emergency management system (EMS) communicatively coupled to the network server and configured to: i) determine a first set of data fields to be made accessible to the ESP, wherein the first set of data fields is selected from a second set of data fields; ii) detect the emergency alert from the electronic device; iii) associate the ESP with the emergency alert; iv) gather emergency data associated with the emergency alert available for the first set of data fields; and v) securely transmit, to the ESP, the emergency data associated with the emergency alert available for the first set of data fields. In some embodiments, the EMS is further configured to receive an emergency data request from the ESP; and securely transmit the emergency data associated with the emergency alert to the ESP in response to receiving the emergency data request. In some embodiments, the emergency data request comprises credentials associated with the ESP; and the EMS is further configured to verify the credentials associated with the ESP. In some embodiments, the EMS is further configured to gather emergency data by obtaining ingestion data from one or more electronic devices associated with a user of the electronic device, wherein: the ingestion data comprises location data, user data, or sensor data; the ingestion data is marked with data sources; and the emergency data securely transmitted to the ESP is restricted to a particular data source. In some embodiments, the EMS is further configured to provide a management portal configured to receive selection of the ESP by an administrator of the ESP; display the second set of data fields; and receive selection of the first set of data fields from the second set of data fields, wherein the first set of data fields is a subset of the second set of data fields. In some embodiments, the ESP is selected from a plurality of ESPs by the administrator of the ESP. In some embodiments, the management portal is further configured to receive credentials from the administrator of the ESP; validate the credentials from the administrator of the ESP; and provide access to the management portal to the administrator of the ESP in response to validating the credentials from the administrator of the ESP. In some embodiments, the management portal is a web application. In some embodiments, the EMS is further configured to provide a management portal configured to receive definition of a role for the ESP; display the second set of data fields; and receive selection of the first set of data fields to be accessible for the role from the second set of data fields, wherein the first set of data fields is a subset of the second set of data fields. In some embodiments, the EMS is further configured to receive credentials from the ESP; identify, based on the credentials, the ESP as having the role; and provide a data display configured to display the emergency data securely transmitted to the ESP. In some embodiments, the management portal is distinct from the data display wherein the emergency data associated with the emergency alert is displayed. In some embodiments, the ESP is associated with the emergency alert using a phone number associated with the electronic device. In some embodiments, the EMS is further configured to provide a data display configured to display the emergency data securely transmitted to the ESP. In some embodiments, the data display is further configured to apply a dynamic visualization to the emergency data associated with the emergency alert displayed through the data display. In some embodiments, the dynamic visualization comprises displaying the data fields included in the first set of data fields sequentially in separate groups. In some embodiments, the data fields included in the first set of data fields are displayed sequentially according to a predetermined timing schedule. In some embodiments, the dynamic visualization comprises emphasizing a data field. In some embodiments, emphasizing a data field further comprises highlighting, bolding, enlarging, underlining, moving, or coloring the data field. In some embodiments, the data display is configured to apply the dynamic visualization to the emergency data displayed through the data display in response to user input at the ESP. In some embodiments, the data display is configured to apply the dynamic visualization to the emergency data displayed through the data display in response to contextual clues detected during an emergency session associated with the emergency alert. In some embodiments, the EMS is further configured to determine a data source for the emergency data associated with the emergency alert available for the first set of categories; and transmit, to the ESP, only the emergency data associated with the emergency alert available for the first set of data fields received from the data source. In some embodiments, the EMS is further configured to receive an emergency data request from the ESP, wherein the emergency data request comprises credentials associated with the ESP and provided to the ESP by a software vendor; verify the credentials associated with the ESP; transmit the emergency data associated with the emergency alert through a network provided by the software vendor; and provide a data display configured to display the emergency data transmitted to the ESP. In some embodiments, the ESP is configured to generate the emergency data request in response to the ESP receiving the emergency alert. In some embodiments, the ESP is configured to generate the emergency data request in response to user input at the ESP. In some embodiments, the data display is a web page accessed through a desktop application. In some embodiments, the data display is selected from a tab within the desktop application. In some embodiments, the data display is selected from a tool button within the desktop application. In some embodiments, the EMS is further configured to update the data display when new emergency data associated with the emergency alert available for the first set of data fields is received by the EMS. In some embodiments, the electronic device is further configured to transmit the emergency data associated with emergency alert to the EMS. In some embodiments, the electronic device is further configured to generate the emergency data associated with the emergency alert to the EMS. In some embodiments, the electronic device is further configured to receive the emergency data associated with the emergency alert from a second electronic device communicatively coupled to the electronic device. In some embodiments, the EMS is further configured to receive the emergency data associated with the emergency alert from a second electronic device associated with a user of the electronic device. In some embodiments, the second electronic device is a vehicle, wearable, or IoT device. In some embodiments, the EMS is further configured to receive the emergency data associated with the emergency alert from a mobile application installed on the electronic device. In some embodiments, the first set of data fields comprises one or more of photo, name, address, date of birth, phone number, gender, height, weight, ethnicity, languages spoken, occupation, email, notes, emergency contacts, allergies, blood type, disabilities, existing conditions, and medications. In some embodiments, the first set of data fields comprises one or more of caller phone number, probable civic address, probable civic address likelihood, last location update time, latitude and longitude, uncertainty radius, confidence, and altitude. In some embodiments, the first set of data fields comprises an audio or video feed. In some embodiments, the EMS is further configured to receive the audio or video feed from an IoT device associated with a user of the electronic device. In some embodiments, the EMS is further configured to receive the audio or video feed from an IoT device communicatively coupled to the electronic device. In some embodiments, the EMS is further configured to receive the audio or video feed from the electronic device. In some embodiments, the emergency alert is an emergency call made from a mobile phone. In some embodiments, the EMS is further configured to transmit the emergency data associated with the emergency alert to an electronic device associated with an emergency responder. In some embodiments, the EMS is further configured to display the emergency data associated with the emergency alert on the electronic device associated with the emergency responder. In some embodiments, the emergency alert comprises one of: an emergency wireless call, an emergency landline call, a text call, and an emergency call back. In some embodiments, the data source is a mobile application installed on the electronic device. In some embodiments, the data source is a second electronic device communicatively coupled to the electronic device. In some embodiments, the data source is a second electronic device associated with a user of the electronic device. In some embodiments, the second electronic device is a vehicle, wearable, or IoT device.

In another aspect, disclosed herein is a system for managing access to emergency data for emergency service providers, the system comprising: a) a network server; b) an emergency service provider (ESP) communicatively coupled to the network server; c) an electronic device communicatively coupled to the network server and configured to generate an emergency alert; and d) an emergency management system (EMS) communicatively coupled to the network server and configured to: i) detect the emergency alert from the electronic device; ii) gather emergency data associated with the emergency alert; iii) identify an emergency service provider (ESP) associated with the emergency alert; iv) determining a set of data fields selected to be made accessible to the ESP; and v) transmit, to the ESP, the emergency data associated with the associated with the emergency alert available for the set of data fields.

In another aspect, disclosed herein is a system for managing access to emergency data for emergency service providers, the system comprising: a) a network server; b) an emergency service provider (ESP) communicatively coupled to the network server; c) an electronic device communicatively coupled to the network server and configured to generate an emergency alert; and d) an emergency management system (EMS) communicatively coupled to the network server and configured to: i) provide a management portal configured to: 1) receive selection of the ESP by an administrator of the ESP; 2) display a first set of data fields; and 3) receive selection by the administrator of the ESP of a second set of data fields to be made accessible to the ESP from the first set of data fields, wherein the second set of data fields is a subset of the first set of data fields; ii) detect an emergency alert from the electronic device; iii) receive an emergency data request for the emergency alert from the ESP; iv) determine the second set of data fields selected by the administrator of the ESP to be made available to the ESP; v) gather emergency data associated with the emergency alert available for the second set of data fields; and vi) transmit, to the ESP, the emergency data associated with the emergency alert available for the second set of data fields. In some embodiments, the EMS is further configured to gather the emergency data associated with the emergency alert from one or more data sources and associate the emergency data with the emergency alert using a phone number associated with the emergency alert. In some embodiments, a data source within the one or more data sources is a second electronic device communicatively coupled to the electronic device. In some embodiments, the second electronic device is a vehicle, wearable, or IoT device. In some embodiments, a data source within the one or more data sources is a mobile application installed on the electronic device. In some embodiments, the emergency data request comprises credentials associated with the ESP; and the EMS is further configured to verify the credentials associated with the ESP. In some embodiments, the EMS is further configured to provide a management portal configured to receive credentials from the administrator of the ESP; validate the credentials from the administrator of the ESP; and provide access to the management portal to the administrator of the ESP in response to validating the credentials from the administrator of the ESP. In some embodiments, the EMS is further configured to: a) provide a management portal configured to: i) receive definition of a role for the ESP; ii) display the second set of data fields; and iii) receive selection of a third set of data fields by the administrator of the ESP to be accessible for the role from the second set of data fields, wherein the third set of data fields is a subset of the second set of data fields; b) identify the ESP as having the role; and c) transmit, to the ESP, emergency data associated with the emergency alert available for the third set of data fields. In some embodiments, the emergency data request comprises an identifier of the role; and the EMS is further configured to reference the identifier of the role with the management portal. In some embodiments, the EMS is further configured to provide an enhanced data display to the ESP through a desktop application installed on a computing device at the ESP; and display the emergency data transmitted to the ESP through the enhanced data display. In some embodiments, the management portal is a web application accessed by a URL; and the enhanced data display is a webpage accessed through the desktop application installed on the computing device at the ESP. In some embodiments, the enhanced data display is further configured to apply a dynamic visualization to the emergency data transmitted to the ESP displayed through the enhanced data display. In some embodiments, the dynamic visualization emphasizing a data field; and emphasizing a data field further comprises highlighting, bolding, enlarging, underlining, moving, or coloring the data field. In some embodiments, the enhanced data display is configured to apply the dynamic visualization to the emergency data displayed through the data display in response to user input at the ESP. In some embodiments, the emergency alert is an emergency call made from a mobile device.

In another aspect, disclosed herein is a non-transitory computer readable storage media encoded with a computer program including instructions executable by at least one processor for: a) determining a first set of data fields to be made accessible to an emergency service provider (ESP), wherein the first set of data fields is selected from a second set of data fields; b) detecting an emergency alert from an electronic device; c) associating the ESP with the emergency alert; d) gathering emergency data associated with the emergency alert available for the first set of data fields; and e) securely transmitting, to the ESP, the emergency data associated with the emergency alert available for the first set of data fields. In some embodiments, the media further includes instructions for receiving an emergency data request from the ESP; and securely transmitting the emergency data associated with the emergency alert to the ESP in response to receiving the emergency data request. In some embodiments, the emergency data request comprises credentials associated with the ESP; and determining the first set of data fields to be made accessible to the ESP further comprises verifying the credentials associated with the ESP. In some embodiments, gathering emergency data further comprises obtaining ingestion data from one or more electronic devices associated with a user of the electronic device, wherein: the ingestion data comprises location data, user data, or sensor data; the ingestion data is marked with data sources; and the emergency data securely transmitted to the ESP is restricted to a particular data source. In some embodiments, the media further includes instructions for: at a management portal: receiving selection of the ESP by an administrator of the ESP; displaying the second set of data fields; and receiving selection of the first set of data fields from the second set of data fields, wherein the first set of data fields is a subset of the second set of data fields. In some embodiments, the ESP is selected from a plurality of ESPs by the administrator of the ESP. In some embodiments, the media further includes instructions for: at the management portal: receiving credentials from the administrator of the ESP; validating the credentials from the administrator of the ESP; and providing access to the management portal to the administrator of the ESP in response to validating the credentials from the administrator of the ESP. In some embodiments, the management portal is a web application. In some embodiments, the media further includes instructions for: at the management portal: receiving definition of a role for the ESP; displaying the second set of data fields; and receiving selection of the first set of data fields to be accessible for the role from the second set of data fields, wherein the first set of data fields is a subset of the second set of data fields. In some embodiments, the media further includes instructions for providing a data display to the ESP; receiving credentials from the ESP; identifying, based on the credentials, the ESP as having the role; and displaying the emergency data securely transmitted to the ESP through the data display. In some embodiments, the management portal is distinct from the data display wherein the emergency data associated with the emergency alert is displayed. In some embodiments, the emergency alert using a phone number associated with the electronic device. In some embodiments, the media further includes instructions for displaying the emergency data transmitted to the ESP through a data display. In some embodiments, the media further includes instructions for applying a dynamic visualization to the emergency data associated with the emergency alert displayed through the data display. In some embodiments, applying the dynamic visualization further comprises displaying the data fields included in the first set of data fields sequentially in separate groups. In some embodiments, the data fields included in the first set of data fields are displayed sequentially according to a predetermined timing schedule. In some embodiments, applying the dynamic visualization further comprises emphasizing a data field. In some embodiments, emphasizing a data field further comprises highlighting, bolding, enlarging, underlining, moving, or coloring the data field. In some embodiments, the dynamic visualization is applied in response to user input at the ESP. In some embodiments, the dynamic visualization is applied in response to contextual cues detected during an emergency session associated with the emergency alert. In some embodiments, the media further includes instructions for determining a data source for the emergency data associated with the emergency alert available for the first set of categories; and transmitting, to the ESP, only the emergency data associated with the emergency alert available for the first set of data fields received from the data source. In some embodiments, the media further includes instructions for receiving an emergency data request from the ESP, wherein the emergency data request comprises credentials associated with the ESP and provided to the ESP by a software vendor. In some embodiments, determining the first set of data fields to be made accessible to the ESP further comprises verifying the credentials associated with the ESP. In some embodiments, transmitting the emergency data associated with the emergency alert to the ESP further comprises transmitting the emergency data associated with the emergency alert through a network provided by the software vendor. In some embodiments, the media further includes instructions for displaying the emergency data associated with the emergency alert through a data display, wherein the data display is accessed through a desktop application provided by the software vendor. In some embodiments, the emergency data request from the ESP is generated by the ESP in response to the ESP receiving the emergency alert. In some embodiments, the emergency data request from the ESP is generated in response to user input at the ESP. In some embodiments, the data display is a web page accessed through a desktop application. In some embodiments, the data display is selected from a tab within the desktop application. In some embodiments, the data display is selected from a tool button within the desktop application. In some embodiments, the media further includes instructions for updating the data display when new emergency data associated with the emergency alert available for the first set of data fields is received by the emergency management system. In some embodiments, the emergency data associated with the emergency alert is received from the electronic device. In some embodiments, the emergency data associated with the emergency alert is generated by the electronic device. In some embodiments, the emergency data associated with the emergency alert is generated by a second electronic device communicatively coupled to the electronic device. In some embodiments, the emergency data associated with the emergency alert is generated by a second electronic device associated with a user of the electronic device. In some embodiments, the second electronic device is a vehicle, wearable, or IoT device. In some embodiments, the emergency data associated with the emergency alert is generated by a mobile application installed on the electronic device. In some embodiments, the first set of data fields comprises one or more of photo, name, address, date of birth, phone number, gender, height, weight, ethnicity, languages spoken, occupation, email, notes, emergency contacts, allergies, blood type, disabilities, existing conditions, and medications. In some embodiments, the first set of data fields comprises one or more of caller phone number, probable civic address, probable civic address likelihood, last location update time, latitude and longitude, uncertainty radius, confidence, and altitude. In some embodiments, the first set of data fields comprises an audio or video feed. In some embodiments, the audio or video feed is received from an IoT device associated with a user of the electronic device. In some embodiments, the audio or video feed is received from an IoT device communicatively coupled to the electronic device. In some embodiments, the audio or video feed is received from the electronic device. In some embodiments, the emergency alert is an emergency call made from a mobile phone. In some embodiments, the media further includes instructions for securely transmitting the emergency data associated with the emergency alert to an electronic device associated with an emergency responder. In some embodiments, the media further includes instructions for displaying the emergency data associated with the emergency alert on the electronic device associated with the emergency responder. In some embodiments, the emergency alert comprises one of: an emergency wireless call, an emergency landline call, a text call, and an emergency call back. In some embodiments, the data source is a mobile application installed on the electronic device. In some embodiments, the data source is a second electronic device communicatively coupled to the electronic device. In some embodiments, the data source is a second electronic device associated with a user of the electronic device. In some embodiments, the second electronic device is a vehicle, wearable, or IoT device.

In another aspect, disclosed herein is a non-transitory computer readable storage media encoded with a computer program including instructions executable by at least one processor for: a) detecting an emergency alert from an electronic device; b) gathering emergency data associated with the emergency alert; c) identifying an emergency service provider (ESP) associated with the emergency alert; d) determining a set of data fields selected to be made accessible to the ESP; and e) transmitting, to the ESP, the emergency data associated with the associated with the emergency alert available for the set of data fields.

In another aspect, disclosed herein is a non-transitory computer readable storage media encoded with a computer program including instructions executable by at least one processor for: a) at a management portal: i) receiving selection of an emergency service provider (ESP) by an administrator of the ESP; ii) displaying a first set of data fields; and iii) receiving selection by the administrator of the ESP of a second set of data fields to be made accessible to the ESP from the first set of data fields, wherein the second set of data fields is a subset of the first set of data fields; b) detecting an emergency alert from an electronic device; c) receiving an emergency data request for the emergency alert from the ESP; d) determining the second set of data fields selected by the administrator of the ESP to be made accessible to the ESP; e) gathering emergency data associated with the emergency alert available for the second set of data fields; and f) transmitting, to the ESP, the emergency data associated with the emergency alert available for the second set of data fields. In some embodiments, the emergency data associated with the emergency alert is gathered from one or more data sources and associated with the emergency alert using a phone number associated with the emergency alert. In some embodiments, a data source within the one or more data sources is a second electronic device communicatively coupled to the electronic device. In some embodiments, the second electronic device is a vehicle, wearable, or IoT device. In some embodiments, a data source within the one or more data sources is a mobile application installed on the electronic device. In some embodiments, the emergency data request comprises credentials associated with the EPS; and determining the second set of data fields further comprises verifying the credentials associated with the ESP. In some embodiments, the media further includes instructions for: at the management portal: receiving credentials from the administrator of the ESP; validating the credentials from the administrator of the ESP; and providing access to the management portal to the administrator of the ESP in response to validating the credentials from the administrator of the ESP. In some embodiments, the media further includes instructions for: a) at the management portal: receiving definition of a role for the ESP; displaying the second set of data fields; and receiving selection by the administrator of the ESP of a third set of data fields to be made accessible for the role from the second set of data fields, wherein the third set of data fields is a subset of the second set of data fields; b) identifying the ESP as having the role; and c) transmitting, to the ESP, emergency data associated with the emergency alert available for the third set of data fields. In some embodiments, the emergency data request comprises an identifier of the role; and determining the second set of data fields further comprises referencing the identifier of the role with the management portal. In some embodiments, the media further includes instructions for providing an enhanced data display through a desktop application installed on a computing device at the ESP; and displaying the emergency data transmitted to the ESP through the enhanced data display. In some embodiments, the management portal is a web application accessed by a URL; and the enhanced data display is a webpage accessed through the desktop application installed on the computing device at the ESP. In some embodiments, the media further includes instructions for applying a dynamic visualization to the emergency data transmitted to the ESP displayed through the enhanced data display. In some embodiments the dynamic visualization further comprises emphasizing a data field; and emphasizing a data field further comprises highlighting, bolding, enlarging, underlining, moving, or coloring the data field. In some embodiments, the dynamic visualization is applied in response to user input at the ESP. In some embodiments, the emergency alert is an emergency call made from a mobile device.

In some aspects, disclosed herein is a system for coordinating access to emergency data for a plurality of emergency service providers (ESPs), the system comprising: a) a management portal comprising: i) a software module establishing one or more roles within an ESP; and ii) a software module defining customized access to emergency data from a plurality of data fields for the one or more roles; b) an emergency management system (EMS) comprising: i) a software module receiving an emergency data request from the ESP, said emergency data request associated with an electronic device; ii) a software module identifying a recipient at the ESP and determining a role established for the recipient, said role having authorization to access emergency data belonging to at least one data field from the plurality of data fields; iii) a software module obtaining emergency data associated with the emergency data request; and iv) a software module securely transmitting emergency data falling within the at least one data field to the ESP, wherein the transmitted emergency data is formatted to be compatible with the ESP. In some embodiments, the emergency data request is associated with an emergency alert originating from the electronic device. In some embodiments, the emergency data request comprises a unique identifier corresponding to the electronic device. In some embodiments, the unique identifier is a phone number, Electronic Serial Number, Media Access Control (MAC) address, Temporary Mobile Station Identifier (TMSI), or Internet Protocol (IP) address of the electronic device. In some embodiments, the unique identifier is a phone number of the electronic device. In some embodiments, the emergency data request comprises credentials associated with the ESP. In some embodiments, the EMS verifies the credentials associated with the ESP before transmitting emergency data to the ESP. In some embodiments, obtaining emergency data associated with the emergency data request comprises ingesting data from at least one device associated with the electronic device or a user of the electronic device. In some embodiments, the at least one associated device is communicatively linked to the electronic device. In some embodiments, the at least one associated device comprises a vehicle device, wearable device, or Internet of Things (IoT) device. In some embodiments, the emergency data from the at least one associated device comprises at least one of location data, user data, and sensor data. In some embodiments, the emergency data from the at least one associated device includes information on a source of the emergency data. In some embodiments, the source is a mobile application installed on the electronic device. In some embodiments, the mobile application is a social media application, a map application, a music or video application, an emergency communications application, a chat application, a shopping application, or an audio or podcast application. In some embodiments, the EMS comprises a software module obtaining location data from an external system or device. In some embodiments, the EMS comprises a software module obtaining additional data from an external system or device. In some embodiments, the emergency data associated with the emergency data request is generated by a mobile application installed on the electronic device. In some embodiments, the at least one data field comprises one or more of photo, name, address, date of birth, phone number, gender, height, weight, ethnicity, languages spoken, occupation, email, notes, emergency contacts, allergies, blood type, disabilities, existing conditions, and medications. In some embodiments, the at least one data field comprises one or more of caller phone number, probable civic address, probable civic address likelihood, last location update time, latitude and longitude, uncertainty radius, confidence, and altitude. In some embodiments, the at least one data field comprises an audio or video feed. In some embodiments, the EMS obtains data from a plurality of networks and protocol types and integrates the data into one or more databases. In some embodiments, the emergency data request comprises location data associated with the electronic device. In some embodiments, the one or more roles within the ESP comprise a dispatcher or call taker role, a first responder role, a supervisor role, or any combination thereof. In some embodiments, the plurality of data fields comprises data fields selected from the group consisting of user identity data, health data, sensor data, environmental data, and location data. In some embodiments, the emergency alert is an emergency call initiated by the electronic device. In some embodiments, the emergency alert comprises at least one of an emergency wireless call, an emergency landline call, a text call, and an emergency call back. In some embodiments, the electronic device is a mobile phone, a smartphone, a tablet, a vehicle device, a medical alert device, or an Internet of Things (IoT) device. In some embodiments, the EMS comprises a software module detecting an emergency alert sent by an electronic device. In some embodiments, the EMS comprises a software module identifying the ESP responding to the emergency alert from the plurality of ESPs. In some embodiments, the system further comprises an enhanced data system at the ESP for displaying the emergency data falling within the at least one data field to a user.

In some aspects, disclosed herein is a method for coordinating access to emergency data for a plurality of emergency service providers (ESPs), the method comprising: a) establishing, at a management portal, one or more roles within an ESP; and b) defining, at the management portal, authorization to access emergency data from a plurality of data fields for the one or more roles; c) receiving, at an emergency management system, receiving an emergency data request from the ESP, said emergency data request associated with an electronic device; d) identifying, at the emergency management system, a recipient at the ESP and determining, at the emergency management system, a role established for the recipient, said role having authorization to access emergency data belonging to at least one data field from the plurality of data fields; e) obtaining, at the emergency management system, emergency data associated with the emergency data request; and f) securely transmitting, at the emergency management system, emergency data falling within the at least one data field to the ESP, wherein the transmitted emergency data is formatted to be compatible with the ESP. In some embodiments, the emergency data request is associated with an emergency alert originating from the electronic device. In some embodiments, the emergency data request comprises a unique identifier corresponding to the electronic device. In some embodiments, the unique identifier is a phone number, Electronic Serial Number, Media Access Control (MAC) address, Temporary Mobile Station Identifier (TMSI), or Internet Protocol (IP) address of the electronic device. In some embodiments, the unique identifier is a phone number of the electronic device. In some embodiments, the emergency data request comprises credentials associated with the ESP. In some embodiments, the EMS verifies the credentials associated with the ESP before transmitting emergency data to the ESP. In some embodiments, obtaining emergency data associated with the emergency data request comprises ingesting data from at least one device associated with the electronic device or a user of the electronic device. In some embodiments, the at least one associated device is communicatively linked to the electronic device. In some embodiments, the at least one associated device comprises a vehicle device, wearable device, or Internet of Things (IoT) device. In some embodiments, the emergency data from the at least one associated device comprises at least one of location data, user data, and sensor data. In some embodiments, the emergency data from the at least one associated device includes information on a source of the emergency data. In some embodiments, the source is a mobile application installed on the electronic device. In some embodiments, the mobile application is a social media application, a map application, a music or video application, an emergency communications application, a chat application, a shopping application, or an audio or podcast application. In some embodiments, the method further comprises obtaining, by the emergency management system, location data from an external system or device. In some embodiments, the method further comprises obtaining, by the emergency management system, additional data from an external system or device. In some embodiments, the emergency data associated with the emergency data request is generated by a mobile application installed on the electronic device. In some embodiments, the at least one data field comprises one or more of photo, name, address, date of birth, phone number, gender, height, weight, ethnicity, languages spoken, occupation, email, notes, emergency contacts, allergies, blood type, disabilities, existing conditions, and medications. In some embodiments, the at least one data field comprises one or more of caller phone number, probable civic address, probable civic address likelihood, last location update time, latitude and longitude, uncertainty radius, confidence, and altitude. In some embodiments, the at least one data field comprises an audio or video feed. In some embodiments, the method further comprises obtaining, by the emergency management system, data from a plurality of networks and protocol types and integrating the data into one or more databases. In some embodiments, the emergency data request comprises location data associated with the electronic device. In some embodiments, the one or more roles within the ESP comprise a dispatcher or call taker role, a first responder role, a supervisor role, or any combination thereof. In some embodiments, the plurality of data fields comprises data fields selected from the group consisting of user identity data, health data, sensor data, environmental data, and location data. In some embodiments, the emergency alert is an emergency call initiated by the electronic device. In some embodiments, the emergency alert comprises at least one of an emergency wireless call, an emergency landline call, a text call, and an emergency call back. In some embodiments, the electronic device is a mobile phone, a smartphone, a tablet, a vehicle device, a medical alert device, or an Internet of Things (IoT) device. In some embodiments, the method further comprises detecting, by the emergency management system, an emergency alert sent by an electronic device. In some embodiments, the method further comprises identifying, by the emergency management system, the ESP responding to the emergency alert from the plurality of ESPs. In some embodiments, the recipient is an enhanced data system for displaying the emergency data falling within the at least one data field according to at least one of a dynamic visualization scheme and user input.

In some aspects, disclosed herein is a system for coordinating access to emergency data for a plurality of emergency service providers (ESPs), the system comprising: a) a management portal comprising: i) a software module establishing one or more roles within an ESP; and ii) a software module defining authorization to access emergency data from a plurality of data fields for the one or more roles; b) an emergency management system (EMS) comprising: i) a software module detecting an emergency alert originating from an electronic device; ii) a software module identifying the ESP from the plurality of ESPs for responding to the emergency alert; iii) a software module identifying a recipient at the ESP for receiving emergency data associated with the emergency alert and determining a role established for the recipient, said role having authorization to access emergency data belonging to at least one data field from the plurality of data fields; iv) a software module obtaining the emergency data associated with the emergency communication; and v) a software module securely transmitting data falling within the at least one data field to the ESP, wherein the transmitted emergency data is formatted to be compatible with the ESP.

In some aspects, disclosed herein is an enhanced data system comprising at least one processor, a memory, a user interface, a display, and instructions executable by the at least one processor to create an emergency communications application comprising: a) a software module receiving an emergency alert originating from an electronic device; b) a software module associating the emergency alert with a unique identifier of the electronic device; c) a software module sending an emergency data request to an emergency management system (EMS), the emergency data request comprising the unique identifier of the electronic device, credentials for an emergency service provider (ESP) associated with the enhanced data system, and an identifier of a role established for the enhanced data system or a user thereof; d) a software module receiving emergency data falling within at least one data field for which the enhanced data system has authorization to access according to the established role; and e) a software module providing an enhanced data display shown through the display, said enhanced data display showing the emergency data according to a dynamic visualization scheme. In some embodiments, the enhanced data system is a computing device at the ESP. In some embodiments, the enhanced data display is a webpage accessed through the emergency communications application installed on a computing device at the ESP. In some embodiments, dynamic visualization scheme comprises emphasizing a data field through highlighting, bolding, enlarging, underlining, moving, or coloring the data field. In some embodiments, dynamic visualization scheme is applied in response to user input. In some embodiments, the unique identifier is a phone number, Electronic Serial Number, Media Access Control (MAC) address, Temporary Mobile Station Identifier (TMSI), or Internet Protocol (IP) address of the electronic device. In some embodiments, the unique identifier is a phone number of the electronic device. In some embodiments, the emergency data is sourced from at least one device associated with the electronic device or a user of the electronic device. In some embodiments, the at least one associated device is communicatively linked to the electronic device. In some embodiments, the at least one associated device comprises a vehicle device, wearable device, or Internet of Things (IoT) device. In some embodiments, the emergency data from the at least one associated device comprises at least one of location data, user data, and sensor data. In some embodiments, the emergency data from the at least one associated device includes information on a source of the emergency data. In some embodiments, the source is a mobile application installed on the electronic device. In some embodiments, the mobile application is a social media application, a map application, a music or video application, an emergency communications application, a chat application, a shopping application, or an audio or podcast application. In some embodiments, the emergency data associated with the emergency data request is generated by a mobile application installed on the electronic device. In some embodiments, the at least one data field comprises one or more of photo, name, address, date of birth, phone number, gender, height, weight, ethnicity, languages spoken, occupation, email, notes, emergency contacts, allergies, blood type, disabilities, existing conditions, and medications. In some embodiments, the at least one data field comprises one or more of caller phone number, probable civic address, probable civic address likelihood, last location update time, latitude and longitude, uncertainty radius, confidence, and altitude. In some embodiments, the at least one data field comprises an audio or video feed. In some embodiments, the emergency data request comprises location data associated with the electronic device. In some embodiments, the role is a dispatcher or call taker role, a first responder role, a supervisor role, or any combination thereof. In some embodiments, the at least one category comprises at least one of user identity data, health data, sensor data, environmental data, and location data. In some embodiments, the emergency alert comprises at least one of an emergency wireless call, an emergency landline call, a text call, and an emergency call back. In some embodiments, the electronic device is a mobile phone, a smartphone, a tablet, a vehicle device, a medical alert device, or an Internet of Things (IoT) device.

In some aspects, disclosed herein is non-transitory computer readable storage media encoded with a computer program including instructions executable by at least one processor for creating an emergency communications application comprising: a) a software module receiving an emergency alert originating from an electronic device; b) a software module associating the emergency alert with a unique identifier of the electronic device; c) a software module sending an emergency data request to an emergency management system (EMS), the emergency data request comprising the unique identifier of the electronic device, credentials for an emergency service provider (ESP) associated with the enhanced data system, and an identifier of a role established for the enhanced data system or a user thereof; d) a software module receiving emergency data falling within at least one data field for which the enhanced data system has authorization to access according to the established role; and e) a software module providing an enhanced data display shown through the display, said enhanced data display showing the emergency data according to a dynamic visualization scheme. In some embodiments, the enhanced data system is a computing device at the ESP. In some embodiments, the enhanced data display is a webpage accessed through the emergency communications application installed on a computing device at the ESP. In some embodiments, dynamic visualization scheme comprises emphasizing a data field through highlighting, bolding, enlarging, underlining, moving, or coloring the data field. In some embodiments, dynamic visualization scheme is applied in response to user input. In some embodiments, the unique identifier is a phone number, Electronic Serial Number, Media Access Control (MAC) address, Temporary Mobile Station Identifier (TMSI), or Internet Protocol (IP) address of the electronic device. In some embodiments, the unique identifier is a phone number of the electronic device. In some embodiments, the emergency data is sourced from at least one device associated with the electronic device or a user of the electronic device. In some embodiments, the at least one associated device is communicatively linked to the electronic device. In some embodiments, the at least one associated device comprises a vehicle device, wearable device, or Internet of Things (IoT) device. In some embodiments, the emergency data from the at least one associated device comprises at least one of location data, user data, and sensor data. In some embodiments, the emergency data from the at least one associated device includes information on a source of the emergency data. In some embodiments, the source is a mobile application installed on the electronic device. In some embodiments, the mobile application is a social media application, a map application, a music or video application, an emergency communications application, a chat application, a shopping application, or an audio or podcast application. In some embodiments, the emergency data associated with the emergency data request is generated by a mobile application installed on the electronic device. In some embodiments, the at least one data field comprises one or more of photo, name, address, date of birth, phone number, gender, height, weight, ethnicity, languages spoken, occupation, email, notes, emergency contacts, allergies, blood type, disabilities, existing conditions, and medications. In some embodiments, the at least one data field comprises one or more of caller phone number, probable civic address, probable civic address likelihood, last location update time, latitude and longitude, uncertainty radius, confidence, and altitude. In some embodiments, the at least one data field comprises an audio or video feed. In some embodiments, the emergency data request comprises location data associated with the electronic device. In some embodiments, the role is a dispatcher or call taker role, a first responder role, a supervisor role, or any combination thereof. In some embodiments, the at least one data field comprises at least one of user identity data, health data, sensor data, environmental data, and location data. In some embodiments, the emergency alert comprises at least one of an emergency wireless call, an emergency landline call, a text call, and an emergency call back. In some embodiments, the electronic device is a mobile phone, a smartphone, a tablet, a vehicle device, a medical alert device, or an Internet of Things (IoT) device.

In some aspects, disclosed herein is a computer-implemented method for managing emergency communications, comprising: a) receiving an emergency alert originating from an electronic device; b) associating the emergency alert with a unique identifier of the electronic device; c) a software module sending an emergency data request to an emergency management system (EMS), the emergency data request comprising the unique identifier of the electronic device, credentials for an emergency service provider (ESP) associated with the enhanced data system, and an identifier of a role established for the enhanced data system or a user thereof; d) receiving emergency data falling within at least one data field for which the enhanced data system has authorization to access according to the established role; and e) providing an enhanced data display shown through the display, said enhanced data display showing the emergency data according to a dynamic visualization scheme. In some embodiments, the enhanced data system is a computing device at the ESP. In some embodiments, the enhanced data display is a webpage accessed through the emergency communications application installed on a computing device at the ESP. In some embodiments, dynamic visualization scheme comprises emphasizing a data field through highlighting, bolding, enlarging, underlining, moving, or coloring the data field. In some embodiments, dynamic visualization scheme is applied in response to user input. In some embodiments, the unique identifier is a phone number, Electronic Serial Number, Media Access Control (MAC) address, Temporary Mobile Station Identifier (TMSI), or Internet Protocol (IP) address of the electronic device. In some embodiments, the unique identifier is a phone number of the electronic device. In some embodiments, the emergency data is sourced from at least one device associated with the electronic device or a user of the electronic device. In some embodiments, the at least one associated device is communicatively linked to the electronic device. In some embodiments, the at least one associated device comprises a vehicle device, wearable device, or Internet of Things (IoT) device. In some embodiments, the emergency data from the at least one associated device comprises at least one of location data, user data, and sensor data. In some embodiments, the emergency data from the at least one associated device includes information on a source of the data. In some embodiments, the source is a mobile application installed on the electronic device. In some embodiments, the mobile application is a social media application, a map application, a music or video application, an emergency communications application, a chat application, a shopping application, or an audio or podcast application. In some embodiments, the emergency data associated with the emergency data request is generated by a mobile application installed on the electronic device. In some embodiments, the at least one data field comprises one or more of photo, name, address, date of birth, phone number, gender, height, weight, ethnicity, languages spoken, occupation, email, notes, emergency contacts, allergies, blood type, disabilities, existing conditions, and medications. In some embodiments, the at least one data field comprises one or more of caller phone number, probable civic address, probable civic address likelihood, last location update time, latitude and longitude, uncertainty radius, confidence, and altitude. In some embodiments, the at least one data field comprises an audio or video feed. In some embodiments, the emergency data request comprises location data associated with the electronic device. In some embodiments, the role is a dispatcher or call taker role, a first responder role, a supervisor role, or any combination thereof. In some embodiments, the at least one data field comprises at least one of user identity data, health data, sensor data, environmental data, and location data. In some embodiments, the emergency alert comprises at least one of an emergency wireless call, an emergency landline call, a text call, and an emergency call back. In some embodiments, the electronic device is a mobile phone, a smartphone, a tablet, a vehicle device, a medical alert device, or an Internet of Things (IoT) device.

In another aspect, disclosed herein is a system for managing access to emergency data for emergency service providers, the system comprising: (a) a management portal implemented as one or more software modules on a computing system comprising a processor and a non-transitory computer readable storage medium and configured to: (i)

establish a first role that can be selected for one or more users within an ESP; and (ii) define a first set of emergency data fields that is accessible by an ESP user associated with the first role; (b) an emergency response application implemented as one or more software modules on a computing system comprising a processor, a display, and a non-transitory computer readable storage medium and configured to: (i) log the ESP user associated with the first role into the emergency response application; (ii) generate an emergency data request comprising an identifier associated with an emergency alert; and (iii) transmit the emergency data request to an emergency management system; and (c) the emergency management system, implemented as one or more software modules on a cloud computing system comprising a processor and a non-transitory computer readable storage medium and configured to: (i) receive the emergency data request from the emergency response application; (ii) gather, using the identifier, emergency data corresponding to the first set of emergency data fields and associated with the emergency alert; and (iii) securely transmit the emergency data associated with the emergency alert to the emergency response application for display on the computing system in (b). In some embodiments, the management portal is further configured to: (a) establish a second role that can be selected for one or more users within the ESP; and (b) define a second set of emergency data fields that is accessible by any ESP user associated with the second role, wherein the first set of emergency data fields and the second set of emergency data fields comprise different sets of emergency data fields. In some embodiments, the second set of emergency data fields is defined from a plurality of emergency data fields. In some embodiments, the first set of emergency data fields is defined from a plurality of emergency data fields. In some embodiments, the first set of emergency data fields is defined using one or more emergency data categories, wherein each emergency data category comprises two or more emergency data fields. In some embodiments: (a) the emergency data request comprises one or more tags indicative of the first set of emergency data categories; and (b) the emergency management system is further configured to determine the first set of emergency data categories using the one or more tags. In some embodiments, the emergency response application is further configured to: (a) detect the emergency alert when the emergency alert is received by the ESP; and (b) autonomously generate the emergency data request in response to detecting the emergency alert. In some embodiments, the emergency response application is further configured to generate the emergency data request in response to user input at the emergency response application. In some embodiments, the management portal further comprises a graphical user interface shown on a display of the computing system on which the management portal is implemented, and wherein the management portal is further configured to: (a) display the plurality of emergency data fields or a plurality of emergency data categories on the display; and (b) receive choice of the set of emergency data fields or one or more emergency data categories comprising the set of emergency data fields from the plurality of emergency data fields or the plurality of emergency data categories by an administrator of the ESP through the graphical user interface. In some embodiments: (a) the emergency data request comprises one or more tags indicative of the first set of emergency data fields that is accessible to the ESP user associated with the first role; and (b) the emergency management system is further configured to determine the first set of emergency data fields that is accessible to the ESP user associated with the first role using the one or more tags. In some embodiments: (a) the emergency data request comprises an identifier of the first role; and (b) the emergency management system is further configured to determine the set of emergency data fields that is accessible to the ESP user associated with the first role by querying the management portal using the identifier of the first role. In some embodiments, the emergency response application is further configured to detect the emergency alert, wherein the emergency alert is generated by an electronic device and wherein the identifier associated with the emergency alert is a phone number associated with the electronic device. In some embodiments, the emergency alert is an emergency all made to the ESP by the electronic device. In some embodiments, the first set of emergency data fields that is accessible to the ESP user associated with the first role comprises location data, and wherein the emergency data associated with the emergency alert comprises a location. In some embodiments, the emergency management system is further configured to: (a) obtain a location associated with the emergency alert; (b) access a geofence associated with the ESP; and (c) determine if the location falls within the geofence associated with the ESP. In some embodiments, the emergency management system is further configured to: (a) obtain a location associated with the emergency alert; (b) access a geofence associated with the ESP; (c) determine if the location falls within the geofence associated with the ESP; and (d) gather the emergency data corresponding to the first set of emergency data fields and associated with the emergency alert only if the location is determined to fall within the geofence associated with the ESP. In some embodiments, the emergency management system further comprises a software module configured to ingest data from at least one electronic device associated with the emergency alert.

In another aspect, disclosed herein is a system for managing access to emergency data for emergency service providers, the system comprising: (a) a management portal implemented as one or more software modules on a computing system comprising a processor and a non-transitory computer readable storage medium and configured to: (i) establish a first role that can be selected for one or more users within an ESP; and (ii) define a first set of emergency data fields that is accessible by an ESP user associated with the first role; and (b) an emergency response application implemented as one or more software modules on a computing system comprising a processor, a display, and a non-transitory computer readable storage medium and configured to: (i) log the ESP user associated with the first role into the emergency response application; (ii) generate an emergency data request comprising an identifier associated with an emergency alert; (iii) transmit the emergency data request to an emergency management system; (iv) receive emergency data corresponding to the first set of emergency data fields and associated with the emergency alert; and (v) display the emergency data on the computing system. In some embodiments, the management portal is further configured to: (a) establish a second role that can be selected for one or more users within the ESP; and (b) define a second set of emergency data fields that is accessible by any ESP user associated with the second role, wherein the first set of emergency data fields and the second set of emergency data fields comprise different sets of emergency data fields. In some embodiments, the second set of emergency data fields is defined from a plurality of emergency data fields. In some embodiments, the first set of emergency data fields is defined from a plurality of emergency data fields. In some embodiments, the first set of emergency data fields is defined using one or more emergency data categories, wherein each emergency data category comprises two or more emergency data fields. In some embodiments: (a) the emergency data request comprises one or more tags indicative of the first set of emergency data categories; and (b) the emergency management system is further configured to determine the first set of emergency data categories using the one or more tags. In some embodiments, the emergency response application is further configured to: (a) detect the emergency alert when the emergency alert is received by the ESP; and (b) autonomously generate the emergency data request in response to detecting the emergency alert. In some embodiments, the emergency response application is further configured to generate the emergency data request in response to user input at the emergency response application. In some embodiments, the management portal further comprises a graphical user interface shown on a display of the computing system on which the management portal is implemented, and wherein the management portal is further configured to: (a) display the plurality of emergency data fields or a plurality of emergency data categories on the display; and (b) receive choice of the set of emergency data fields or one or more emergency data categories comprising the set of emergency data fields from the plurality of emergency data fields or the plurality of emergency data categories by an administrator of the ESP through the graphical user interface. In some embodiments: (a) the emergency data request comprises one or more tags indicative of the first set of emergency data fields that is accessible to the ESP user associated with the first role; and (b) the emergency management system is further configured to determine the first set of emergency data fields that is accessible to the ESP user associated with the first role using the one or more tags. In some embodiments: (a) the emergency data request comprises an identifier of the first role; and (b) the emergency management system is further configured to determine the set of emergency data fields that is accessible to the ESP user associated with the first role by querying the management portal using the identifier of the first role. In some embodiments, the emergency response application is further configured to detect the emergency alert, wherein the emergency alert is generated by an electronic device and wherein the identifier associated with the emergency alert is a phone number associated with the electronic device. In some embodiments, the emergency alert is an emergency all made to the ESP by the electronic device. In some embodiments, the first set of emergency data fields that is accessible to the ESP user associated with the first role comprises location data, and wherein the emergency data associated with the emergency alert comprises a location. In some embodiments, the emergency management system is further configured to: (a) obtain a location associated with the emergency alert; (b) access a geofence associated with the ESP; and (c) determine if the location falls within the geofence associated with the ESP. In some embodiments, the emergency management system is further configured to: (a) obtain a location associated with the emergency alert; (b) access a geofence associated with the ESP; (c) determine if the location falls within the geofence associated with the ESP; and (d) gather the emergency data corresponding to the first set of emergency data fields and associated with the emergency alert only if the location is determined to fall within the geofence associated with the ESP. In some embodiments, the emergency management system further comprises a software module configured to ingest data from at least one electronic device associated with the emergency alert. In another aspect, disclosed herein is a non-transitory computer readable storage media encoded with a computer program including instructions executable by at least one processor for performing any of the steps implemented on the systems disclosed herein. In another aspect, disclosed herein is a method for managing access to emergency data for emergency service providers, the method comprising any of the steps implemented on the systems disclosed herein.

In another aspect, disclosed herein is a system for managing access to emergency data for emergency service providers, the system comprising: (a) a management portal implemented as one or more software modules on a computing system comprising a processor and a non-transitory computer readable storage medium and configured to: (i) establish a first role that can be selected for one or more users within an ESP; and (ii) define a first set of emergency data fields that is accessible by an ESP user associated with the first role; and (b) the emergency management system, implemented as one or more software modules on a cloud computing system comprising a processor and a non-transitory computer readable storage medium and configured to: (i) receive an emergency data request comprising an identifier associated with an emergency alert from an account of an ESP user associated with the first role at the ESP; (ii) gather, using the identifier associated with the emergency alert, emergency data corresponding to the first set of emergency data fields and associated with the emergency alert; and (iii) securely transmit the emergency data to the ESP for display on a computing system. In some embodiments, the management portal is further configured to: (a) establish a second role that can be selected for one or more users within the ESP; and (b) define a second set of emergency data fields that is accessible by any ESP user associated with the second role, wherein the first set of emergency data fields and the second set of emergency data fields comprise different sets of emergency data fields. In some embodiments, the second set of emergency data fields is defined from a plurality of emergency data fields. In some embodiments, the first set of emergency data fields is defined from a plurality of emergency data fields. In some embodiments, the first set of emergency data fields is defined using one or more emergency data categories, wherein each emergency data category comprises two or more emergency data fields. In some embodiments: (a) the emergency data request comprises one or more tags indicative of the first set of emergency data categories; and (b) the emergency management system is further configured to determine the first set of emergency data categories using the one or more tags. In some embodiments, the emergency response application is further configured to: (a) detect the emergency alert when the emergency alert is received by the ESP; and (b) autonomously generate the emergency data request in response to detecting the emergency alert. In some embodiments, the emergency response application is further configured to generate the emergency data request in response to user input at the emergency response application. In some embodiments, the management portal further comprises a graphical user interface shown on a display of the computing system on which the management portal is implemented, and wherein the management portal is further configured to: (a) display the plurality of emergency data fields or a plurality of emergency data categories on the display; and (b) receive choice of the set of emergency data fields or one or more emergency data categories comprising the set of emergency data fields from the plurality of emergency data fields or the plurality of emergency data categories by an administrator of the ESP through the graphical user interface. In some embodiments: (a) the emergency data request comprises one or more tags indicative of the first set of emergency data fields that is accessible to the ESP user associated with the first role; and (b) the emergency management system is further configured to determine the first set of emergency data fields that is accessible to the ESP user associated with the first role using the one or more tags. In some embodiments: (a) the emergency data request comprises an identifier of the first role; and (b) the emergency management system is further configured to determine the set of emergency data fields that is accessible to the ESP user associated with the first role by querying the management portal using the identifier of the first role. In some embodiments, the emergency response application is further configured to detect the emergency alert, wherein the emergency alert is generated by an electronic device and wherein the identifier associated with the emergency alert is a phone number associated with the electronic device. In some embodiments, the emergency alert is an emergency all made to the ESP by the electronic device. In some embodiments, the first set of emergency data fields that is accessible to the ESP user associated with the first role comprises location data, and wherein the emergency data associated with the emergency alert comprises a location. In some embodiments, the emergency management system is further configured to: (a) obtain a location associated with the emergency alert; (b) access a geofence associated with the ESP; and (c) determine if the location falls within the geofence associated with the ESP. In some embodiments, the emergency management system is further configured to: (a) obtain a location associated with the emergency alert; (b) access a geofence associated with the ESP; (c) determine if the location falls within the geofence associated with the ESP; and (d) gather the emergency data corresponding to the first set of emergency data fields and associated with the emergency alert only if the location is determined to fall within the geofence associated with the ESP. In some embodiments, the emergency management system further comprises a software module configured to ingest data from at least one electronic device associated with the emergency alert. In another aspect, disclosed herein is a non-transitory computer readable storage media encoded with a computer program including instructions executable by at least one processor for performing any of the steps implemented on the systems disclosed herein. In another aspect, disclosed herein is a method for managing access to emergency data for emergency service providers, the method comprising any of the steps implemented on the systems disclosed herein.

In another aspect, disclosed herein is a system for managing access to emergency data for emergency service providers, the system comprising: (a) a management portal implemented as one or more software modules on a computing system comprising a processor and a non-transitory computer readable storage medium and configured to: (i) establish a first role that can be selected for one or more users within an ESP; and (ii) define a first set of emergency data fields that is accessible by an ESP user associated with the first role; (b) an emergency response application implemented as one or more software modules on a computing system comprising a processor, a display, and a non-transitory computer readable storage medium and configured to: (i) log the ESP user associated with the first role into the emergency response application; (ii) generate an emergency data request comprising an identifier associated with an emergency alert; and (iii) transmit the emergency data request to an emergency management system; and (c) the emergency management system, implemented as one or more software modules on a cloud computing system comprising a processor and a non-transitory computer readable storage medium and configured to: (i) receive the emergency alert, wherein the emergency alert comprises a location; (ii) access a geofence associated with the ESP; (iii) determine if the location falls within the geofence associated with the ESP; (iv) receive the emergency data request from the emergency response application; (v) based upon a determination that the location falls within the geofence associated with the ESP, gather, using the identifier associated with the emergency alert, emergency data corresponding to the first set of emergency data fields and associated with the emergency alert; and (vi) securely transmit the emergency data to the emergency response application for display at the computing system. In some embodiments, the management portal is further configured to: (a) establish a second role that can be selected for one or more users within the ESP; and (b) define a second set of emergency data fields that is accessible by any ESP user associated with the second role, wherein the first set of emergency data fields and the second set of emergency data fields comprise different sets of emergency data fields. In some embodiments, the second set of emergency data fields is defined from a plurality of emergency data fields. In some embodiments, the first set of emergency data fields is defined from a plurality of emergency data fields. In some embodiments, the first set of emergency data fields is defined using one or more emergency data categories, wherein each emergency data category comprises two or more emergency data fields. In some embodiments: (a) the emergency data request comprises one or more tags indicative of the first set of emergency data categories; and (b) the emergency management system is further configured to determine the first set of emergency data categories using the one or more tags. In some embodiments, the emergency response application is further configured to: (a) detect the emergency alert when the emergency alert is received by the ESP; and (b) autonomously generate the emergency data request in response to detecting the emergency alert. In some embodiments, the emergency response application is further configured to generate the emergency data request in response to user input at the emergency response application. In some embodiments, the management portal further comprises a graphical user interface shown on a display of the computing system on which the management portal is implemented, and wherein the management portal is further configured to: (a) display the plurality of emergency data fields or a plurality of emergency data categories on the display; and (b) receive choice of the set of emergency data fields or one or more emergency data categories comprising the set of emergency data fields from the plurality of emergency data fields or the plurality of emergency data categories by an administrator of the ESP through the graphical user interface. In some embodiments: (a) the emergency data request comprises one or more tags indicative of the first set of emergency data fields that is accessible to the ESP user associated with the first role; and (b) the emergency management system is further configured to determine the first set of emergency data fields that is accessible to the ESP user associated with the first role using the one or more tags. In some embodiments: (a) the emergency data request comprises an identifier of the first role; and (b) the emergency management system is further configured to determine the set of emergency data fields that is accessible to the ESP user associated with the first role by querying the management portal using the identifier of the first role. In some embodiments, the emergency response application is further configured to detect the emergency alert, wherein the emergency alert is generated by an electronic device and wherein the identifier associated with the emergency alert is a phone number associated with the electronic device. In some embodiments, the emergency alert is an emergency all made to the ESP by the electronic device. In some embodiments, the first set of emergency data fields that is accessible to the ESP user associated with the first role comprises location data, and wherein the emergency data associated with the emergency alert comprises a location. In some embodiments, the emergency management system is further configured to: (a) obtain a location associated with the emergency alert; (b) access a geofence associated with the ESP; and (c) determine if the location falls within the geofence associated with the ESP. In some embodiments, the emergency management system is further configured to: (a) obtain a location associated with the emergency alert; (b) access a geofence associated with the ESP; (c) determine if the location falls within the geofence associated with the ESP; and (d) gather the emergency data corresponding to the first set of emergency data fields and associated with the emergency alert only if the location is determined to fall within the geofence associated with the ESP. In some embodiments, the emergency management system further comprises a software module configured to ingest data from at least one electronic device associated with the emergency alert. In another aspect, disclosed herein is a non-transitory computer readable storage media encoded with a computer program including instructions executable by at least one processor for performing any of the steps implemented on the systems disclosed herein. In another aspect, disclosed herein is a method for managing access to emergency data for emergency service providers, the method comprising any of the steps implemented on the systems disclosed herein.

BRIEF DESCRIPTION OF THE DRAWINGS

The novel features of the present invention of the instant application are set forth with particularity in the appended claims. A better understanding of the features and advantages of the present invention will be obtained by reference to the following detailed description that sets forth illustrative embodiments, in which the principles of the present invention are utilized, and the accompanying drawings of which:

DETAILED DESCRIPTION

Figure 1A:
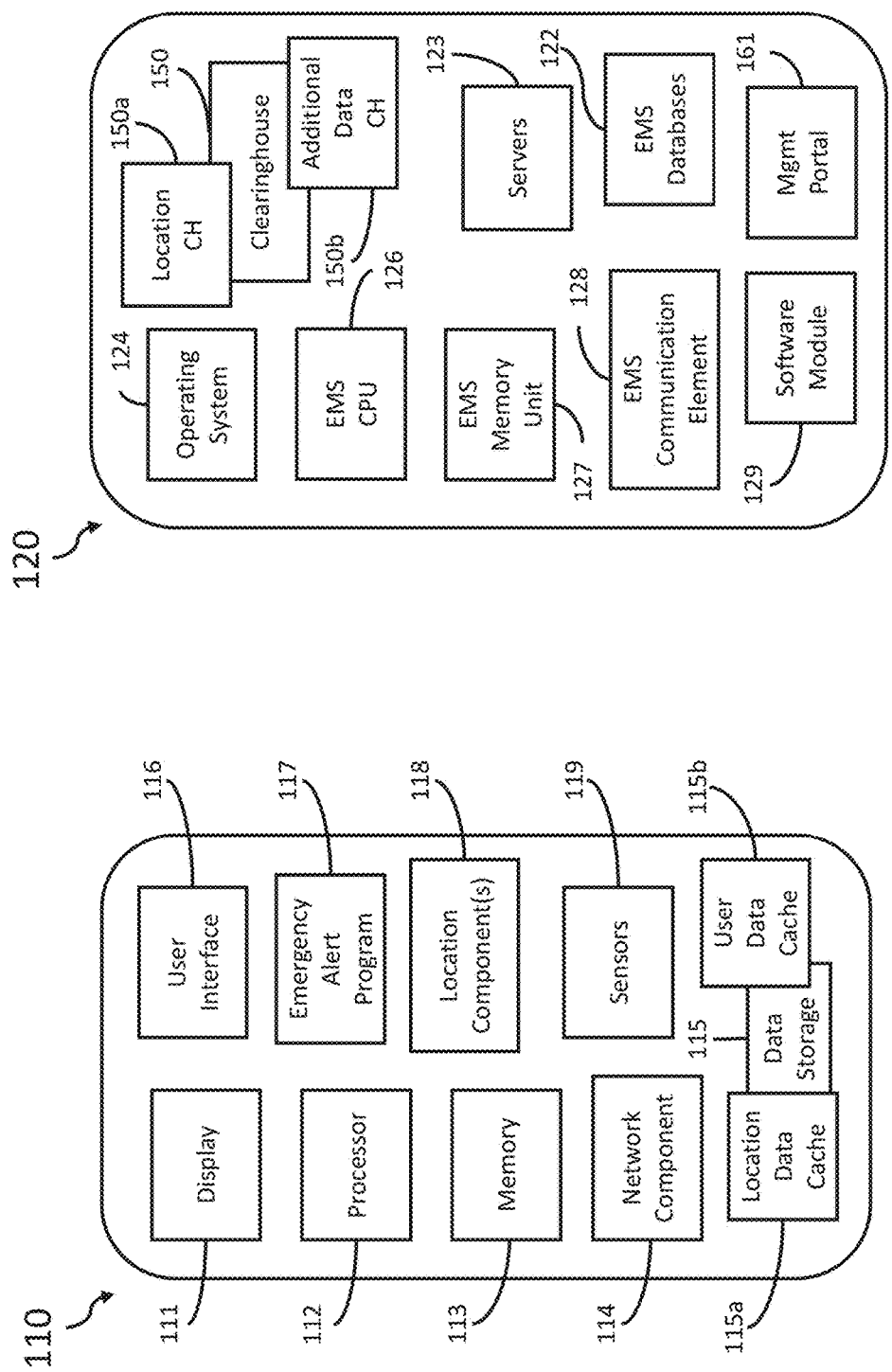
FIG. 1A depicts diagrams of an electronic device and an emergency management system (EMS) in accordance with one embodiment.

Disclosed herein are systems, devices, media, and methods for providing enhanced emergency communications. Embodiments of the present disclosure take advantage of technological advancements that have allowed for mobile communication devices to generate accurate locations by incorporating multiple technologies embedded in the devices, such as GPS, Wi-Fi, and Bluetooth, to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls.

Furthermore, mobile communication devices (e.g., mobile phones, wearables, IoT devices, smart home, vehicle computers, etc.) are capable of generating or storing additional information that may be useful in responding to emergency situations, such as health data or medical histories. For example, during an emergency, a modern mobile communication device may have access to an implicated person's blood type, preexisting medical conditions, or even the implicated person's current heartrate. In some embodiments, the mobile communication device has access to data from sensors (e.g., health or environmental sensors). For example, a video feed of the emergency via a connected surveillance camera provides valuable situational awareness regarding the emergency.

In another aspect, disclosed herein is a system for managing access to emergency data for emergency service providers, the system comprising: (a) a management portal implemented as one or more software modules on a computing system comprising a processor and a non-transitory computer readable storage medium and configured to: (i) establish a first role that can be selected for one or more users within an ESP; and (ii) define a first set of emergency data fields that is accessible by an ESP user associated with the first role; and (b) an emergency response application implemented as one or more software modules on a computing system comprising a processor, a display, and a non-transitory computer readable storage medium and configured to: (i) log the ESP user associated with the first role into the emergency response application; (ii) generate an emergency data request comprising an identifier associated with an emergency alert; (iii) transmit the emergency data request to an emergency management system; (iv) receive emergency data corresponding to the first set of emergency data fields and associated with the emergency alert; and (v) display the emergency data on the computing system. In another aspect, disclosed herein is a non-transitory computer readable storage media encoded with a computer program including instructions executable by at least one processor for performing any of the steps implemented on the systems disclosed herein. In another aspect, disclosed herein is a method for managing access to emergency data for emergency service providers, the method comprising any of the steps implemented on the systems disclosed herein.

In another aspect, disclosed herein is a system for managing access to emergency data for emergency service providers, the system comprising: (a) a management portal implemented as one or more software modules on a computing system comprising a processor and a non-transitory computer readable storage medium and configured to: (i) establish a first role that can be selected for one or more users within an ESP; and (ii) define a first set of emergency data fields that is accessible by an ESP user associated with the first role; and (b) the emergency management system, implemented as one or more software modules on a cloud computing system comprising a processor and a non-transitory computer readable storage medium and configured to: (i) receive an emergency data request comprising an identifier associated with an emergency alert from an account of an ESP user associated with the first role at the ESP; (ii) gather, using the identifier associated with the emergency alert, emergency data corresponding to the first set of emergency data fields and associated with the emergency alert; and (iii) securely transmit the emergency data to the ESP for display on a computing system. In another aspect, disclosed herein is a non-transitory computer readable storage media encoded with a computer program including instructions executable by at least one processor for performing any of the steps implemented on the systems disclosed herein. In another aspect, disclosed herein is a method for managing access to emergency data for emergency service providers, the method comprising any of the steps implemented on the systems disclosed herein.

In another aspect, disclosed herein is a system for managing access to emergency data for emergency service providers, the system comprising: (a) a management portal implemented as one or more software modules on a computing system comprising a processor and a non-transitory computer readable storage medium and configured to: (i) establish a first role that can be selected for one or more users within an ESP; and (ii) define a first set of emergency data fields that is accessible by an ESP user associated with the first role; (b) an emergency response application implemented as one or more software modules on a computing system comprising a processor, a display, and a non-transitory computer readable storage medium and configured to: (i) log the ESP user associated with the first role into the emergency response application; (ii) generate an emergency data request comprising an identifier associated with an emergency alert; and (iii) transmit the emergency data request to an emergency management system; and (c) the emergency management system, implemented as one or more software modules on a cloud computing system comprising a processor and a non-transitory computer readable storage medium and configured to: (i) receive the emergency alert, wherein the emergency alert comprises a location; (ii) access a geofence associated with the ESP; (iii) determine if the location falls within the geofence associated with the ESP; (iv) receive the emergency data request from the emergency response application; (v) based upon a determination that the location falls within the geofence associated with the ESP, gather, using the identifier associated with the emergency alert, emergency data corresponding to the first set of emergency data fields and associated with the emergency alert; and (vi) securely transmit the emergency data to the emergency response application for display at the computing system. In another aspect, disclosed herein is a non-transitory computer readable storage media encoded with a computer program including instructions executable by at least one processor for performing any of the steps implemented on the systems disclosed herein. In another aspect, disclosed herein is a method for managing access to emergency data for emergency service providers, the method comprising any of the steps implemented on the systems disclosed herein.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, an "electronic device" is a digital processing device designed with one or more functionalities such as, for example, a communication device. A "triggering device" refers to an electronic device with a communication component, which will allow it to send and receive information over a wireless channel, a wired channel, or any combination thereof (e.g., sending/receiving information over the Internet). Examples of triggering devices include a mobile phone (e.g., a smartphone), a laptop, a desktop, a tablet, a radio (e.g., a two-way radio), and a vehicular communication system. In some embodiments, a triggering device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a triggering device is an Internet of Things (IoT) device. In some embodiments, the triggering device is a sensor for sensing environmental or health indicators. In some embodiments, the sensor includes a sensing component and a communication component. In some embodiments, the triggering device is a sensor in a sensor network or a device that controls a sensor network. In some embodiments, the triggering device is a physical panic button or software "panic" button.

In some embodiments, a triggering device is a wearable device (e.g., a communication device worn by a user, such as an Apple Watch). In some embodiments, a triggering device (e.g., a wearable device) comprises one or more sensors. The one or more sensors optionally include, but are not limited to: a gyroscope, an accelerometer, a thermometer, a heart rate sensor, a barometer, or a hematology analyzer. As used herein, a "mobile wireless device" refers to a device that is portable and communicates wirelessly. In some embodiments, a user wears or carries the mobile wireless device on the user's person or in the user's vehicle. Examples of mobile wireless devices include mobile or cellular phones, wearable devices (e.g., smart watch, fitness tracker, wearable sensor, smart glasses, etc.).

As used herein, an "associated device" refers to a communication device that is associated with an electronic device. For example, a user is using several communication devices such as a mobile phone, a wearable, a home security system, a car computer. The user has registered these devices with his or her account(s) and linked these devices with a user name, user number(s), email address(es), home or other physical address(es). In some embodiments, associated devices include communication devices of at least one additional user who is associated with user, e.g., a husband and wife, a father and son, a patient and doctor, friends, work colleagues, etc. In some cases, the user has added the second user as an emergency contact, a primary contact, a secondary contact, or a member of a group (e.g., part of the same club, organization, or workplace). In some cases, user has agreed to share location and other data with the second user. In some embodiments, the second user is someone who is frequently contacted by the user and the communication device identifies the second user from the "Recently called" or "Frequently called" list. In some embodiments, the associated devices are devices that are proximal or near-by to the triggering device such as obtained through a Wi-Fi scan. In some embodiments, an associated device is proximal to the triggering device when the location of the associated device is within 1, 5, 10, 15, 20, 25, 30, 35, 40, 45, 50, 60, 70, 80, 90, 100, 200, 300, 400, or 500 meters of the location of the triggering device, including increments therein.

As used herein, the "list of associated devices" refers to a list of communication devices that are associated with the user or the triggering device (e.g., a second resident in a smart home). The associated devices are optionally listed by user name, phone number, email address, physical address, coordinates etc. The device entry in the list optionally comprises phone number, email address, physical address, coordinates, BSSID, SSID or MAC address. The list is optionally user-defined or generated by the device or the EMS. An entry in the list of associated devices may also be referred to as an account associated with the user.

As used herein, an "emergency alert" refers to a communication relating to an emergency or non-emergency situation. In some embodiments, an emergency alert is an emergency request for assistance (e.g., the request is associated with an emergency situation). In some embodiments, an emergency alert comprises an emergency indication. In further embodiments, an emergency indication is selected from one or more of the group consisting of traffic accident, police emergency, medical emergency, and fire emergency. In some embodiments, an emergency alert is associated with a non-emergency situation (e.g., request for a tow truck after car breaks down). In some embodiments, an emergency alert is associated with a device sending the alert. In other embodiments, an emergency alert is associated with a device not sending the alert (e.g., a proxy request on behalf of a second device and/or a member device in a group of devices). As used herein, an emergency alert is "associated" with a device or user when the emergency alert relates to an emergency or non-emergency situation involving the device or user. In some embodiments, an emergency alert comprises data associated with a device (or user thereof). In some embodiments, an emergency alert comprises data associated with an electronic device sending the alert or another device. For example, in some embodiments, an emergency alert comprises data associated with a device, wherein the data set comprises current and/or past location data. In another example, the data set comprises current and/or past health data associated with the user of an electronic device. In other embodiments, an emergency alert is sent and/or received separately from data associated with a device. For example, in some embodiments, an alert is sent first, and the recipient subsequently queries the device that sent the alert for data associated with the emergency and/or device or user involved in the emergency as part of an emergency flow script.

As used herein, a "first responder" refers to any person or persons responsible for addressing an emergency situation. A first responder is optionally referred to as an "emergency responder." In some embodiments, a first responder refers to government personnel responsible for addressing an emergency situation. In some embodiments, a first responder is responsible for a particular jurisdiction (e.g., a municipality, a township, a county, etc.). In some embodiments, a first responder is assigned to an emergency by an emergency dispatch center (hereinafter, "EDC"). In some embodiments, a first responder responds to a request for emergency assistance placed by a user via a user communication device. In some embodiments, a first responder includes one or more firefighters, police officers, emergency medical personnel, community volunteers, private security, security personnel at a university, or other persons employed to protect and serve the public and/or certain subsets of the population.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when the request for assistance pertains to an emergency (e.g., a tier 2 emergency). In some embodiments, a recipient is an emergency management system. In some embodiments, a recipient is an emergency dispatch center (e.g., a public safety answering point or PSAP). In some embodiments, a recipient is an emergency dispatch center, wherein the request is first routed through an emergency management system (e.g., request is sent to the EMS, but ultimately is sent to an EDC). In some embodiments, a recipient is a dispatcher or call taker associated with a particular ESP such as a PSAP. In some embodiments, the recipient is located on-site at the ESP (e.g., PSAP station) or is working remotely (e.g., at home). In some embodiments, a recipient is a first responder (e.g., a communication device of a first responder). In some embodiments, a recipient is an associated device of a user or an account associated with the user. In some embodiments, a recipient is a non-emergency service or personnel, for example, a relative or friend. In such situations, a user of a communication device (or member device or second device) does not require emergency assistance, but does need help.

As used herein, a "user" refers to one or more person or persons associated with a system, server, or device (e.g., electronic device, member device, second device, device of a first responder, etc.). In some embodiments, a user is an administrator and/or authorized user who has authorization for generating or customizing an emergency flow script. In some embodiments, the administrator and/or authorized user works for or acts on behalf of an organization that utilizes the systems, servers, devices, methods, and media of the instant application for managing emergency communications. In some embodiments, the organization is a public or private organization. In some embodiments, the organization provides a transportation service (e.g., taxi company, ride-sharing company, shipping company, railroad company, etc.). In some embodiments, a user utilizes a device to send an emergency alert or request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person such as a user. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by an emergency situation. As an example, two unrelated users are involved in a vehicular collision, and each user sends a separate emergency alert (for traffic accident) using his/her communication device. In this example, the separate emergency alerts are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location data from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, an "emergency data field" or "data field" is an individual data type that can be received, stored, or shared by an emergency management system. In some embodiments, emergency data fields include individual types of health data, user data, or sensor data, as described above. For example, emergency data fields may include, but are not limited to, name, age, gender, height, weight, ethnicity, heart rate, home address, work address, current location, historical locations, phone number, email address, vehicle color, vehicle model, license plate number, or emergency contacts.

In some embodiments, a data field may be selected or deselected by an administrator. In some embodiments, some data fields are anchor data fields that cannot be deselected (e.g., lat-lon) because it is considered to be critical information that should always be accessible. In some embodiments, data fields come with default settings (selected or deselected), which may be customized by an ESP administrator.

As used herein an "emergency data category" or "data category" is a logical grouping of one or more emergency data fields. For example, in some embodiments, Personal Information is an emergency data category that includes emergency data fields such as name, age, gender, height, weight, ethnicity, home address, and work address. In some embodiments, data received by the emergency management system is tagged with emergency data fields before the data is sent to the emergency management system. In some embodiments, data received by the emergency management system is tagged with emergency data fields by the emergency management system after the data is received. In some embodiments, data received by the emergency management system is tagged with emergency data fields and emergency data categories. In some embodiments, an emergency data field is associated with one or more emergency data categories within the emergency management system.

In some embodiments, a data category may be selected or deselected by an administrator. In some embodiments, some data categories are anchor data fields that cannot be deselected (e.g., location info in FIG. 5E) because it is considered to be critical information that should always be accessible. In some embodiments, data categories come with default settings (selected or deselected), which may be customized by an ESP administrator.

As used herein, a "role" is an indicator, a parameter, tag, identifier, or any functional equivalent, associated with an account that indicates a level of access to emergency data for the associated account. In some embodiments, a role is associated with one or more emergency data fields or emergency data categories. In some embodiments, a particular role may be associated with a plurality of different accounts at the same emergency service provider (ESP). For example, in some embodiments, an "Admin" (or "administrator") role may be associated with multiple accounts for multiple respective users at the same public safety answering point (PSAP). In some embodiments, a particular role may be associated with a plurality of different accounts across different ESPs. For example, in some embodiments, an "Agent" role may be associated with multiple accounts for multiple respective users at a first PSAP as well as multiple accounts for multiple respective users at a second PSAP. Different roles may represent different levels of access to emergency data. For example, an Admin role may have a higher level of access (e.g., access to more emergency data fields or emergency data categories) than an Agent role. In this way, roles may be used to control differential access to emergency data. In some embodiments, roles may be created, edited, or stored within a management portal, as described below.

As used herein, "communication link" refers to a communication pathway from a device (e.g., communication device) to another device or to an intermediate device (e.g., a router) such as over a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). In some embodiments, a communication link refers to the point-to-point communication channels, point-to-point and end-to-end data sessions, and/or the physical hardware facilitating the communication channel(s) (e.g., antennas used to communicate/transmit information). In some embodiments, a data session comprises session parameters and the network route taken from one device to another device.

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient (e.g., EMS, EDC, first responder, etc.).

Electronic Device Emergency Management System, and Emergency Service Provider

In certain embodiments, disclosed herein are devices, systems, and methods for managing emergency data for emergency response. FIG. 1A depicts diagrams of (i) an electronic device 110 and (ii) an emergency management system (EMS) 120 in accordance with one embodiment. In some embodiments, the electronic device 110 is a digital processing device such as a communication device (e.g., mobile or cellular phone, computer, laptop, etc.). In some embodiments, the electronic device is a wearable device (e.g., a smartwatch). In some embodiments, the electronic device is an Internet of Things (IoT) device, such as a home assistant (e.g., an Amazon Echo) or a connected smoke detector (e.g., a Nest Protect smoke and carbon monoxide alarm). In some embodiments, the electronic device is a walkie-talkie or two-way radio.

In some embodiments, the electronic device 110 includes a display 111, a processor 112, a memory 113 (e.g., an EPROM memory, a RAM, or a solid-state memory), a network component 114 (e.g., an antenna and associated components, Wi-Fi adapters, Bluetooth adapters, etc.), a data storage 115, a user interface 116, an emergency alert program 117, one or more location components 118, and one or more sensors 119. In some embodiments, the processor 112 is implemented as one or more microprocessors, microcomputers, microcontrollers, digital signal processors, central processing units, state machines, logic circuitries, and/or devices that manipulate signals based on operational instructions. Among other capabilities, the processor 112 is configured to fetch and execute computer-readable instructions stored in the memory 113.

In some embodiments, the display 111 is part of the user interface 116 (e.g., a touchscreen is both a display and a user interface in that it provides an interface to receive user input or user interactions). In some embodiments, the user interface 116 includes physical buttons such as an on/off button or volume buttons. In some embodiments, the display 111 and/or the user interface 116 comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage 115 includes a location data cache 115a and a user data cache 115b. In some embodiments, the location data cache 115a is configured to store locations generated by the one or more location components 118.

In some embodiments, the emergency alert program 117 is an emergency response application or emergency response mobile application. In some embodiments, the emergency alert program 117 is configured to record user data, such as a name, address, or medical data of a user associated with the electronic device 110. In some embodiments, the emergency alert program 117 is configured to detect when an emergency request is generated or sent by the electronic device 110 (e.g., when a user uses the electronic device 110 to make an emergency call). In some embodiments, in response to detecting an emergency request generated or sent by the electronic device 110, the emergency alert program is configured to deliver a notification to the EMS 120. In some embodiments, the notification is an HTTP post containing information regarding the emergency request. In some embodiments, the notification includes a location (e.g., a device-based hybrid location) generated by or for the electronic device 110. In some embodiments, in response to detecting an emergency request generated or sent by the electronic device 110, the emergency alert program is configured to deliver user data to the EMS 120.

In some embodiments, as depicted in FIG. 1A, the emergency management system (EMS) 120 includes an EMS operating system 124, an EMS CPU 126, an EMS memory unit 127, an EMS communication element 128, and one or more software modules 129. In some embodiments, the EMS CPU 126 is implemented as one or more microprocessors, microcomputers, microcontrollers, digital signal processors, central processing units, state machines, logic circuitries, and/or devices that manipulate signals based on operational instructions. Among other capabilities, the EMS CPU 126 is configured to fetch and execute computer-readable instructions stored in the EMS memory unit 127. The EMS memory unit 127 optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The EMS memory unit 127 optionally includes modules, routines, programs, objects, components, data structures, etc., which perform particular tasks or implement particular abstract data types.

In some embodiments, the EMS 120 includes one or more EMS databases 122, one or more servers 123, and a clearinghouse 150. In some embodiments, the clearinghouse 150, as described in further detail below, is an input/output (I/O) interface configured to manage communications and data transfers to and from the EMS 120 and external systems and devices. In some embodiments, the clearinghouse 150 includes a variety of software and hardware interfaces, for example, a web interface, a graphical user interface (GUI), and the like. The clearinghouse 150 optionally enables the EMS 120 to communicate with other computing devices, such as web servers and external data servers (not shown). In some embodiments, the clearinghouse 150 facilitates multiple communications within a wide variety of networks and protocol types, including wired networks, for example, LAN, cable, etc., and wireless networks, such as WLAN, cellular, or satellite. In some embodiments, the clearinghouse 150 includes one or more ports for connecting a number of devices to one another or to another server. In some embodiments, the clearinghouse 150 includes one or more sub-clearinghouses, such as location clearinghouse 150a and additional data clearinghouse 150b, configured to manage the transfer of locations and additional data, respectively. In some embodiments, the EMS 120 additionally includes an emergency data management portal 161 used to manage the retrieval of emergency data from the EMS 120, as described below.

Figure 1B:
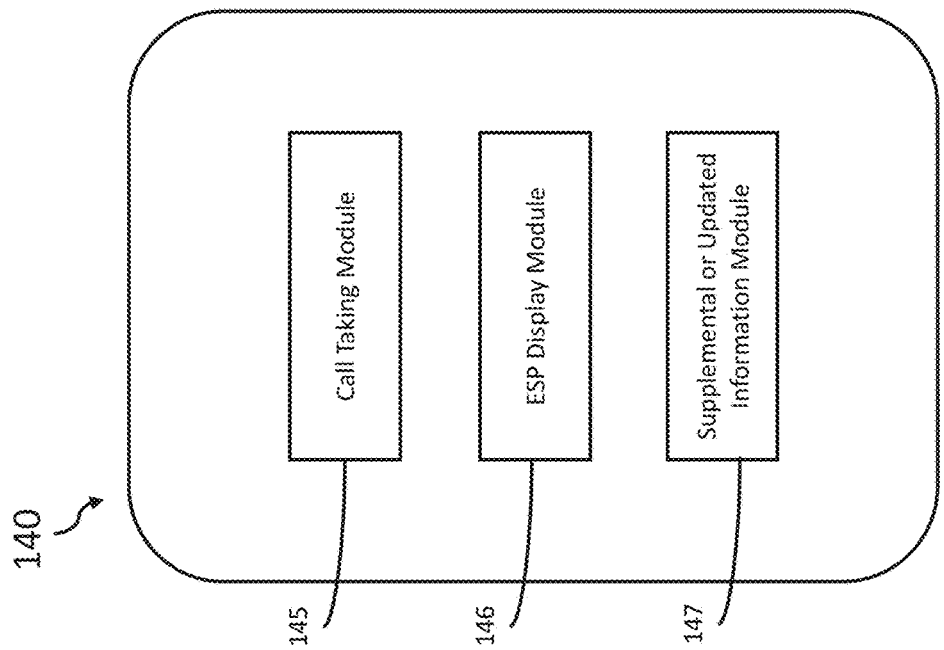
FIG. 1B depicts diagrams of an emergency service provider (ESP) system and ESP software in accordance with one embodiment.
Figure 1B:
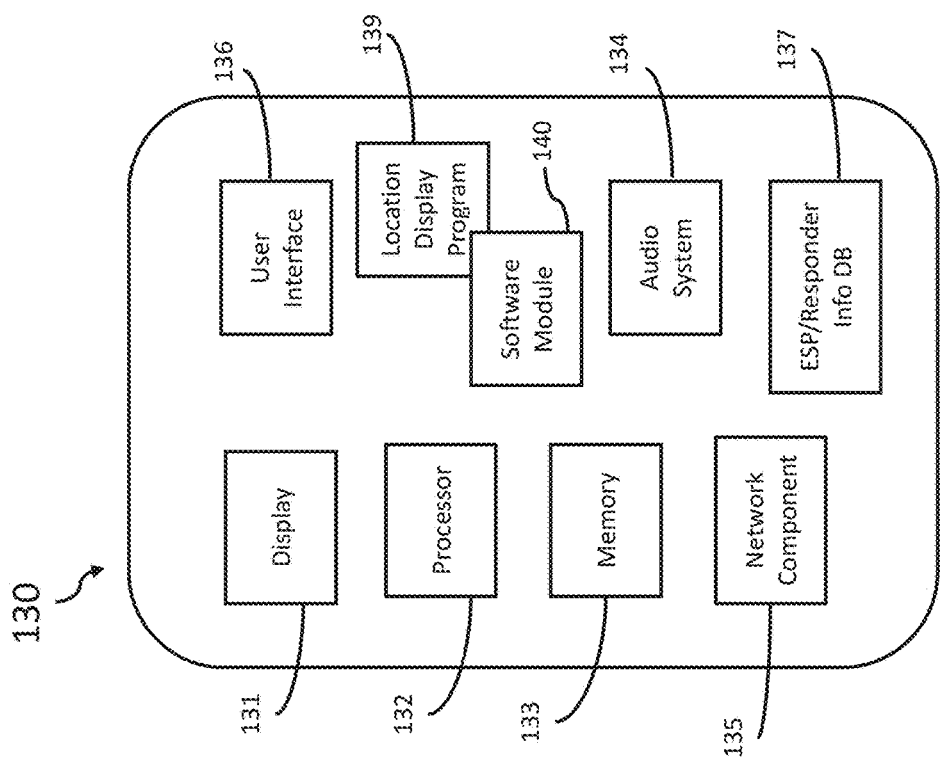

In some embodiments, as depicted in FIG. 1B, an ESP is a public safety answering point (PSAP) system 130 that includes one or more of a display 131, a user interface 136, at least one central processing unit or processor 132, a network component 135, an audio system 134 (e.g., microphone, speaker and/or a call-taking headset), and a computer program such as a PSAP Emergency Display Application or Location Display Program 139. In some embodiments, the PSAP application or program 139 comprises one or more software modules 140. In some embodiments, the PSAP system 130 comprises a database of emergency responders 137, such as medical assets, police assets, fire response assets, rescue assets, safety assets, etc.

In some embodiments, as depicted in FIG. 1B, the PSAP application or program 139 installed on a PSAP system 130 comprising a software module 140 is a call taking module 145, an ESP display module 146, a supplemental or updated information module 147, or a combination thereof. In some embodiments, the PSAP application 139 displays the information on a map (e.g., on the display 131). In some embodiments, location and supplemental information is displayed for emergency service providers (e.g., police, fire, medical, etc.) and/or responders on their devices. It is contemplated that responder devices have optionally installed a responder device program (not shown) similar to PSAP display module 146. In some embodiments, the responder device program displays the emergency location on a map.

Emergency Clearinghouse

In some embodiments, as described above, the emergency management system (EMS) 120 includes a clearinghouse 150 (also referred to as an "Emergency Clearinghouse") for storing and retrieving emergency data. In some embodiments, the clearinghouse 150 includes a location clearinghouse 150a and an additional data clearinghouse 150b. In other embodiments, additional data and location data (e.g., emergency data) are stored in one or more databases in a distributed manner. In some embodiments, the emergency data is stored in an external or third-party server that is accessible to the EMS 120. The clearinghouse 150 optionally functions as an interface that receives and stores emergency data from electronic or communication devices that are then retrieved, transmitted, and/or distributed to recipients (e.g., emergency personnel) before, during, or after emergencies. As described above, the clearinghouse optionally receives emergency data from electronic or communication devices such as mobile phones, wearable devices, laptop or desktop computers, personal assistants, intelligent vehicle systems, home security systems, IoT devices, camera feeds, and other sources. As described above and below, emergency data optionally consists of locations or additional data such as medical history, personal information, or contact information. In some embodiments, during an emergency, an emergency service provider ESP (e.g., a public safety answering point (PSAP)) queries the clearinghouse 150 for emergency data pertaining to an emergency. The clearinghouse 150 then identifies the emergency and any emergency data pertaining to the emergency stored within the clearinghouse 150 and transmits the pertinent emergency data to the requesting ESP. Accordingly, in some embodiments, the clearinghouse 150 acts as a data pipeline for ESPs otherwise without access to emergency data that is critical to most effectively and efficiently responding to an emergency. Accordingly, location data stored within the clearinghouse 150 allows emergency responders to arrive at the scene of an emergency faster, and additional data stored within the clearinghouse 150 allows emergency responders to be better prepared for the emergencies they face.

For example, in one embodiment, an emergency alert is triggered by an electronic device 110 (e.g., by pressing a soft button, a physical button, voice command, or gesture) or autonomously based on sensor data (e.g., smoke alarms). In this example, the user then confirms the emergency and/or provides authorization for sending the emergency alert. Emergency data, such as an enhanced location and additional data regarding the user (e.g., the user's medical history) is delivered by the electronic device 110 to the EMS 120 and stored in the clearinghouse 150 (e.g., in the location clearinghouse 150a and the additional data clearinghouse 150b). In some embodiments, the EMS 120 or clearinghouse 150 formats the emergency data into a format that is compatible with industry standards for storing and sharing emergency data. For example, the emergency data is formatted to be compatible with National Emergency Number Association (NENA) standards. A requesting party (such as an ESP responding to the emergency alert) then queries the clearinghouse 150 with an emergency data request (such as a HTTP GET request). In some embodiments, the emergency data request is in the form of the Location Information Server (LIS) protocol. In response to the emergency data request, the EMS 120 or clearinghouse 150 sends an appropriate response including relevant emergency data to the requesting party via an encrypted pathway. In some embodiments, the emergency data request is in the form of HTTP-Enabled Location Delivery (HELD) and the response from the EMS 120 or clearinghouse 150 is in the form of Presence Information Data Format Location Object (PIDF-LO). In some embodiments, the emergency data request includes an authorization code (also referred to as an "authorization token") in the body, header, or metadata of the request, and the EMS 120 checks that the authorization code is active before providing a response to the requesting party. In some embodiments, authorization is provided in the "Authorization" header of the emergency data request using HTTP Basic Authentication. For example, in some embodiments, authorization is base 64-encoded user name and password for an account associated with the requesting party.

In some embodiments, as described below, the appropriate response to an emergency data request from a requesting party (e.g., an ESP) is determined by an emergency data management portal 161 (also referred to as a "management portal"). In some embodiments, the emergency data request includes credentials or an access key associated with the requesting party, and consults the management portal to determine an appropriate response (e.g., which categories of emergency data should be sent) based on the credentials or access key associated with the requesting party. In some embodiments, emergency data requests are sent over public networks using API access keys or credentials. In some embodiments, Transport Layer Security (TLS) is used in the requests and responses from the EMS 120 for encryption security. In some embodiments, the call taking module 145 includes a call-handling application, which is provided by a third-party vendor. In some embodiments, the call taking module 145 or call handling-application is an emergency response application. In some embodiments, the call taking module 145 or call-handling application is an emergency response application that does not include a management portal or an enhanced data display. In some embodiments, in which an emergency response application does not include a management portal or an enhanced data display, the management portal or enhanced data display can be accessed through an internet browser, either within or outside of the emergency response application. In some embodiments, an ESP personnel interacts with the call-handling application to send an emergency data request to the EMS 120. In some embodiments, the response from the EMS 120 is displayed at the ESP display 131.

In some embodiments, an emergency alert or the electronic device 110 from which the emergency alert was generated is associated with a phone number. A request from a requesting party for a location of an electronic device 110 associated with the phone number "+1-555-555-5555" is shown below. Although not shown, credentials or an access key associated with the requesting party are optionally provided in the header of the request (which is optionally encrypted for security).

```
<?xml version="1.0"?>
<locationRequest xmlns="urn:ietf:params:xml:ns:geopriv:held">
<locationraType exact="false">
 any
</locationType>
<device xmlns="urn:ietf:params:xml:ns:geopriv:held:id">
 <uri>tel:+15555555555</uri>
</device>
</locationRequest>
```

An example of a LIS response from the EMS 120 in a standard format compatible with industry standards, PIDF-LO, is shown below. If the request includes an inactive or expired credential or access key, an error response will be generated.

```
<?xml version="1.0" encoding="utf-8"?>
<held:locationResponse xmlns:gbp="urn:ietf:params:xml:ns:pidf:
geopriv10:basicPolicy"
 xmlns:gp="urn:ietf:params:xml:ns:pidf:geopriv10"
 xmlns:gs="http://www.opengis.net/pidflo/1.0"
 xmlns:pidf="urn:ietf:params:xml:ns:pidf"
 xmlns:gml="http://www.opengis.net/gml"
 xmlns:held="urn:ietf:params:xml:ns:geopriv:held">
  <held:locationUriSet expires="2016-11-10 01:31:21.123713">
   <held:locationURI>
   https://api-sandbox.rapidsos.com/v1/loca-
tion/lbyr/?ref=c786f6b9-5e06-4611-a1c9-fbf9333e5652
   </held:locationURI>
  </held:locationUriSet>
  <pidf:presence entity="tel:+15555555555">
   <pidf:tuple id="vcefda6f4-ec1c-4721-9f41-225d5ff38c09">
    <pidf:status>
     <gp:geopriv>
      <gp:location-info>
       <gs:Circle>
        <gml:pos>37.4219983 -122.084</gml:pos>
        <gs:radius uom="urn:ogc:def:uom:EPSG::9001">
         20.0</gs:radius>
       </gs:Circle>
       <ca:civicAddress xml:lang="en">
        <ca:A1>CA</ca:A1>
        <ca:A3>Mountain View</ca:A3>
        <ca:RD>Amphitheatre</ca:RD>
        <ca:STS>Pkwy</ca:STS>
        <ca:HNO>1600</ca:HNO>
        <ca:PC>94043</ca:PC>
```

-continued

```
        <ca:BLD>Google Bldg 40</ca:BLD>
       </ca:civicAddress>
      </gp:location-info>
      <gp:usage-rules>
       <gbp:retransmission-allowed>
       false</gbp:retransmission-allowed>
      </gp:usage-rules>
     </gp:geopriv>
    </pidf:status>
    <pidf:timestamp>
    2016-09-15T23:59:46.778000+00:00
    </pidf:timestamp>
   </pidf:tuple>
  </pidf:presence>
</held:locationResponse>
```

In some embodiments, as described above, emergency data includes locations and additional data. In some embodiments, emergency data includes one or more emergency data fields (also referred to as "data fields"). In some embodiments, the emergency data fields include: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. In some embodiments, emergency data fields are tagged with tags for specific types of data such as "demographics" or "medical data." For example, in some embodiments, gender, height, weight, ethnicity, profile picture (image-url) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted. In some embodiments, as described below, emergency data fields with common tags are grouped into emergency data categories. For example, in some embodiments, all emergency data fields tagged as demographic data (e.g., gender, height, weight, ethnicity, etc.) are grouped into a "demographics" emergency data category. In some embodiments, an emergency data category includes a plurality of emergency data fields. In some embodiments, an emergency data category includes only a single emergency data field.

An example of an emergency data request for additional data from a requesting party for an electronic device 110 associated with the phone number "+1-777-999-7777" is shown below. Although not shown, credentials or an access key associated with the requesting party are optionally provided in the header of the request.

http://api-demo.rapidsos.com/v1/adr/
?caller_id=17779997777&section=device_info

An example of a response to an additional data response from the EMS 120 in a standard format compatible with industry standards, PIDF-LO, is shown below. In some embodiments, if the request includes an inactive or expired access key or set of credentials, an error response will be generated.

HTTP/1.1 200 OK
Date: Tue, 1 Dec. 2016 23:27:30 GMT
Content-Length: 489

Content-Type: application/EmergencyCallData.DeviceInfo+xml
<dev:EmergencyCallData.DeviceInfo
xmlns:dev="urn:ietf:params:xml:ns:EmergencyCallData:DeviceInfo">
<dev:DataProviderReference>
d4b3072df.201409182208075@example.org In some embodiments, when the emergency data is stored at a third-party server and receives a request for emergency data from the EMS 120, as a database query, the third-party server formats the requested emergency data and stores this information in an alternate database, and forwards either a response or a reference to the alternate database for accessing the emergency data requested by the EMS 120, which is provided to the PSAP 130 over a hybrid analog and/or a data communication channel, depending on the capabilities of PSAP 130. In some embodiments, the third-party server stores the emergency data, requested by the EMS 120 or directly by the PSAP 130, in the alternate database for a certain period of time after receiving the request for the emergency data regarding a user and any electronic devices 110. In some embodiments, this period of time is a timer value (e.g., a timer countdown or a set time point) defined by the EMS 120 and the third-party server in conjunction with each other prior to the addition of the requested emergency data to the alternate database at the third-party server. In some embodiments, once the timer value has passed and no new requests for the emergency data pertaining to the particular user and the electronic device 110, or other devices associated with the user, are received by the third-party server, then the third-party server marks the particular alternate database entries to be deleted and waits for another, different, time-out interval. In some embodiments, once this particular second time-out interval has also been completed and no new requests for location data for the particular user or associated electronic devices 110 are received by the third-party server, the third-party server removes the specific marked entries from the alternate database in the next cycle of updates for the alternate database. In some embodiments, after adding the emergency data in the alternate database by the third-party server, the third-party server keeps updating the emergency data in the alternate database on a periodic, or as-needed basis, for the purpose of keeping the emergency data about the user or electronic device 110 current for providing the most recent and accurate emergency data to the EMS 120 and the PSAP 130 for the purposes of responding to a request for emergency assistance. In some embodiments, the third-party server is updated by the EMS 120 for all the emergency data pertaining to all users and their associated electronic devices 110 that are served by the EMS 120 at any current time.

In some non-emergency situations, there is a need to access location data, user data, emergency data or sensor data. For example, in some embodiments, a user of an electronic device 110 grants authorization to family members to access location data for the user. Accordingly, when a family member requests location data for a user, access is granted if there is proper authorization. As another example, in some embodiments, a taxi operations company requests and obtains location data of one or more fleet members to keep track of its vehicles (e.g., via onboard vehicle console or terminal).

Various embodiments and applications of the clearinghouse 150 are described in detail herein. However, the embodiments and applications described herein should not be considered exhaustive or limiting in any way.

Figure 2:
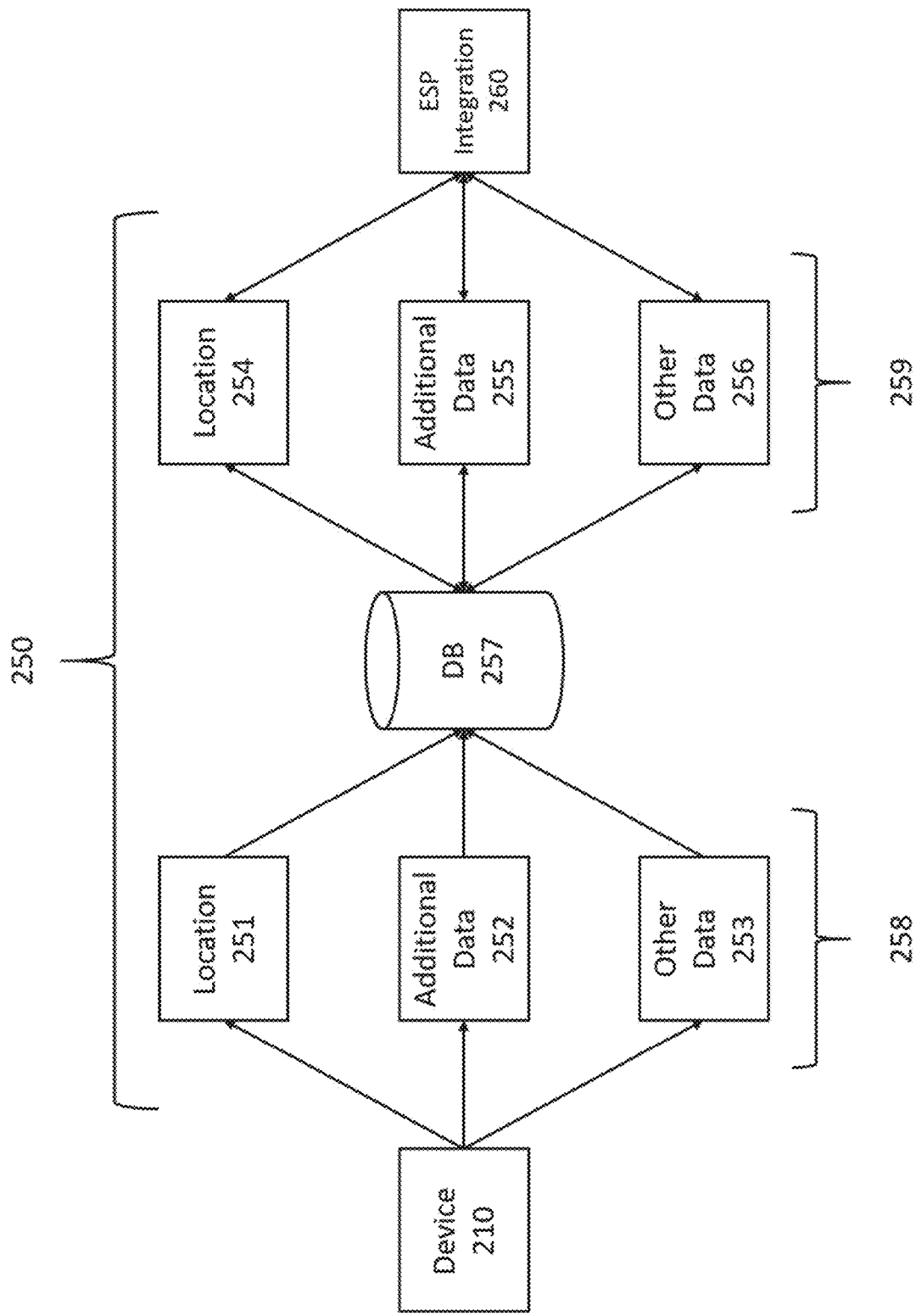
FIG. 2 depicts a diagram of a clearinghouse for emergency data in accordance with one embodiment.

FIG. 2 depicts an embodiment of an Emergency Clearinghouse 250 for storing and retrieving emergency data. In some embodiments, the clearinghouse 250 includes a set of ingestion modules 258 (also referred to as "ingestion modules") and a set of retrieval modules 259 (also referred to as "retrieval modules"). The set of ingestion modules 258 optionally include a location ingestion module 251, an additional data ingestion module 252, and one or more other data ingestion modules 253. In some embodiments, the location ingestion module 251 is an emergency location service ingestion interface for posting or receiving emergency locations. In some embodiments, the location ingestion module 251 is a REST API that receives an HTTP POST including location data when an emergency alert is generated (e.g., when an emergency call is made from a cell phone). The location data includes a location generated concurrently or in response to the generation of the emergency alert. In some embodiments, the location data includes a location generated before the emergency alert. For example, when an emergency call is made from a cell phone, thereby generating an emergency alert, the location ingestion module 251 receives a location recently generated by the phone but before the emergency alert was generated, ensuring that a location for the emergency is available as quickly as possible. In some embodiments, the location data includes a device-based hybrid location generated by an electronic device 210 that generated the emergency alert. In some embodiments, the location data includes a location generated by a second electronic device communicatively coupled to the electronic device that generated the emergency alert. The location ingestion module 251 is integrated into an electronic device 210 through a mobile application installed on the device 210 or integrated into the firmware or operating system of the electronic device 210.

In some embodiments, the location data is generated by the electronic device 210 before the emergency and is accessible to an ESP during an emergency. For example, a taxi company may have software that transmits the location of its cars or assets to the emergency clearinghouse 250 preemptively. Thus, when an emergency arises, the location of the affected taxi can be made accessible quicker to send help. In some embodiments, the location data is generated by the electronic device 210 after the emergency has commenced and is made accessible to an ESP during the on-going emergency. For example, updated location data of a hijacked taxi is also be periodically transmitted to the emergency clearinghouse 250 and made accessible to an ESP.

In some embodiments, the additional data ingestion module 252 is an interface for posting or receiving static or dynamic emergency profile data (hereinafter, "additional data"). Additional data may include medical data, personal data, demographic data, and health data. For example, medical data may include information relating to a person's medical history, such as past surgeries or preexisting conditions. Personal data may include a person's name, date of birth, height, weight, occupation, address(es) (e.g., home address, work address, etc.), spoken languages, etc. Demographic data may include a person's gender, ethnicity, age, etc. Health data may include information such as a person's blood type or heartrate. Additional data may further include data received from connected devices such as vehicles, IoT devices, and wearable devices. For example, intelligent vehicle systems may generate and send data regarding a crash, such as the speed at which the vehicle was moving just before the collision, where the vehicle was struck, the number of occupants, etc. In some embodiments, the additional data ingestion module 252 is a REST API (e.g., a JSON (JavaScript Object Notation) REST API). For example, in some embodiments, when an emergency call is made from a cell phone, thereby generating an emergency alert, the cell phone receives a heartrate of the person who made the emergency call from a smartwatch worn by the person and communicatively coupled to the cell phone (e.g., Wi-Fi or Bluetooth connectivity). The cell phone sends the heartrate to the additional data ingestion module 252, along with any other additional data, in an HTTP POST. In some embodiments, the additional data ingestion module 252 is integrated into an electronic device 210 through a mobile application installed on the device 210 or integrated into the firmware or operating system of the electronic device 210. In some embodiments, additional data is sent to the additional data ingestion module 252 from a network server. The additional data ingestion module 252 is accessed by any connected platform that receives data that might be relevant in an emergency. Connected platforms optionally send additional data to the additional data ingestion module 252 at any time. For example, in some embodiments, a website, web application, or mobile application integrated with the additional data ingestion module 252 that allows users to create profiles sends additional data included in the profiles to the additional data ingestion module 252 every time a profile is created or updated.

In some embodiments, the set of ingestion modules 258 includes one or more other data ingestion modules 253. Another data ingestion module 253 is optionally an interface for posting or receiving data relevant to emergencies that is not received by the location ingestion module 251 or the additional data ingestion module 252. In some embodiments, the other data ingestion module 253 receives audio or video streams during an emergency from electronic or communication devices associated with the emergency or proximal to the emergency. For example, an emergency alert is generated by an intelligent vehicle system installed in a vehicle in response to the vehicle experiencing a collision. In this example, the emergency alert is sent to the EMS 120 by the intelligent vehicle system or by an electronic device communicatively coupled to the intelligent vehicle system, such as a cell phone coupled to the intelligent vehicle system via Bluetooth. In response to generating the emergency alert, the intelligent vehicle system additionally begins streaming audio and video from microphones and cameras installed inside or outside of the vehicle to the clearinghouse 250 through the other data ingestion module 253. A cell phone communicatively coupled to the intelligent vehicle system additionally or alternatively streams audio or video from microphones and cameras integrated into the cell phone to the clearinghouse 250 through the other data ingestion module 253. In some embodiments, the one or more other data ingestion modules 253 are REST APIs that are accessed with an HTTP POST.

After receiving the relevant data, the set of ingestion modules 258 can store the data in one or more clearinghouse databases 257. For example, in some embodiments, the clearinghouse databases 257 includes a location database and an additional data database. In some embodiments, as described above, the one or more clearinghouse databases 257 are stored on a third-party server communicatively coupled to or otherwise accessible by the EMS 120. In some embodiments, the set of ingestion modules 258 tags or otherwise associates the data received by the modules with an identifier of a user or device associated with the data. For example, the set of ingestions modules 258 tag the data the received by the modules with a user ID number, an email address, or a phone number (e.g., caller ID). In some embodiments, the ingestion modules 258 tag the data received by the clearinghouse 250 based on the data source (e.g., device name or type, application name, user name, phone number, corporate account, etc.).

In some embodiments, an individual or group of individuals are associated with multiple identifiers. For example, the location ingestion module 251 receives a location generated by a phone associated with the phone number +1-555-555-5555, associated with John Doe. The additional data ingestion module 252 also receives a heartrate from a smartwatch associated with the email address johndoe@email.com, also associated with John Doe. In this example, the set of ingestion modules 258 tag the location with the phone number "+1-555-555-5555," tag the heartrate with the email address "johndoe@email.com," and associate both the location and the heartrate with John Doe in the clearinghouse databases 257.

The ingestion data enters the clearinghouse 250 (as shown in FIG. 2) comprises various data fields and data entries for those data fields. In some embodiments, the clearinghouse 250 maintains a list of expected data fields so that the data entries can be placed under a specific data field. In some embodiments, the data categories are selected or deselected by the administrator of the ESP to display for a specific role using a management portal, as described below.

In some embodiments, there are some data categories that cannot be deselected by the administrator of the ESP (referred to as anchor data fields). Table 1 is a list of anchor data fields and an expectation (whether it will be present in the ingestion data). In some embodiments, anchor data fields must be displayed in the enhanced data display or in the web page accessed by it. Accordingly, in such embodiments, the administrator cannot restrict access to anchor data fields because they are considered critical. However, as indicated in Table 1, in some embodiments, certain anchor data fields do not have available data. In such embodiments, when data is not available for an anchor data field, it is not displayed, or is displayed as a blank, N/A, etc. Similar to anchor data fields, there may be anchor data tags that are considered critical information where access cannot be restricted. For example, "location info" has been designated as an anchor data tag in FIG. 5E.

TABLE 1

Anchor Data Fields

| Data Field | Always Present |
|---|---|
| caller_id - Phone number of caller the location record belongs to | Yes |
| rg_address - Civic address of the reverse-geocoded location | No |
| latitude - EPSG:4326 ISO6709 latitude coordinate of the location record | Yes |
| longitude - EPSG:4326 ISO6709 longitude coordinate of location record | Yes |
| rg_likelihood - Value from 0-100 of the % likelihood that the location record is at this place | No |
| uncertainty_radius - EPSG:9001 circular radius of uncertainty in meters | Yes |
| uncertainty_confidence - IETF RFC7459 defined value from 0-100 of the % confidence in the uncertainty radius, or null if not reported | No |
| Location_time - UNIX timestamp in UTC of when the location was recorded on the client device | Yes |

In some embodiments, as depicted in FIG. 2, the clearinghouse 250 includes a set of retrieval modules 259. The set of retrieval modules 259 optionally include a location retrieval module 254, an additional data retrieval module 255, and one or more other data retrieval modules 256. In some embodiments, the location retrieval module 254 is an interface for retrieving location data from the clearinghouse databases 257. In some embodiments, the location retrieval module 254 is a JSON REST API that receives a query or request (e.g., in the form of an HTTP GET request) from a requesting party, such as an ESP. In some embodiments, the request is sent from a call-taking application (e.g., call taking module 145) integrated into the PSAP system 130. In some embodiments, the location retrieval module 254 provides a single GET endpoint for retrieving either the latest or paginated list of locations for a specific caller ID (e.g., an identifier of a user or an electronic device associated with a user, such as a phone number). For example, as described above, a phone number associated with a device 210 from which a location was received is included in the header, body, or metadata of the request sent to the location retrieval module 254. The clearinghouse 250 then retrieves a location or set of locations from the clearinghouse databases 257 and deliver the location or set of locations to the requesting party. In some embodiments, the location retrieval module 254 is a location information server (LIS). In some embodiments, the LIS is a NG911 standards-based XML API for the retrieval of location data from the clearinghouse databases 257. In some embodiments, as described above, the location retrieval module 254 accepts HELD requests from requesting parties and returns location data for a specific caller ID or anonymous reference.

As depicted in FIG. 2, the set of retrieval modules 259 optionally include an additional data retrieval module 255. In some embodiments, the additional data retrieval module 255 is a JSON REST API for the retrieval of emergency or additional data. As described above, additional data optionally includes medical data, personal data, demographic data, and health data. Additional data also optionally includes data received from connected devices such as vehicles, IoT devices, and wearable devices. In some embodiments, the additional data retrieval module 255 receives a query or request (e.g., in the form of an HTTP GET request) from a requesting party, such as an ESP. The additional data then retrieves additional data associated with a specific or particular identifier of a user or an electronic device associated with the user, such as a phone number, and returns the data to the requesting party. In some embodiments, the set of retrieval modules 259 further includes one or more other data retrieval modules 256, which function similarly to the location retrieval module 254 and additional data retrieval module 255, for the retrieval of data stored in the clearinghouse databases 257 not retrieved by the location retrieval module 254 or additional data retrieval module 255.

In some embodiments, a retrieval module within the set of retrieval modules 259 and a corresponding ingestion module within the set of ingestion modules 258 form a sub-clearinghouse. For example, in some embodiments, location ingestion module 251 and location retrieval module 254 combine to form location clearinghouse 150a (as shown in FIG. 1B). Likewise, in some embodiments, additional data ingestion module 252 and additional data retrieval module 255 combine to form additional data clearinghouse 150b. In some embodiments, a requesting party is only given access to a particular sub-clearinghouse. For example, a police officer is only given access to the location clearinghouse 150a, while an EMT (emergency medical technician) is only given access to the additional data clearinghouse 150b. However, a requesting party is given differential access to the clearinghouse 150, sub-clearinghouses, particular emergency data fields, or particular emergency data categories within the clearinghouse 150 based on any factor or set of factors. In some embodiments, as described below, a management portal is used to determine which emergency data fields or emergency data categories are returned from the EMS 120 or clearinghouse 250 to a particular requesting party.

ESP Integration System

Figure 3:
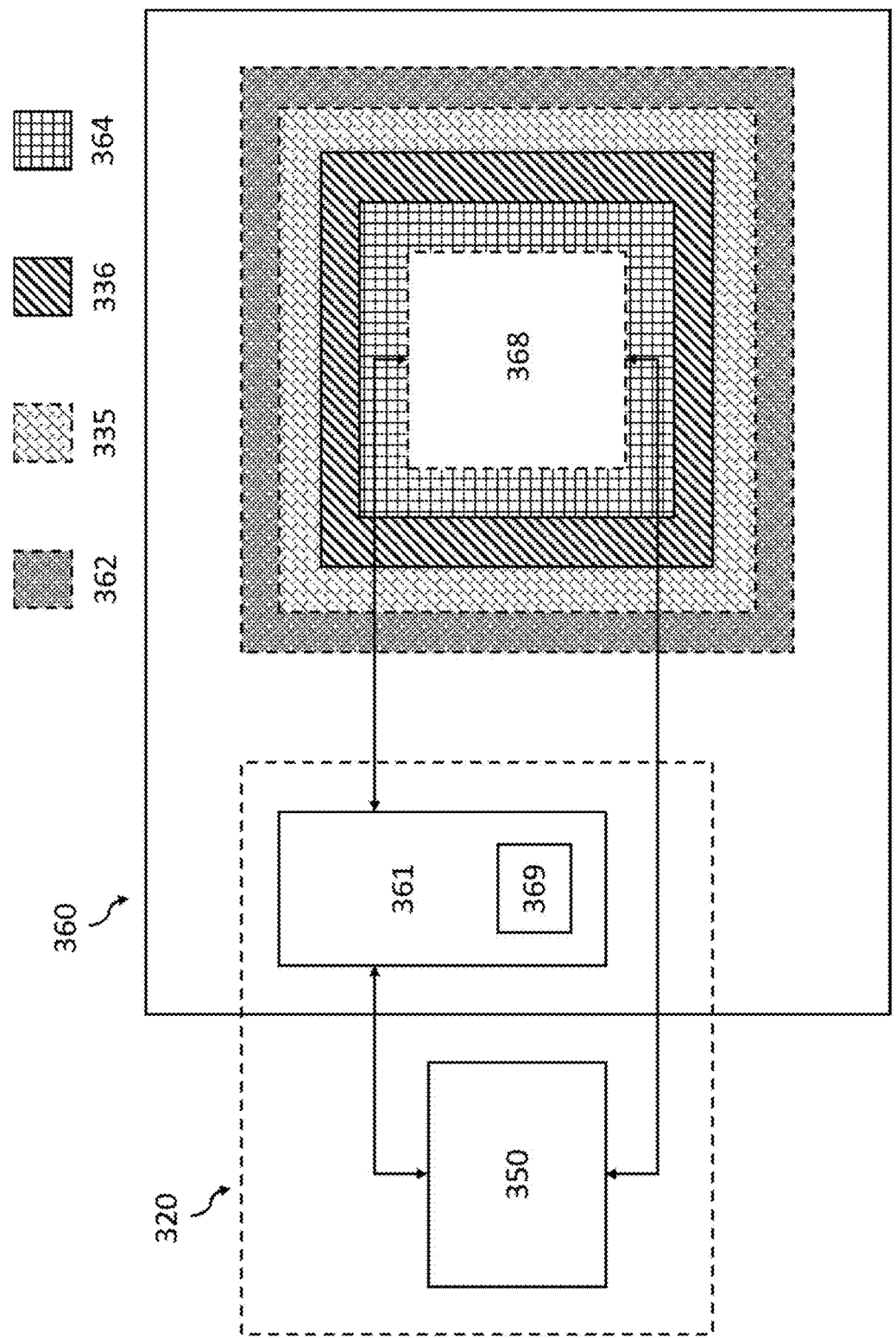
FIG. 3 depicts a diagram of an emergency service provider (ESP) integration system in accordance with one embodiment.

FIG. 3 depicts a diagram of an emergency service provider (ESP) integration system in accordance with one embodiment. In some embodiments, an ESP integration system 360 includes an emergency data management portal 361 (hereinafter, "management portal"), an emergency service provider (ESP) network 335, and an ESP console (or user interface) 336. In some embodiments, the ESP console UI 336 is a computing device at the ESP. The ESP integration system 360 additionally or alternatively includes a third-party network or server 362, an enhanced data display 364, or a website 368. In some embodiments, as described below, the various components of the ESP integration system 360 function in conjunction to send requests for emergency data to the EMS 320, receive emergency data from the EMS 320, and display emergency data from the EMS 320 to emergency personnel within the PSAP 130. In some embodiments, the management portal 361 is additionally or alternatively included in the EMS 320. In some embodiments, as depicted in FIG. 3, the ESP integration system 360 includes only the management portal 361, the enhanced data display 364, and the ESP console 336. In some embodiments, wherein the ESP integration system 360 includes only the management portal 361, the enhanced data display 364, and the ESP console 336, the management portal 361 and the enhanced data display 364 are included in a single web application (as described below), and the ESP console 336 is a computing device at the ESP used to access the web application.

In some embodiments, the management portal 361 is a software module and interface included in the EMS 320. In some embodiments, the management portal 361 is provided by the EMS 320. In some embodiments, the interface of the management portal 361 is embodied and accessed as a website, such as by navigating to a URL within a web browser. In some embodiments, the interface of the management portal 361 is embodied and accessed as a desktop application installed on a computing device. In some embodiments, the management portal 361 and the enhanced data display 364 are included in a single, standalone website, web application, or desktop application (also referred to as an "emergency response application"). For example, in some embodiments, an ESP personnel can navigate to a web application provided by the EMS 320 through an ESP console UI 336 (e.g., a computer at the ESP) and access both the management portal 361 and the enhanced data display within the web application. In some embodiments, the management portal 361 is accessed by an administrator of one or more ESPs ("ESP administrator"). As described below, the ESP administrator can then select a particular ESP or group of ESPs and select which emergency data fields or emergency data categories are to be sent from the EMS 320 or clearinghouse 350 to the particular ESP or group of ESPs in response to a request for emergency data sent from the particular ESP or an ESP included in the group of ESPs. In some embodiments, as described below, an ESP administrator can further select which emergency data fields or emergency data categories are to be sent to a particular role within a particular PSAP or group of PSAPs. In some embodiments, the management portal 361 is entirely distinct and separate from the PSAP 130.

In some embodiments, requests for emergency data to the EMS 320 and responses sent from the EMS 320 to the PSAP 130 are sent from and received at different layers or components within the ESP integration system 360. In some embodiments, a request for emergency data is sent from a PSAP 130 at the ESP console UI 336. For example, an ESP personnel generates a request for emergency data by selecting a button within the ESP console UI 336. Or, for example, a request for emergency data is generated at the ESP console UI 336 when the PSAP 130 receives a request for emergency assistance (e.g., when a PSAP receives a 9-1-1 call) and an ESP personnel accepts the request for emergency assistance (e.g., when a PSAP operator answers a 9-1-1 call). In some embodiments, a request for emergency data is generated through the enhanced data display 364. In some embodiments, a request for emergency data is generated through an emergency response application (e.g., a web or desktop application) that includes both a management portal 361 and an enhanced data display 364, as described below. In some embodiments, after the request for emergency data is generated, the emergency data request is delivered from the ESP network 335 to the EMS 320. In some embodiments, the emergency data request is first delivered from the ESP network 335 to a third-party network 362 before being sent from the third-party network 362 to the EMS 320. For example, in some embodiments, a call taking module 145 within the ESP software 140 is a desktop application (e.g., a call-taking application) provided by a third-party vendor and installed within the PSAP 130. In this embodiment, an emergency data request is generated by an ESP personnel selecting a button within the interface of the vendor-provided desktop application. The emergency data request is then sent from the ESP network 335 to the third-party network 362 and then to the EMS 320. In some embodiments, an emergency data request is generated within a third-party desktop application and sent directly from the ESP network 335 to the EMS 320.

In some embodiments, after the EMS 320 receives an emergency data request from the PSAP 130, the EMS 320 consults the management portal 361 to determine which emergency data categories to send to the PSAP 130. As described above, an emergency data request may include a credential or an access key associated with the PSAP 130 from which the emergency data request was sent. In some embodiments, the PSAP 130 cross-references credentials provided in an emergency data request with the management portal 361 to determine which emergency data categories have been selected for the PSAP 130 by an administrator of the PSAP 130, as described below. In some embodiments, as described below, an emergency data request sent to the EMS 320 by a PSAP 130 may include one or more indicators (e.g., tags) of which emergency data fields or emergency data categories have been selected for the PSAP 130 or an individual ESP personnel (e.g., a role assigned to an individual ESP personnel) associated with the PSAP 130 by an administrator of the PSAP 130. In some embodiments, the management portal 361 includes a management portal database 369 for storing keys and roles assigned to an ESP, as described below. In some embodiments, the management portal database 369 stores keys and roles in a data cache for efficient recall. After determining which emergency data fields are to be sent to the PSAP 130, the EMS 320 transmits emergency data to the PSAP 130 for one or more of the emergency data fields. For example, in one embodiment, an ESP administrator access the management portal 361 and selects ESP A. The ESP administrator then selects location, name, phone number, and email address as emergency data categories to be sent to ESP A. In this embodiment, ESP A receives an emergency alert (e.g., a 9-1-1 call) from a user and sends an emergency data request to the EMS 320. In this embodiment, the EMS 320 receives the emergency data request from ESP A, the EMS 320 identifies ESP A as the requesting party based on credentials included in the emergency data request. Then, in this embodiment, the EMS 320 checks the management portal 361 to determine that the only emergency data fields to be sent to ESP A are location, name, phone number, and email address. The EMS 320 or clearinghouse 350 then references the clearinghouse databases 257 to determine what data associated with the emergency alert is available. In this example, the EMS 320 determines that location, name, phone number, ethnicity, and occupation are available for the emergency alert. In this example, although ethnicity and occupation are available for the emergency alert, the EMS 320 does not return either because neither was selected to be sent to ESP A. Although email address was selected by the ESP administrator to be sent to ESP A, an email address is not returned by the EMS 320 because an email address is not available for the emergency alert. In this example, in response to the emergency data request sent from ESP A, the EMS 320 returns only a location, name, and phone number associated with the emergency alert to ESP A.

In some embodiments, emergency data returned by the EMS 320 in response to an emergency data request is sent to the requesting PSAP 130 through the ESP network 335. In some embodiments, emergency data returned by the EMS 320 in response to an emergency data request is sent to the requesting PSAP 130 first through a third-party network 362 and then through the EMS network 335. In some embodiments, the emergency data returned by the EMS 320 is displayed at the ESP display 131 through the ESP console UI 336. In some embodiments, the emergency data returned by the EMS is displayed at the PSAP 130 through an enhanced data display 364, as described below. In some embodiments, the enhanced data display 364 is accessed through a website 368. In some embodiments, the enhanced data display 364 is a standalone web application or desktop application. In some embodiments, as mentioned above, the enhanced data display 364 is included with the management portal 361 in a standalone web application or desktop application. In some embodiments, the enhanced data display 364 is accessed through a desktop application installed at the PSAP 130. In some embodiments, the enhanced data display 364 is accessed through a website 368 within a desktop application installed at the PSAP 130. In some embodiments, the desktop application is provided by at third-party vendor.

Emergency Data Management Portal

Figure 4A:
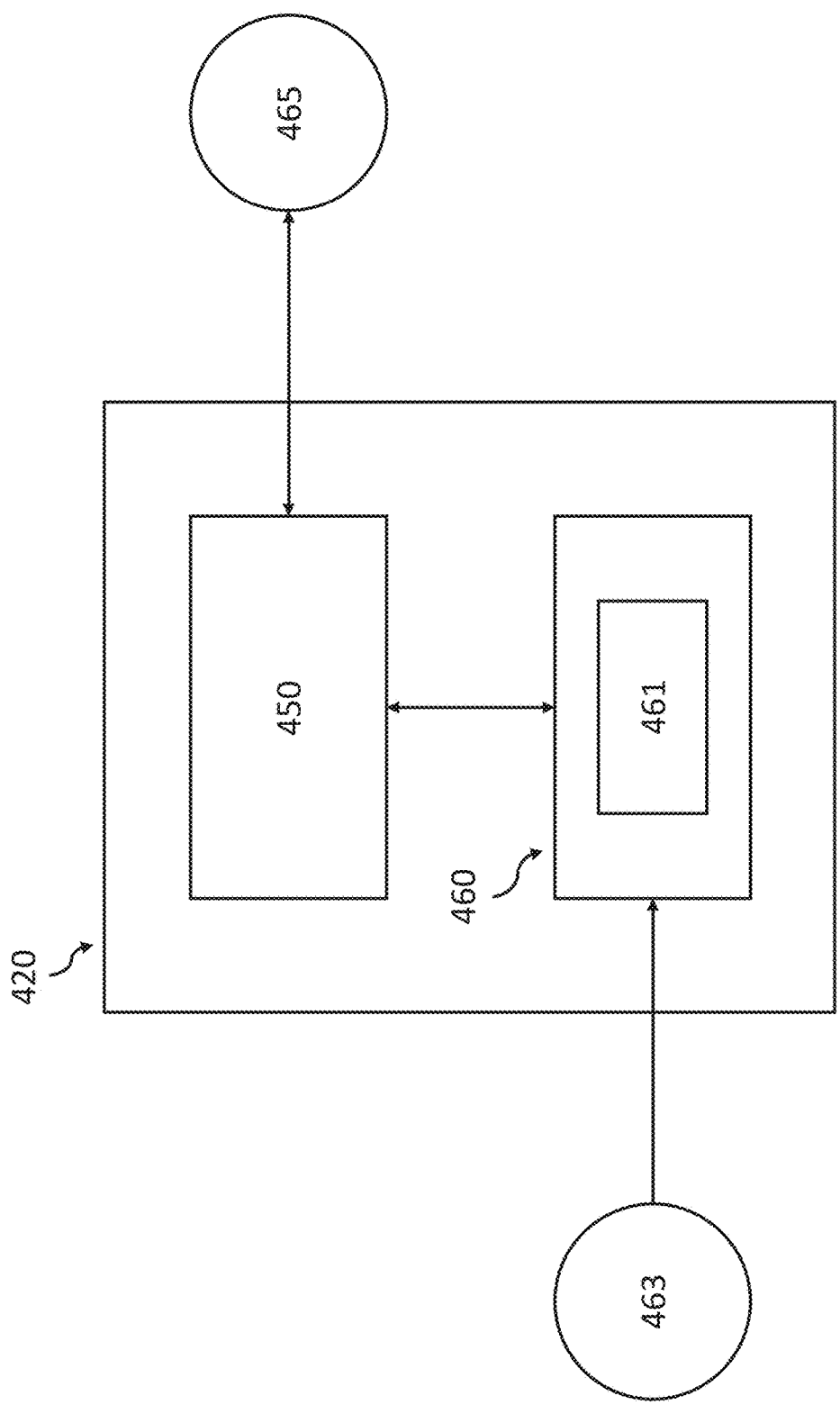
FIG. 4A depicts a diagram of an ESP administrator, an EMS, and an ESP personnel in accordance with one embodiment.
Figure 4B:
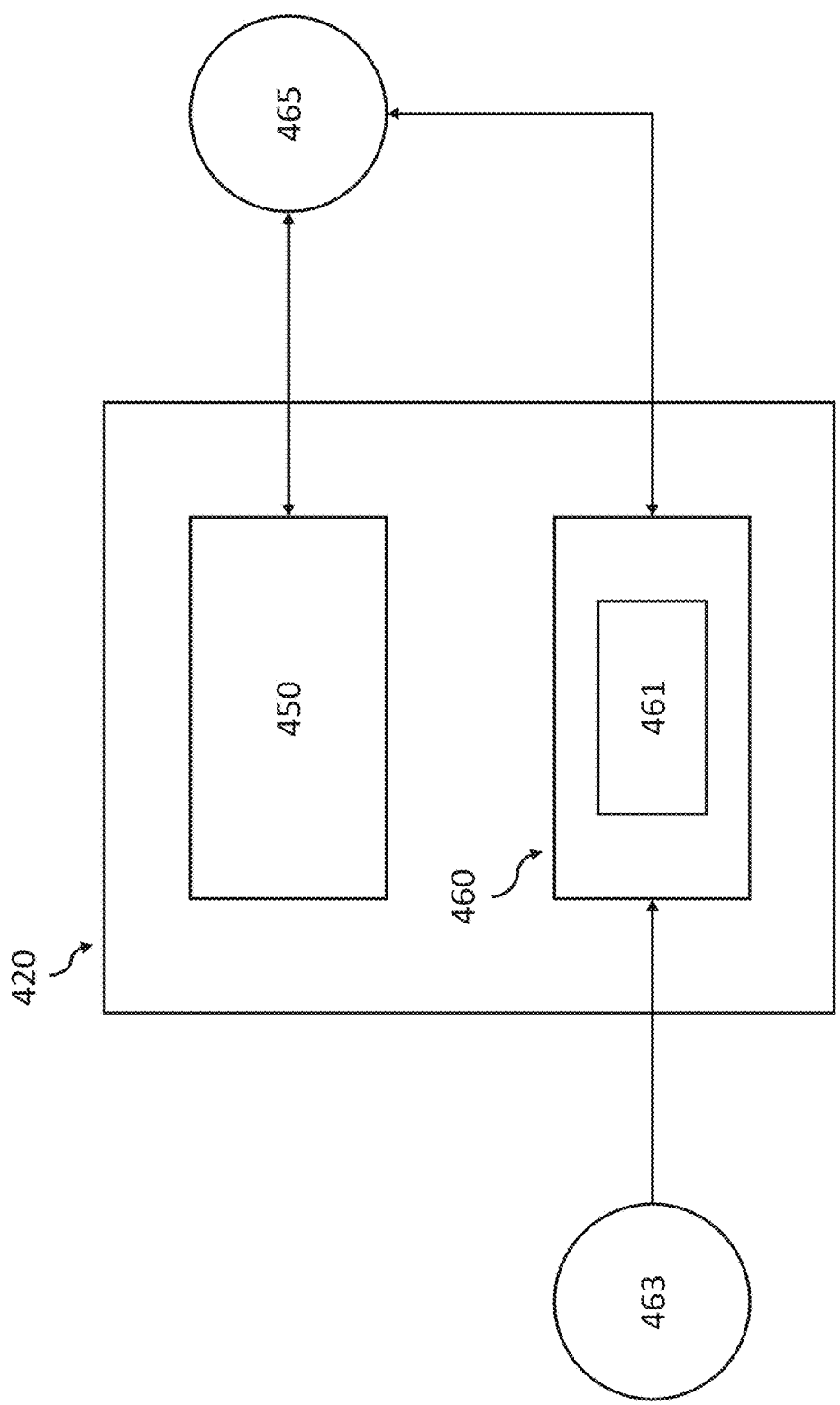
FIG. 4B depicts a diagram of an ESP administrator, an EMS, and an ESP personnel in accordance with one embodiment.

FIGS. 4A and 4B depict diagrams of an ESP administrator, an EMS, and an ESP personnel in accordance with one embodiment of the present invention. In some embodiments, a management portal is implemented as one or more software modules on a computing system that includes a processor and a non-transitory computer readable storage medium. In some embodiments, the management portal is configured to establish a role and define a set of emergency data fields or emergency data categories to be made accessible for the role, as described below. In some embodiments, an ESP administrator 463 accesses an emergency data management portal ("management portal") 461 to select emergency data categories to be sent to particular ESPs or particular personnel ("ESP personnel") 465 within particular ESPs. For example, in some embodiments, an ESP administrator 463 of multiple ESPs (e.g., three different PSAPs within a 30-mile radius) is given credentials (e.g., a username and password) or an access key to access the management portal 461. Using the credentials or access key, the ESP administrator 463 can log into the management portal 461 and define keys (as described below) for one or more of the ESPs under the ESP administrator's authority. After defining a key for a particular ESP under the ESP administrator's authority, the ESP administrator 463 can define roles (as described below) within the particular ESP. For example, at the management portal 461, the ESP administrator 463 optionally defines a key for a PSAP and a call-taker role within the PSAP. After defining a particular role within a particular ESP, the ESP administrator 463 then selects one or more emergency data fields or emergency data categories to be sent from the EMS 420 to the particular ESP in response to an emergency data request from an ESP personnel 465 having the particular role, as described below. In some embodiments, the management portal establishes default roles and defines default sets of emergency data fields or emergency data categories to be made accessible for the default roles, as described below. In some embodiments, as depicted by FIG. 4A, when an ESP personnel 465 generates and sends an emergency data request to the EMS 420, the EMS 420 determines the particular ESP that the ESP personnel 465 is associated with and the role of the ESP personnel 465 within the particular ESP through identifiers (e.g., credentials or an access key) included in the emergency data request. The clearinghouse 450 then references the management portal 461 to determine which emergency data fields have been selected to be sent to the particular ESP and the role of the ESP personnel 465 by the ESP administrator of the particular ESP. The EMS 420 then determines and returns an appropriate response to the emergency data request.

In some embodiments, as depicted by FIG. 4B, when an ESP personnel 465 associated with a particular role generates and sends an emergency data request to the EMS 420, the emergency data request includes one or more indicators (e.g., tags) that indicate which emergency data fields or emergency data categories have been selected for the particular role. For example, in some embodiments, the enhanced data display and the management portal 461 are included in a standalone web application (as mentioned above). In such an embodiment, when an ESP personnel 465 logs into the standalone web application (such as by submitting a valid username and password), the management portal 461 identifies a role associated with the ESP personnel 465 and the emergency data fields selected for the role. The management portal 461 then returns one or more indicators (e.g., tags) of the emergency data fields selected for the role to the standalone web application. Then, when the ESP personnel 465 generates an emergency data request through the enhanced data display, the emergency data request includes the one or more indicators (e.g., tags) of the emergency data fields selected for the role associated with the ESP personnel 465. The clearinghouse 450 then determines which data fields have been selected for the role associated with the ESP personnel 465 using the one or more indicators instead of referencing the management portal 461. The EMS 420 then determines and returns an appropriate response to the emergency data request.

Figure 5A:
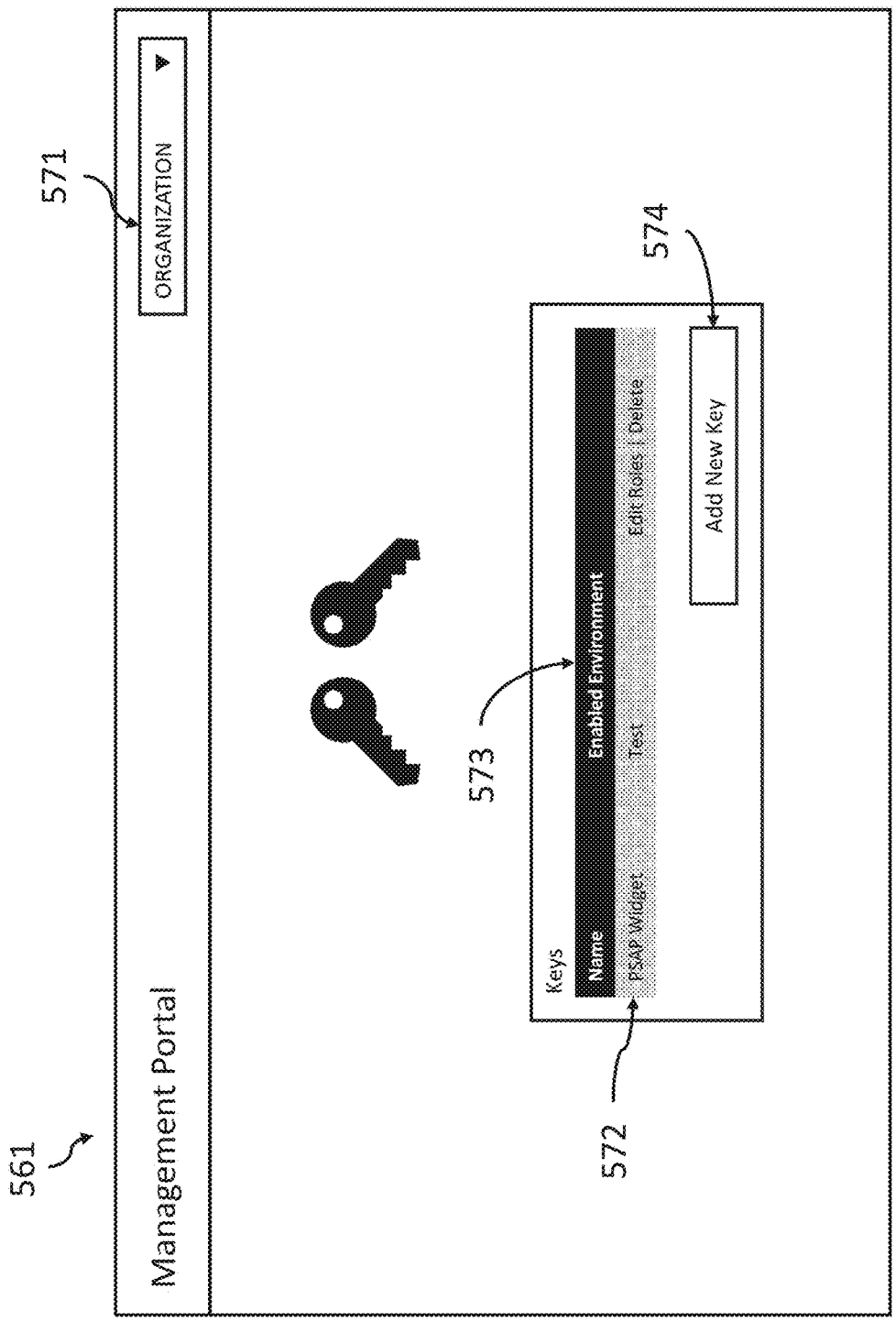
FIG. 5A, FIG. 5B, FIG. 5C, FIG. 5D, FIG. 5E, FIG. 5F, and FIG. 5G illustrate embodiments of a management portal in accordance with one embodiment.
Figure 5B:
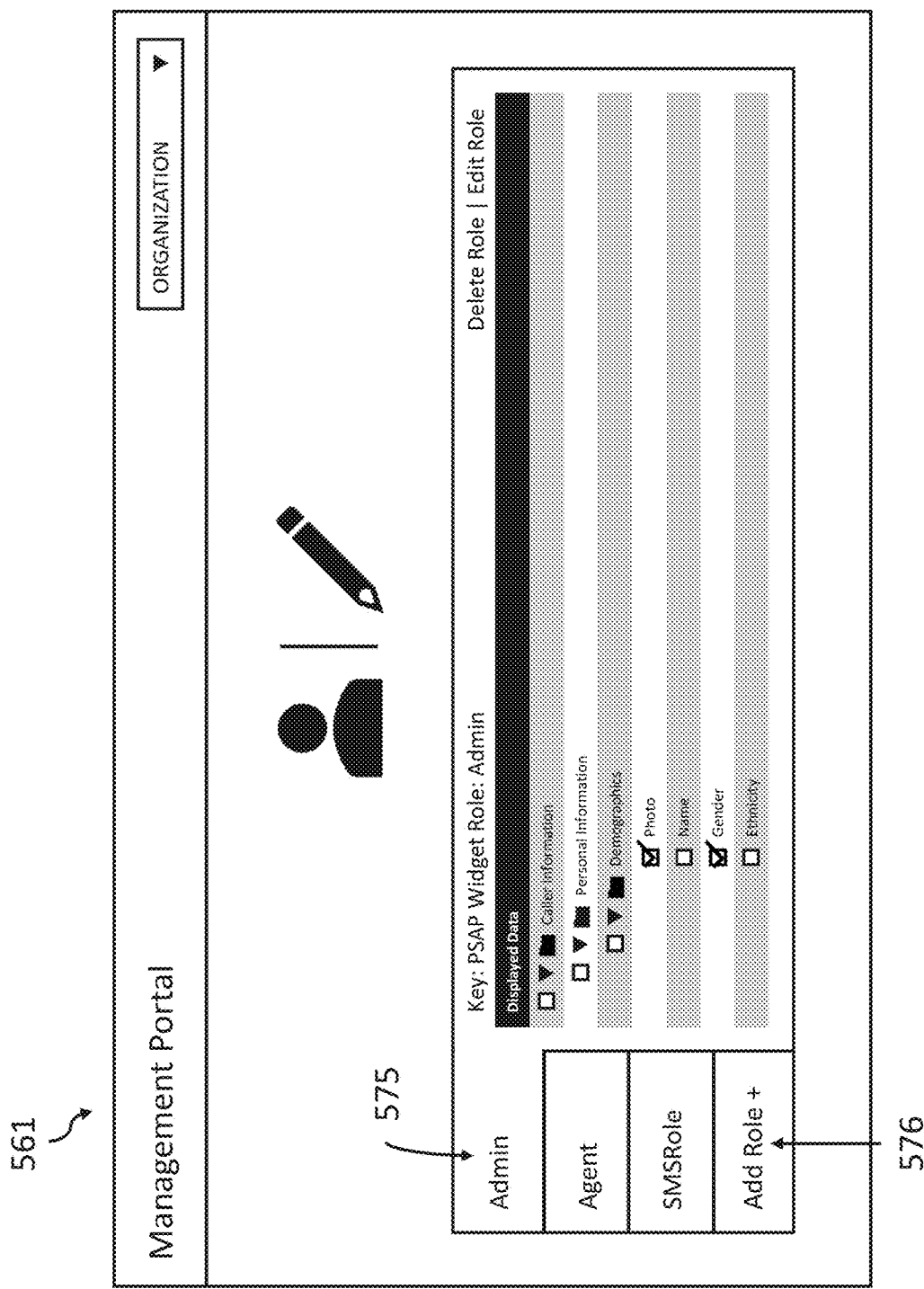

FIGS. 5A and 5B illustrate an embodiment of a management portal in accordance with one embodiment. As described above, in some embodiments, an ESP administrator accesses a management portal 561 to select emergency data fields to be sent to particular ESPs or particular personnel within particular ESPs. In some embodiments, the management portal 561 is a website or web application accessible with a URL through a web browser. In some embodiments, the management portal 561 is a desktop application. In some embodiments, an ESP administrator logs into the management portal 561 using credentials or an access key (e.g., a username and password). For example, in some embodiments, an ESP administrator applies for or otherwise requests access to the management portal 561 from a provider of the management portal. After approving the ESP administrator for access to the management portal 561, the provider of the management portal provides credentials or an access key to the ESP administrator that the ESP administrator uses to log into the management portal 561. In some embodiments, after logging into the management portal 561, an ESP administrator chooses between one or more organizations 571 under the ESP administrator's authority. For example, the ESP administrator is optionally a channel partner (e.g., a company that manages technology installations for multiple clients or partners) that services multiple PSAPs within a state. Each PSAP under the channel partner's management is listed within the management portal 561 as a different organization 571. In another example, a single organization 571 oversees multiple ESPs (e.g., multiple PSAPs or fire departments), and the ESP administrator is a local or state government official tasked with managing the multiple ESPs. In some embodiments, the ESP administrator is only given access to a single organization 571.

In some embodiments, as depicted in FIG. 5A, after the ESP administrator logs into the management portal 561 and an organization is selected, the management portal 561 displays existing keys 572 created for the organization 571. In some embodiments, a key (or agency key) 572 is an identifier of a particular ESP that defines both the particular ESP and the access to emergency data for the particular ESP. In some embodiments, an ESP administrator creates a new key 572 by selecting an "Add New Key" button 574. In some embodiments, each key 572 is assigned an enabled environment 573 when the key 572 is created. In some embodiments, a key 572 is assigned an enabled environment 573 of "Test" or "Production." In some embodiments, the definitions of keys 572 assigned to the "Production" enabled environment 573 are applied to live (e.g., legitimate and real-time) emergency alerts (e.g., 9-1-1 calls) handled by the associated ESP. In some embodiments, an organization 571 is allowed to have only a single key 572 assigned to the "Production" enabled environment 573. In some embodiments, the definitions of a key 572 assigned to the "Test" enabled environment 573 are applied only to test or demo emergency alerts and allow an ESP to simulate handling an emergency alert with the definitions of the key 572. For example, call-takers at PSAP B traditionally only have access to a name and a location of a caller when they receive a 9-1-1 call. However, an administrator of PSAP B is considering allowing call-takers at PSAP B to view demographic data of callers when they receive 9-1-1 calls but is unsure how the additional data will affect the call-takers. In this example, the administrator of PSAP B accesses the management portal 561, selects PSAP B under organizations 571, creates a new key 572 by selecting the "Add New Key" button 574, and assigns the new key 572 to the "test" enabled environment 573. The administrator then selects demographic data to be additionally sent to call-takers at PSAP B. PSAP B then executes test 9-1-1 calls with PSAP B call-takers so that the PSAP B call-takers experience having the additional demographic data while handling 9-1-1 calls without potentially jeopardizing real emergency situations.

In some embodiments, after creating a key 572 for a particular ESP, an ESP administrator creates one or more roles 575 for the particular ESP, such as by selecting the "Add Role" button 576, as depicted in FIG. 5B. For example, as depicted in FIG. 5A, an ESP administrator can create a key 572 for a particular PSAP called "PSAP Widget." The ESP administrator can then create a role 575 within the "PSAP Widget" key 572 called "Admin" for an administrator (e.g., the person of highest authority) of the particular PSAP. As depicted in FIG. 5B, after creating a role 572, the management portal 561 displays all of the emergency data fields stored by the EMS. In some embodiments, the emergency data fields are grouped according to their tags into emergency data categories, as described above. For example, in some embodiments, as depicted in FIG. 5B, the photo, name, gender, and ethnicity emergency data fields are tagged as "demographics" and grouped together under a "Demographics" emergency data category. In some embodiments, an emergency data category (i.e., a group of emergency data fields) is grouped with one or more other emergency data categories under a supergroup of emergency data categories. For example, as depicted in FIG. 5B, the "Demographics" emergency data category is grouped under a "Personal Information" supergroup of emergency data categories.

In some embodiments, a "Caller Information" supergroup includes "Personal Information," "Medical Information," and "Emergency Contacts" (e.g., user submitted emergency contacts) addresses) subgroups. In some embodiments, the "Personal Information" group includes the "Demographics," "Contact Information," and "Addresses" emergency data categories. In some embodiments, the "Demographics" emergency data category includes the photo, name, gender, birth date, ethnicity, height, weight, languages, occupation, and comments emergency data fields. In some embodiments, the "Contact Information" emergency data category includes the email, phone number, notes, and URLs emergency data fields. In some embodiments, the "Addresses" emergency data category includes user submitted addresses, such as a work or home address. In some embodiments, the "Medical Information" emergency data category includes the allergies, disabilities, blood type, medical conditions, notes, and medications emergency data fields. In some embodiments, the "Emergency Contacts" emergency data category includes user submitted emergency contacts.

In some embodiments, a "Location" supergroup includes "Probable Address" and "Caller-Provided Locations" subgroups. In some embodiments, the "Probable Address" emergency data category includes the likelihood, name, address, exact location, latitude, longitude, contact, and URL emergency data fields. In some embodiments, the "Caller-Provided Locations" emergency data category includes the name, address, comments, URLs, and contact emergency data fields.

In some embodiments, after the management portal 561 displays all of the emergency data fields stored by the EMS, an ESP administrator then selects emergency data fields to be made available for a role 575, thereby defining a set of emergency data fields for the role 575. In some embodiments, an ESP administrator selects individual emergency data fields to be made available for a role. For example, as depicted in FIG. 5B, the photo and gender data categories have been selected to be made available for the "Admin" role. In some embodiments, an ESP administrator selects emergency data categories supergroups of emergency data categories to be made available for a role 575. For example, as depicted in FIG. 5B, an ESP administrator selects the check box next to the "Demographics" emergency data category to make all of the emergency data fields grouped under the "Demographics" emergency data category available for the "Admin" role. In some embodiments, an ESP administrator can define a set of emergency data fields or emergency data categories to be made available or accessible for a role by accepting a default set of emergency data fields or emergency data categories presented by the management portal 561.

As depicted in FIG. 5B, an ESP administrator creates multiple roles 575 within a key 572. For example, as depicted in FIG. 5B, there are three roles 575 created for the "PSAP Widget" key 572, "Admin," "Agent," and "SMS-Role." The ESP administrator optionally selects different emergency data fields to be made available for different roles 575 within the same key 572. For example, the ESP administrator selects the "Medical Information" and "Locations" emergency data categories to be made available for the "Agent" role, but not the "Demographics" emergency data category. Or, for example, the ESP administrator selects only the "Contact Information" emergency data category to be made available for the "SMSRole." Finally, the ESP administrator optionally selects all of the emergency data fields available for the "Admin" role. The ESP administrator, who typically has an intimate understanding of the hierarchy, needs, and capabilities of an ESP under the ESPs administrator's authority, is often the person best suited to decide which emergency data fields or emergency data categories should be made available to which roles within a particular ESP. In some embodiments, an ESP administrator accesses the management portal 561 to delete or edit a role 572.

In some embodiments, an ESP administrator names keys 572 and roles 575 within the keys to match corresponding keys and roles defined in a third-party system. For example, in some embodiments, emergency data returned by the EMS in response to an emergency data request is sent to the requesting ESP first through a third-party network and then through the EMS network, as described above. In some embodiments, ESP personnel are preassigned roles within the third-party system. In such an embodiment, an ESP administrator will associate the preassigned roles with the roles 572 created within the management portal 561, such as by naming the roles 572 created within the management portal 561 with the exact same names as the preassigned roles. When an ESP personnel generates an emergency data request, the EMS then efficiently associates a preassigned role of the ESP personnel with a role 572 created for the ESP personnel within the management portal 561, as described below.

As mentioned above, in some embodiments, the management portal 561 is accessed through a standalone website, web application, or desktop application. FIGS. 5C-5G illustrate an embodiment of a management portal 561 accessed through a web application 580 (also referred to as an "emergency response application"). In some embodiments, as mentioned above, the web application 580 includes the management portal 561 and the enhanced data display. In some embodiments, the management portal 561 and the enhanced data display are separately accessed through different tabs within the web application 580. In some embodiments, the web application 580 includes a graphical user interface (GUI) that contains one or more pages each with their own plurality of interactive elements, such as, but not limited to, entry fields, soft buttons, sliders, maps, images, and videos. Advantageously, because the web application 580 can be accessed through an internet or web browser, the web application can be quickly and easily integrated into the systems used by emergency service providers (e.g., PSAPs), because accessing and using the web application 580 requires no additional software or hardware outside of standard computing devices and networks.

Figure 5C:
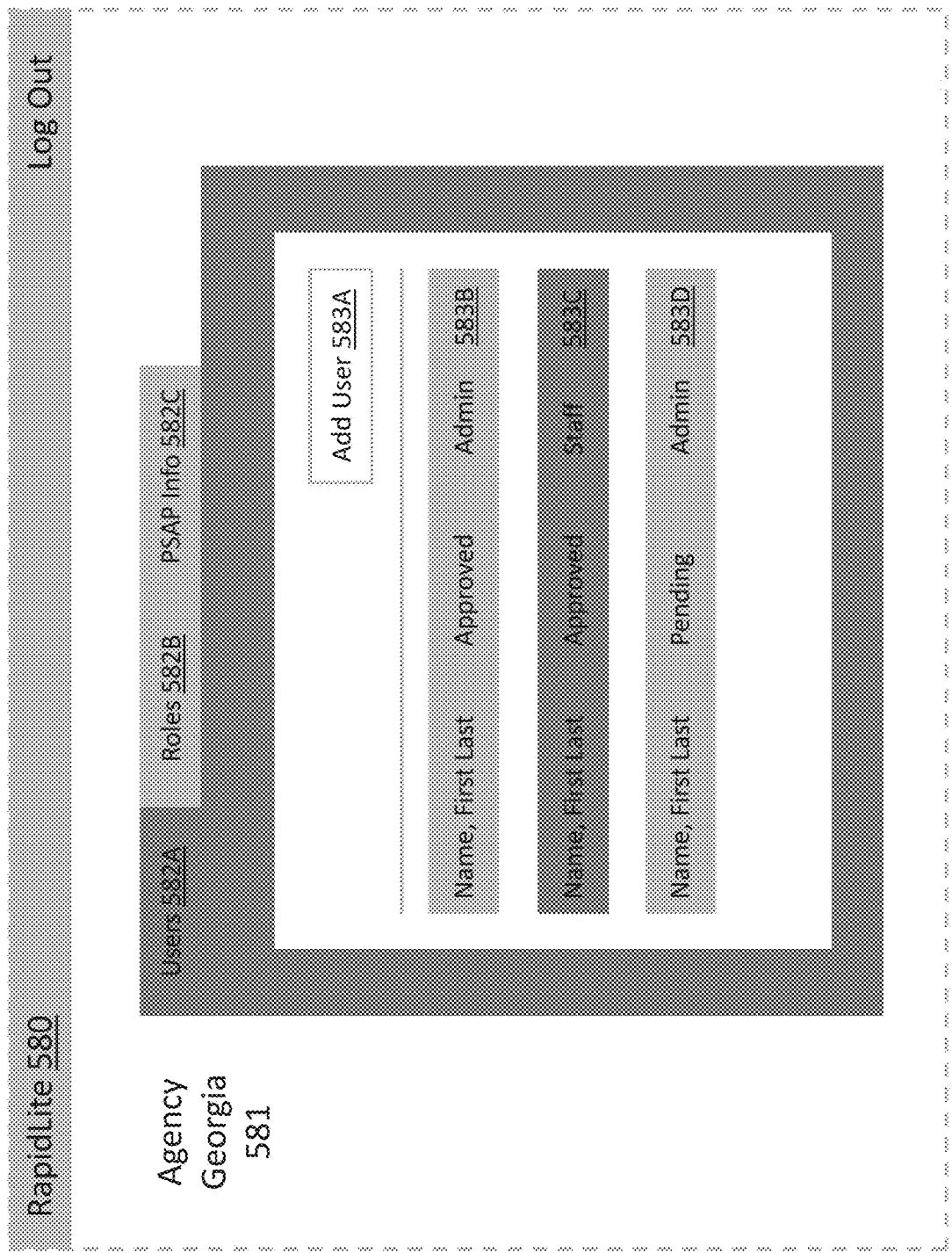

FIG. 5C illustrates a Users tab 582A of an embodiment of a management portal 561 accessed through a web application 580. In some embodiments, after an account is created for the PSAP administrator to access the web application (as described below), the PSAP administrator can create accounts for employees or other members of the PSAP. In some embodiments, the web application 580 will not allow a PSAP administrator to create accounts for other members of the PSAP until a request for access to the web application from the PSAP administrator is verified (as described below). In some embodiments, to create an account for another member of a PSAP, the PSAP administrator can select the Users tab 582A. Selecting the Users tab 582A then prompts the web application 580 to display a list of accounts associated with the particular PSAP. For example, FIG. 5C depicts a list of accounts associated with the "Georgia" PSAP, which includes a PSAP administrator account 583B, a PSAP staff account 583C, and a second PSAP administrator account 583D. In this example, although the PSAP administrator account 583D is pending approval, the PSAP administrator account 584B and the PSAP staff account 583C have already been approved. In some embodiments, as depicted in FIG. 5C, every account associated with a PSAP is assigned a role. As depicted, accounts 583B and 583D are assigned the Admin role while account 583C is assigned the Staff role.

After selecting the Users tab 582A, a PSAP administrator can create a new account for a PSAP by selecting the Add User button 583A. In some embodiments, after selecting the Add User button 583A, the web application 580 prompts the PSAP administrator to select role to be assigned to the new account. In some embodiments, the PSAP administrator can select from any role type that has been created for the particular PSAP. In some embodiments, in addition to the role, the web application 580 prompts the PSAP administrator to submit an email address for the user of the new account. Upon submission of the role and email address, the web application 580 creates a new account (e.g., within a user database, as described below) and populates the new account with the role and the email address. In some embodiments, an email including a confirmation link is sent to the email address, and the web application 580 does not allow access to the new account until the confirmation link is selected. In some embodiments, the email additionally or alternatively includes a temporary password for the new account. In some embodiments, a PSAP administrator creates an account for another member of the PSAP before the request for access to the web application 580 is approved. However, in some embodiments, neither the PSAP administrator nor any other account created by the PSAP administrator can access emergency data stored within the clearinghouse until after the request for access to the web application 580 has been approved.

Figure 5D:
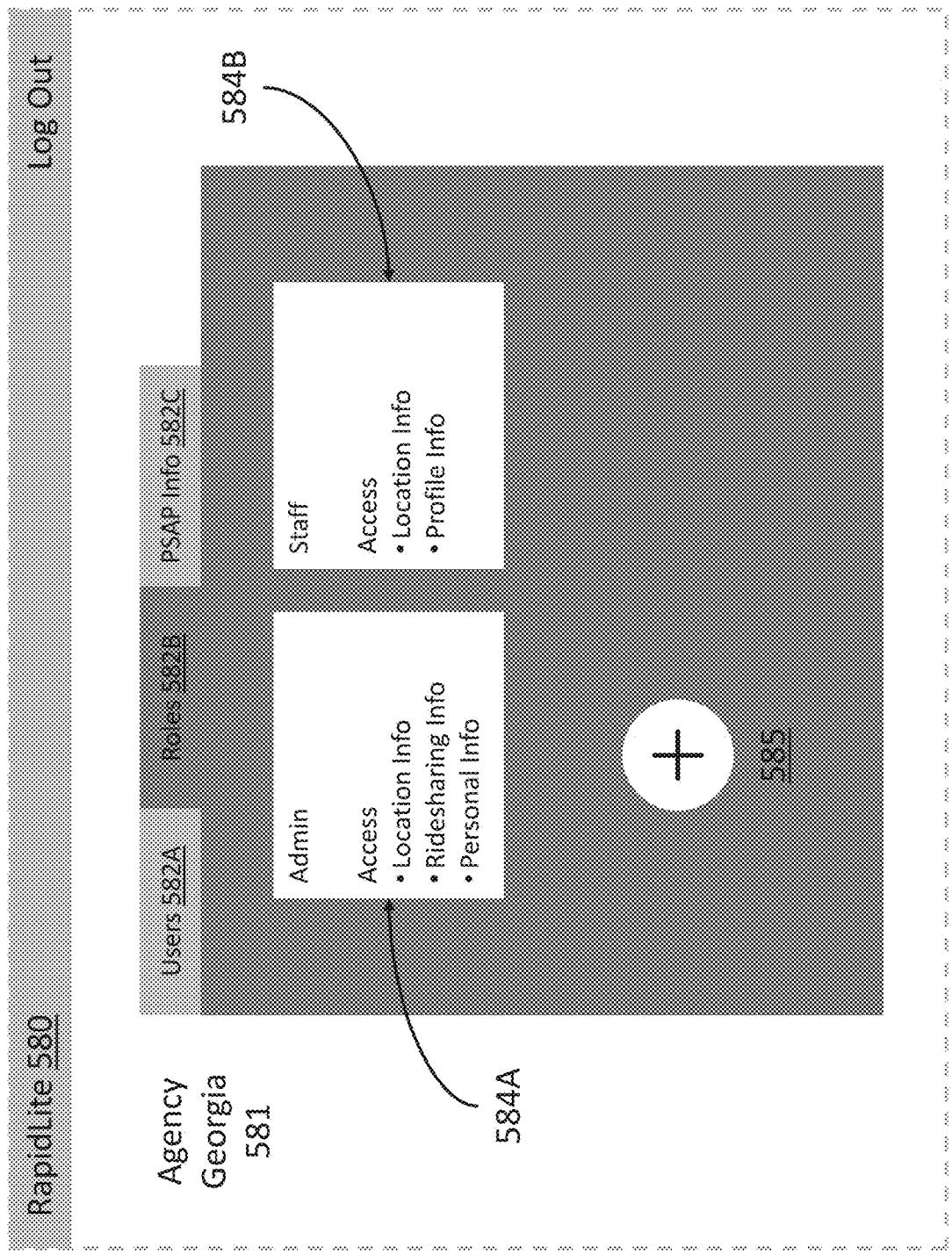
Figure 5E:
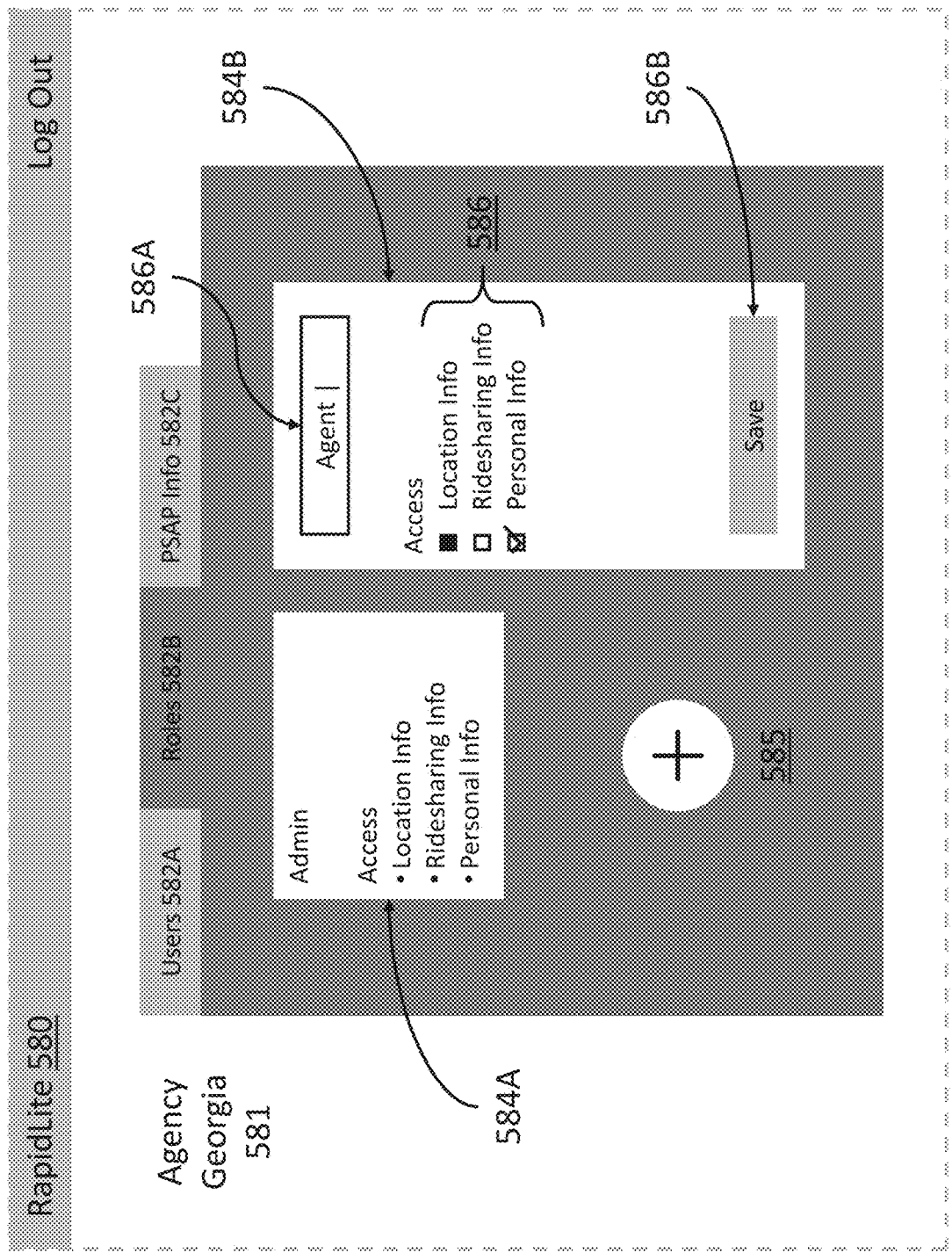
Figure 5F:
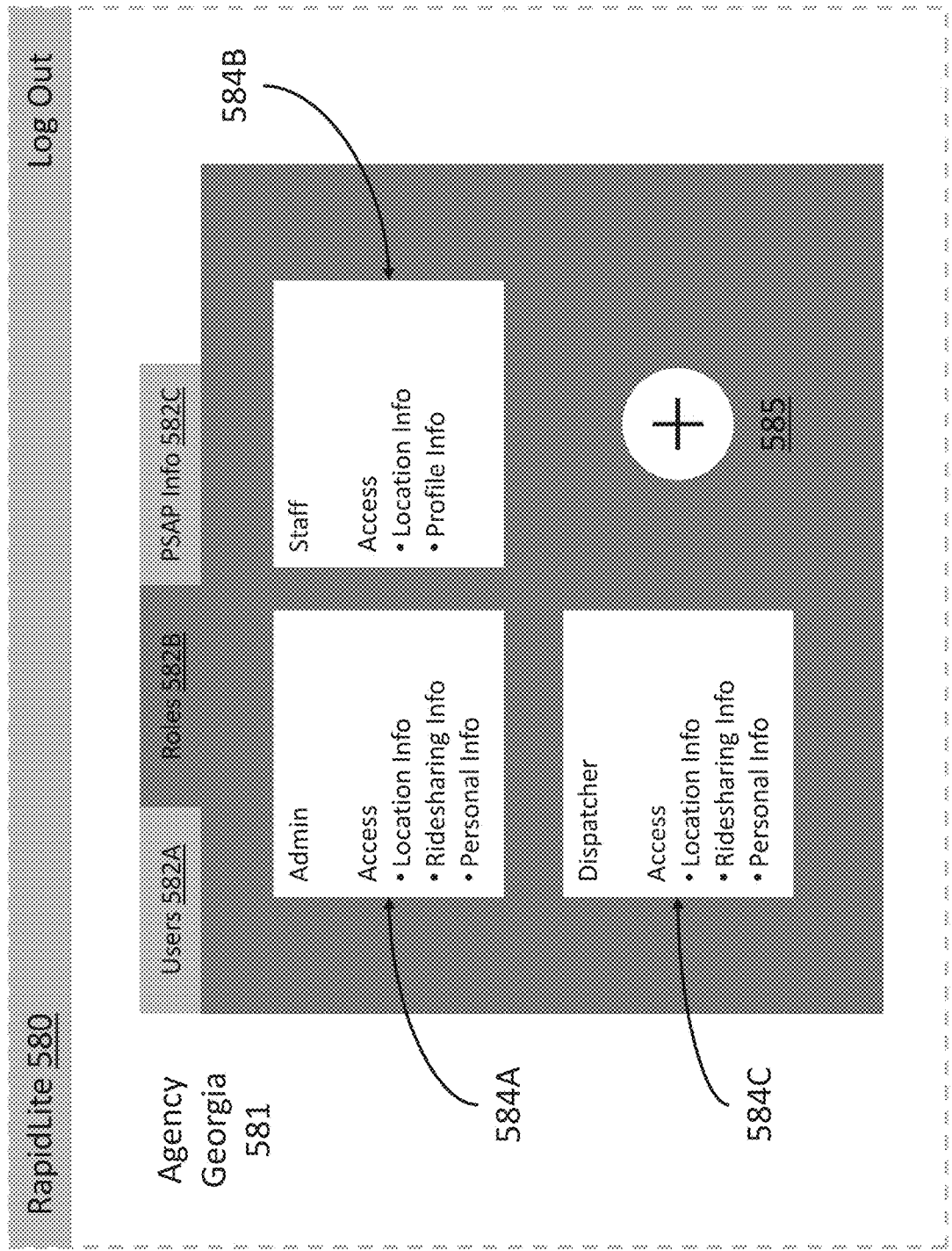

In some embodiments, a PSAP administrator can access the Roles tab 582B to create new roles for a particular PSAP or edit existing roles, as depicted by FIGS. 5D-5F. In some embodiments, the Roles tab 582B is a graphical user interface (GUI) of a management portal. As shown in FIG. 5D, two existing roles for the Georgia PSAP are displayed within the Roles tab 582B, the admin role 584A and the staff role 584B. In some embodiments, as depicted by FIG. 5D, roles for a particular PSAP are displayed within the Roles tab 582B as tiles that can be selected. In some embodiments, as depicted by FIG. 5D, the tiles representing roles display the emergency data fields, or emergency data categories (i.e., groups of emergency data fields, as described above), that the roles have been given access to. For example, as shown in FIG. 5D, the admin role 584A for the Georgia PSAP has been given access to the Location Information, Ridesharing Information, and Personal Information emergency data categories. The staff role 584B for the Georgia PSAP has been given access to the Location Information and Personal Information emergency data categories. In some embodiments, the Roles tab 582B includes a create new role button 585. In some embodiments, as depicted in FIG. 5E, when a tile representing a role is selected within the Roles tab 582B, the tile expands to display all of the emergency data fields or emergency data categories provided by the clearinghouse and allow a PSAP administrator to select or deselect emergency data fields or emergency data categories 586 to be made accessible for the role, to edit the title of the role in text box 586A, or to save the edited role with save button 586B. In some embodiments, one or more emergency data fields or emergency data categories may not be able to be deselected. For example, as shown in FIG. 5E, while Ridesharing Information is unselected (unchecked box) and Personal Information is selected (checked box), Location Information is permanently selected (filled in box) and cannot be deselected. In some embodiments, a PSAP administrator can create a new role for a PSAP by selecting the create new role button 585. For example, as shown in FIG. 5F, an administrator of the Georgia PSAP can create a "Dispatcher" role 584C. In this example, the Location Information, Ridesharing Information, and Personal Information emergency data categories have been selected to be made accessible for the Dispatcher role 584C.

Figure 5G:
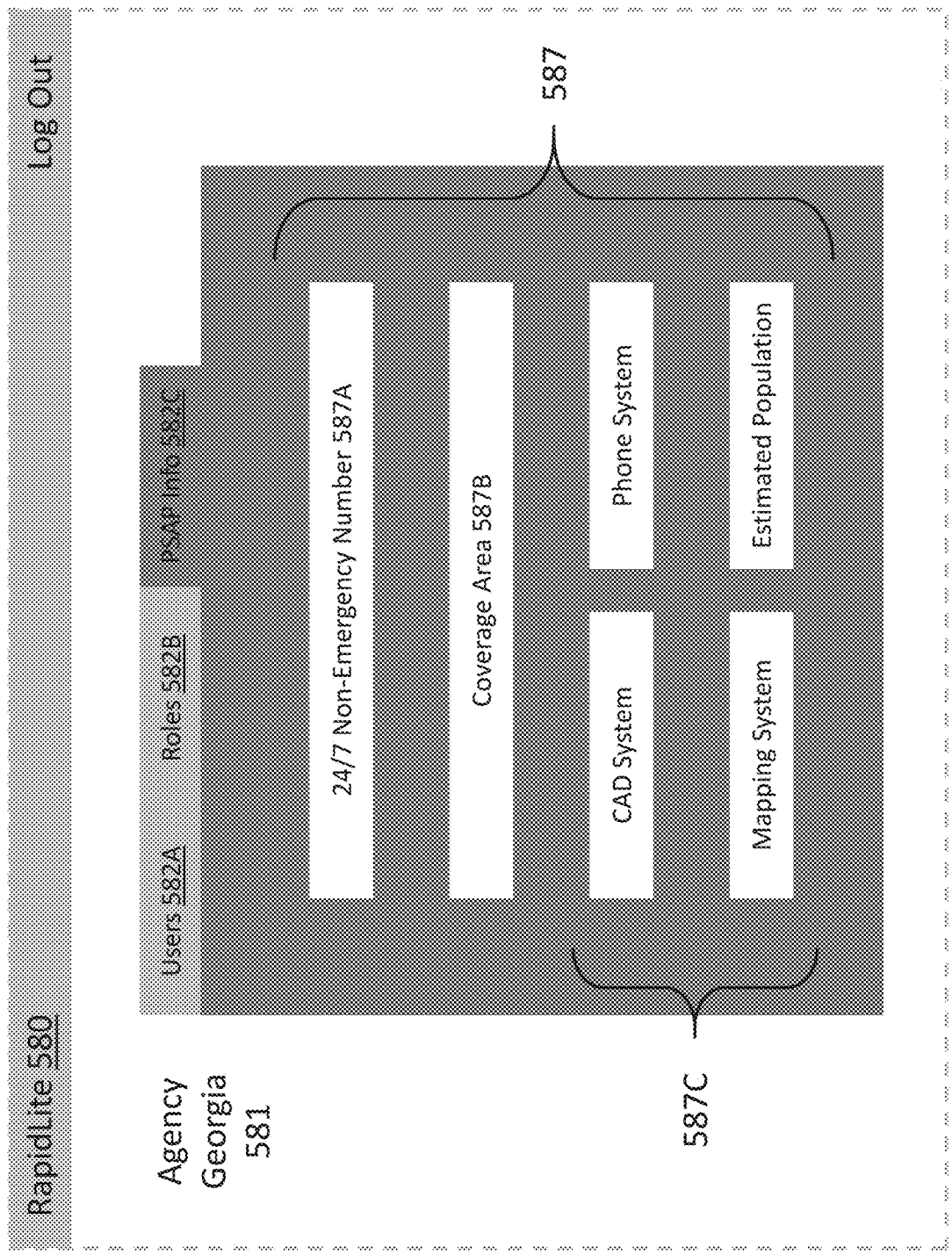

In providing the web application 580 to PSAPs (and the potentially sensitive emergency data stored within the clearinghouse, by extension) in the most accessible way possible, it is advantageous to provide rigorous security precautions and functions specifically created and suited for the web application 580, as will be described below. In some embodiments, if a PSAP desires to access the emergency data stored within the clearinghouse, an administrator of the PSAP (hereinafter, "PSAP administrator" or "PSAP admin") can navigate to the web application 580 using a URL in a standard web browser. The PSAP administrator can then use interactive elements of the web application 580 to request access to the clearinghouse using the web application 580. In some embodiments, upon selecting to request access to the web application 580, the web application 580 prompts the PSAP administrator to submit information 587 about the PSAP through the web application 580, as depicted in FIG. 5G, such as through a PSAP information tab 582C. In some embodiments, the information about the PSAP includes the name of the PSAP (hereinafter, "PSAP name") 581, a non-emergency hardline telephone number of the PSAP (hereinafter, "non-emergency number") 587A, the coverage area or jurisdiction of the PSAP 587B (e.g., a geofence defining the authoritative region of the PSAP), and other information 587C. In some embodiments, other information 587C includes at least one of a type of computer aided dispatch (CAD) system used by the PSAP, a type of phone system used by the PSAP, a type of mapping system used by the PSAP, and an estimated population covered by the PSAP (i.e., an approximate number of people who reside within the jurisdiction of the PSAP). In some embodiments, the PSAP administrator can use interactive elements to define a geofence representing the jurisdiction of the PSAP 587B, as described below. In some embodiments, the PSAP is not granted access to the web application 580 if some or all of the information 587 is not submitted by the PSAP administrator. In some embodiments, the PSAP administrator edits or resubmits the information 587 about the PSAP by selecting the PSAP Information tab 582C. In some embodiments, after the PSAP is granted access to the web application 580 and/or the clearinghouse, the PSAP administrator can create accounts for other employees or members of the PSAP by selecting the Users tab 582A, as described above.

Emergency Data Management

Figure 6:
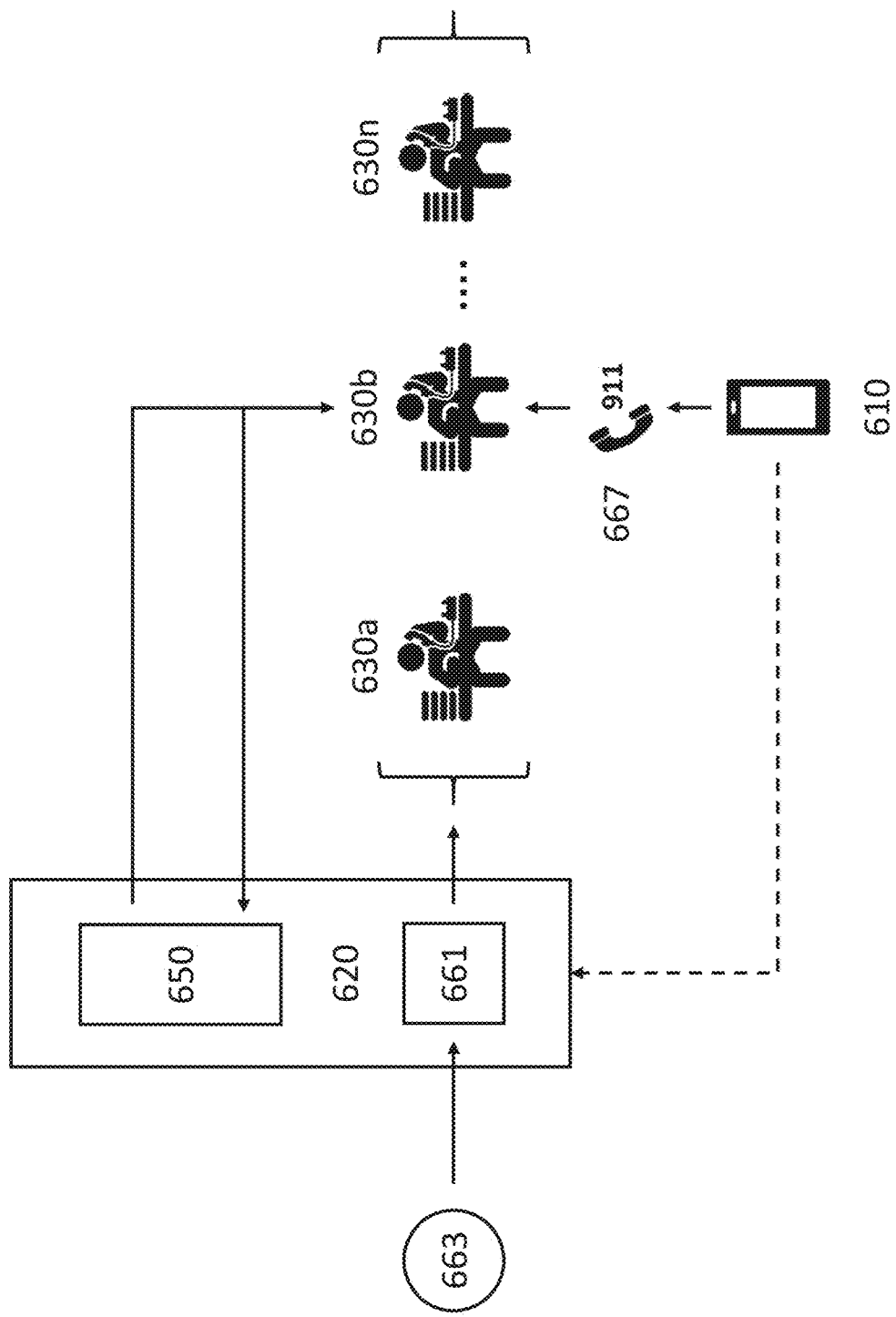
FIG. 6 depicts a diagram of an emergency data management process in accordance with one embodiment.

FIG. 6 depicts a diagram of an emergency data management process in accordance with one embodiment. In some embodiments, an electronic device 610 transmits data before, during, or after emergency situations to an emergency management system (EMS) 620. The data includes locations and additional data, as described above. In some embodiments, as described above, the EMS 620 stores the data in an Emergency Clearinghouse 650 for retrieval by emergency service providers (ESP) 630a-630n. ESPs 630a-630n can request and receive data from the EMS 620 during emergency situations to aid in quickly, efficiently, and effectively respond to emergencies.

In some embodiments, an ESP administrator 663 access a management portal 661 to select emergency data fields to be sent to particular PSAPs 630 or particular ESP personnel within the particular ESPs 630a-630n, as described above. For example, as depicted by FIG. 6, an ESP administrator 663 has authority over ESPs 630a-630n. The ESP administrator 663 accesses the management portal 661 and select a particular ESP 630a-630n under the ESP administrator's authority, such as ESP 630b, and select one or more emergency data fields to be made available for ESP 630b, as described above. In some embodiments, when an emergency call is made from an electronic device 610, an emergency alert 667 is generated and delivered to both the EMS 620 and an ESP 630a-630n. In addition to the emergency alert, the electronic device 610 sends data to the EMS 620, such as through the clearinghouse 650, as described above. This data can include locations, personal information, medical information, heath data, etc. In some embodiments, the EMS 620 or clearinghouse 650 may also contains preexisting (e.g., before the emergency alert is generated and sent) data associated with the electronic device 610 or a user of the electronic device 610. In some embodiments, after receiving the emergency alert, the ESP 630a-630n sends an emergency data request to the EMS 620 or clearinghouse 650 to request emergency data associated with the emergency alert. The EMS 620 or clearinghouse 650 then gathers emergency data associated with the emergency alert and returns the emergency data available for the emergency data fields selected to be made available for the ESP 630a-630n at the management portal 661.

Figure 7:
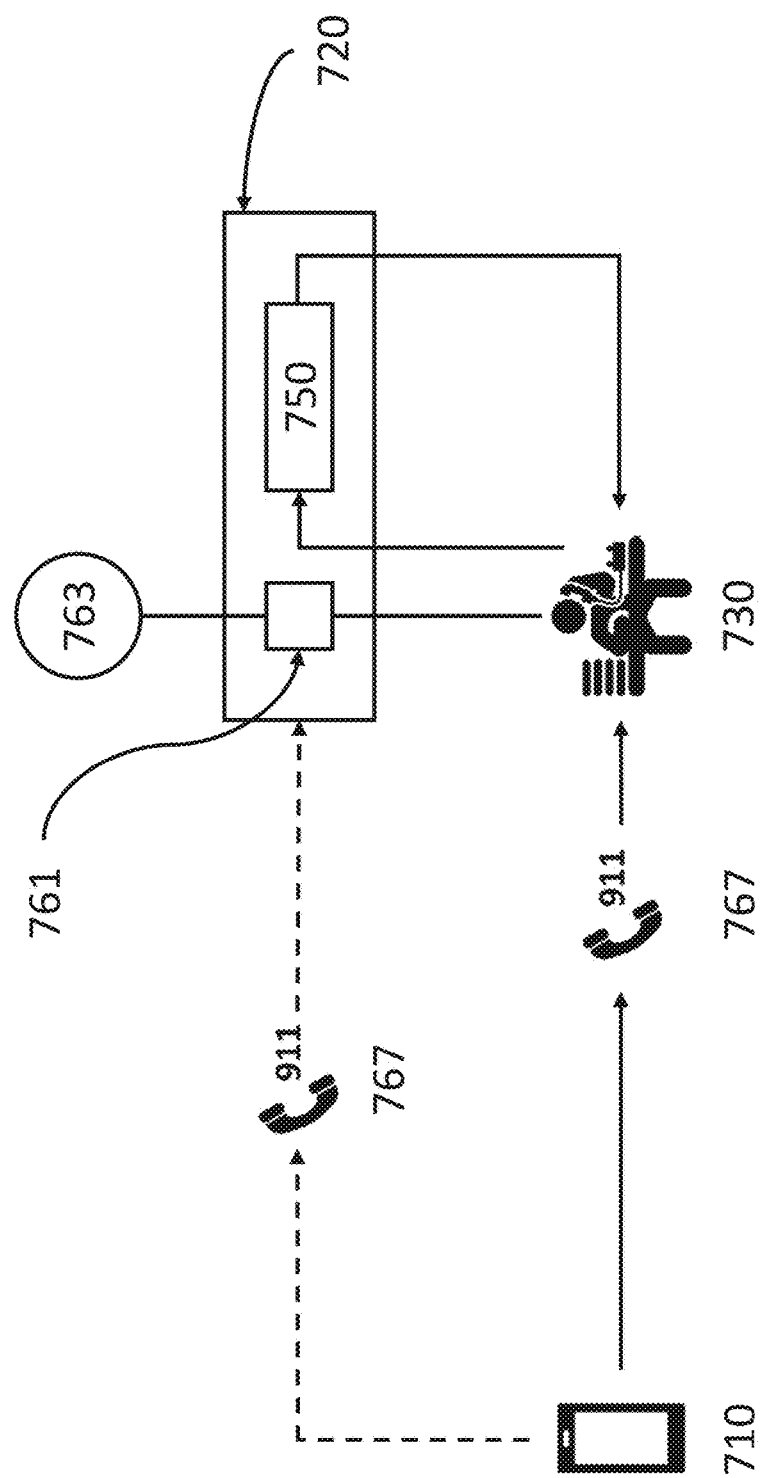
FIG. 7 depicts n flow diagram of an emergency data management process in accordance with one embodiment.

FIG. 7 depicts a flow diagram of an emergency data management process in accordance with one embodiment. In one example, an ESP administrator 763 accesses the management portal 761 and selects locations and personal information (as described above) to be made available for the PSAP 730 (or a particular member of the PSAP 730). In this example, an electronic device 710 generates an emergency alert 767 and simultaneously sends the emergency alert 767 to both the EMS 720 and the PSAP 730. In addition to the emergency alert 767, the electronic device 710 sends a device-based hybrid location generated simultaneously with the emergency alert 767, demographic data associated with a user of the electronic device 710, and a list of emergency contacts to the EMS 720. In this example, the EMS 720 already contains a medical history of the user associated with the electronic device 710 and a user submitted home address of the user. After receiving the emergency alert 767, the PSAP 730 sends an emergency data request to the EMS 720 or the clearinghouse 750. The EMS 720 then gathers any and all data stored within the EMS 720 associated with the emergency alert 767. In this example, the EMS 720 is able to gather the device-based hybrid location, the demographic data associated with the user of the electronic device 710, the list of emergency contacts, the medical history of the user, and the user submitted home address. However, the ESP administrator 763 only selected locations and personal information to be made available to the PSAP 730. Therefore, in this example, the EMS 720 returns the device-based hybrid location, the user submitted home address, and the demographic data associated with the user of the electronic device to the PSAP 730. The list of emergency contacts and the medical history of the user are excluded from the response from the EMS 720.

Authentication

Figure 8A:
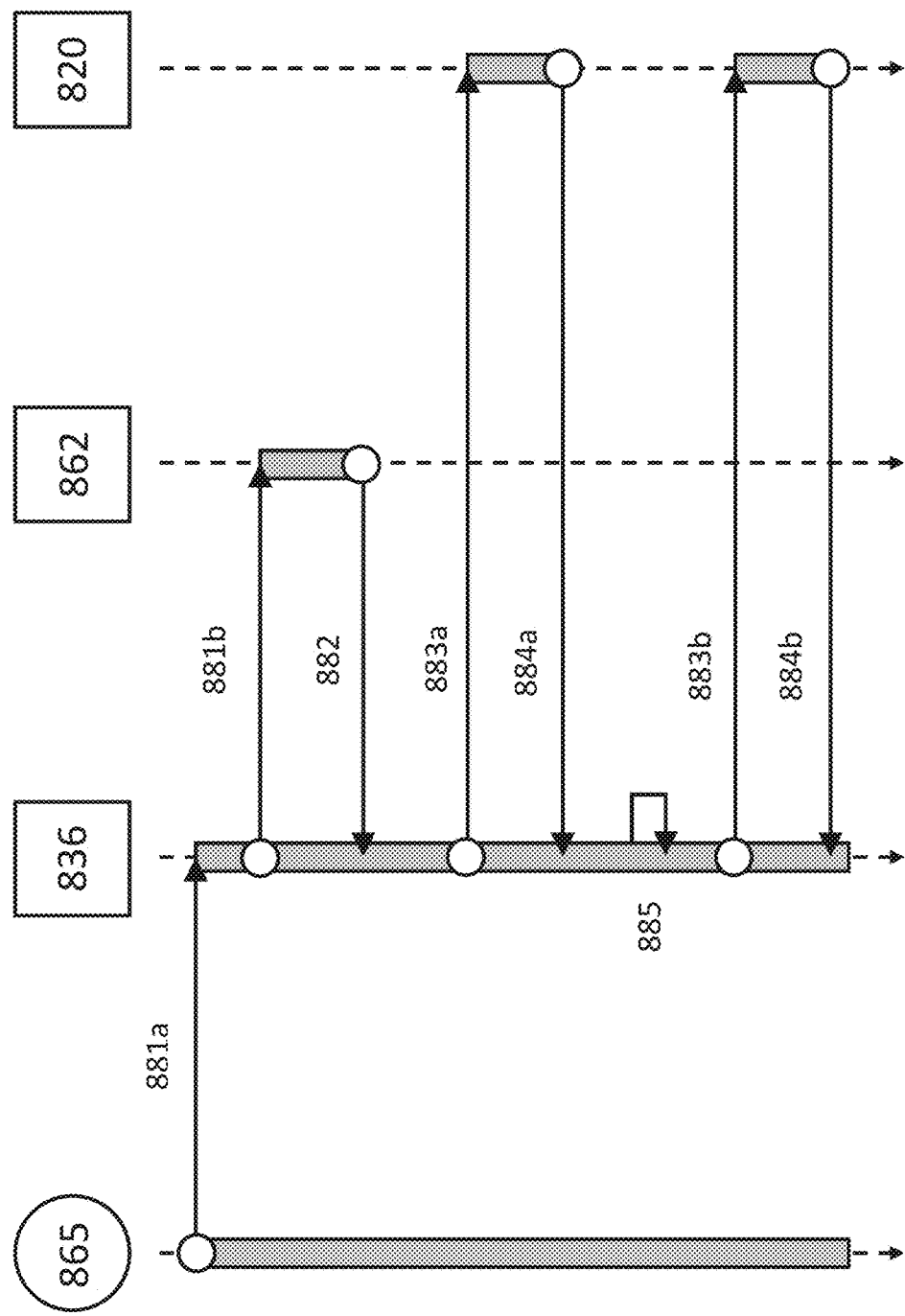
FIG. 8A depicts a flow diagram of an authentication process in accordance with one embodiment.
Figure 8B:
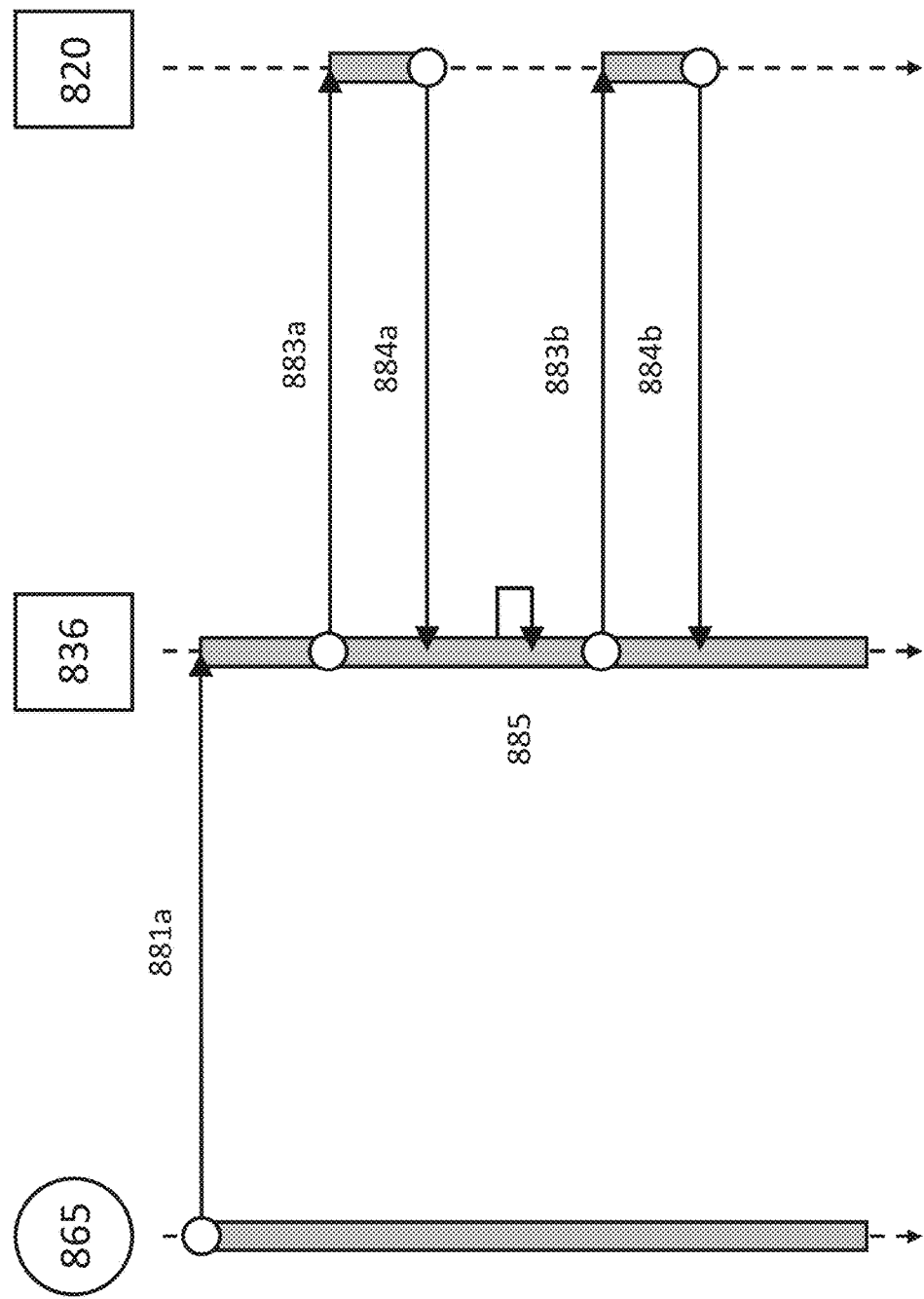
FIG. 8B depicts a second flow diagram of an authentication process in accordance with one embodiment.

FIGS. 8A and 8B depict flow diagrams of an authentication process in accordance with one embodiment. In some embodiments, as depicted in FIG. 8A, an ESP personnel 865 logs into an ESP console 836 by providing the ESP console 836 with log in credentials 881a (e.g., a username and password, config file). In some embodiments, after the ESP personnel logs into the ESP console 836, the ESP console 836 automatically transmits log in credentials 881b of the ESP personnel to a third-party network 862. In this embodiment, the third-party network can then identify a role preassigned to the ESP personnel 865 (such as by recognizing the log in credentials 881b) and return a data packet 882 for accessing the EMS 820. In some embodiments, the data packet 882 includes credentials or access keys for accessing the EMS 820, call types for which to receive emergency data from the EMS 820, a data window URL to retrieve a webpage to display the enhanced data window (as described below), and a session token URL to retrieve a session token. In some embodiments, the call types for which to retrieve emergency data from the EMS 820 include wireless voice calls, text calls, landline calls, and emergency callbacks.

In some embodiments, after the ESP console 836 receives the data packet 882 from the third-party network 862, the ESP console 836 transmits the credentials or access key for accessing the EMS 820, and an identifier of the role preassigned to the ESP personnel 865 to the EMS 820 using the session token URL received in the data packet 882 as an authentication request 883a. In some embodiments, the authentication request 883a is an HTTP POST request. For example, in some embodiments, the POST request includes an address of the EMS 820 server and a pointer to an authentication service in the form of https://[EMS_Server]/[Authorization_Service] (e.g., https://api.rapidsos.com/oauth/token, wherein [EMS_Server] (EMS Server)=api.rapidsos.com and [Authorization_Service] (Authentication Service)=oauth/token). In some embodiments, the POST request includes the following parameters:

client_id—unique identifier for the ESP of the ESP personnel 865 client_secret—password associated with the client_id grant type—role preassigned to the ESP personnel 865

In some embodiments, after receiving the authentication request 883a, the EMS 820 then verifies or authenticates the credentials or access key and the preassigned role and return an authentication response 884*a* including a session token that can be used to access the emergency data stored within the EMS 820. For example, in some embodiments, the authentication response 884*a* returned from the EMS 820 is in a JSON form and includes the following information:

access_token—short-lived OAuth 2.0 session token (access token)
token_type—token type descriptor (e.g., "BearerToken")
issued_at—UNIX timestamp in UTC of the time when the session token was issued
expires_in—number of seconds after which the access token will expire (e.g., 3600 seconds)

In some embodiments, the session token expires (token expiry 885) at a predetermined amount of time (hereinafter, "expiry time") elapsed from the time when the session token is issued. For example, in some embodiments, a session token expires after 3600 seconds. In some embodiments, the ESP console 836 automatically transmits a new authentication request 883*b* after two thirds of the expiry time has elapsed. After receiving the new authentication request 883*b*, the ESP 820 returns a new authentication response 884*b* to the ESP console 836. In some embodiments, a session token will continue to be used until a new session token is received by the ESP console 836. In some embodiments, a session token is used until the session token expires.

In some embodiments, as depicted in FIG. 8B, after the ESP personnel 865 logs into the ESP console 836 (such as by submitting log in credentials 881*a*), the ESP console 836 can transmit an authentication request 883*a* to the EMS 820 without first communicating with a third-party network. The EMS 820 can then verify the authentication request 883*a* and determine a role assigned to the ESP personnel 865 within the management portal without communicating with a third-party network 862. The EMS 820 can then return an authentication response 884*a*. In some embodiments, as described above, the session token included in the authentication response 884*a* expires (token expiry 885) after a predetermined amount of time has elapsed from the time that the token is issued. The ESP console 836 can then transmit a new authentication request 883*b* to the EMS 820, which in turn returns a new authentication response 884*b*.

In some embodiments, access keys are activated by completing due diligence by phone, email or mail verification. In some embodiments, access keys expire and must be renewed. In some embodiments, access is rate limited to a certain number of queries in a specified time limit (e.g., 1000 requests per minute) and monitored for abuse. In some embodiments, if a request with inactive or expired credentials is received, access is denied and an error is generated. In some embodiments, if an account or site has been compromised, the associated access keys are temporarily or permanently disabled. In some embodiments, access keys or credentials allow for differential access to different requesting parties, as described below.

Figure 8C:
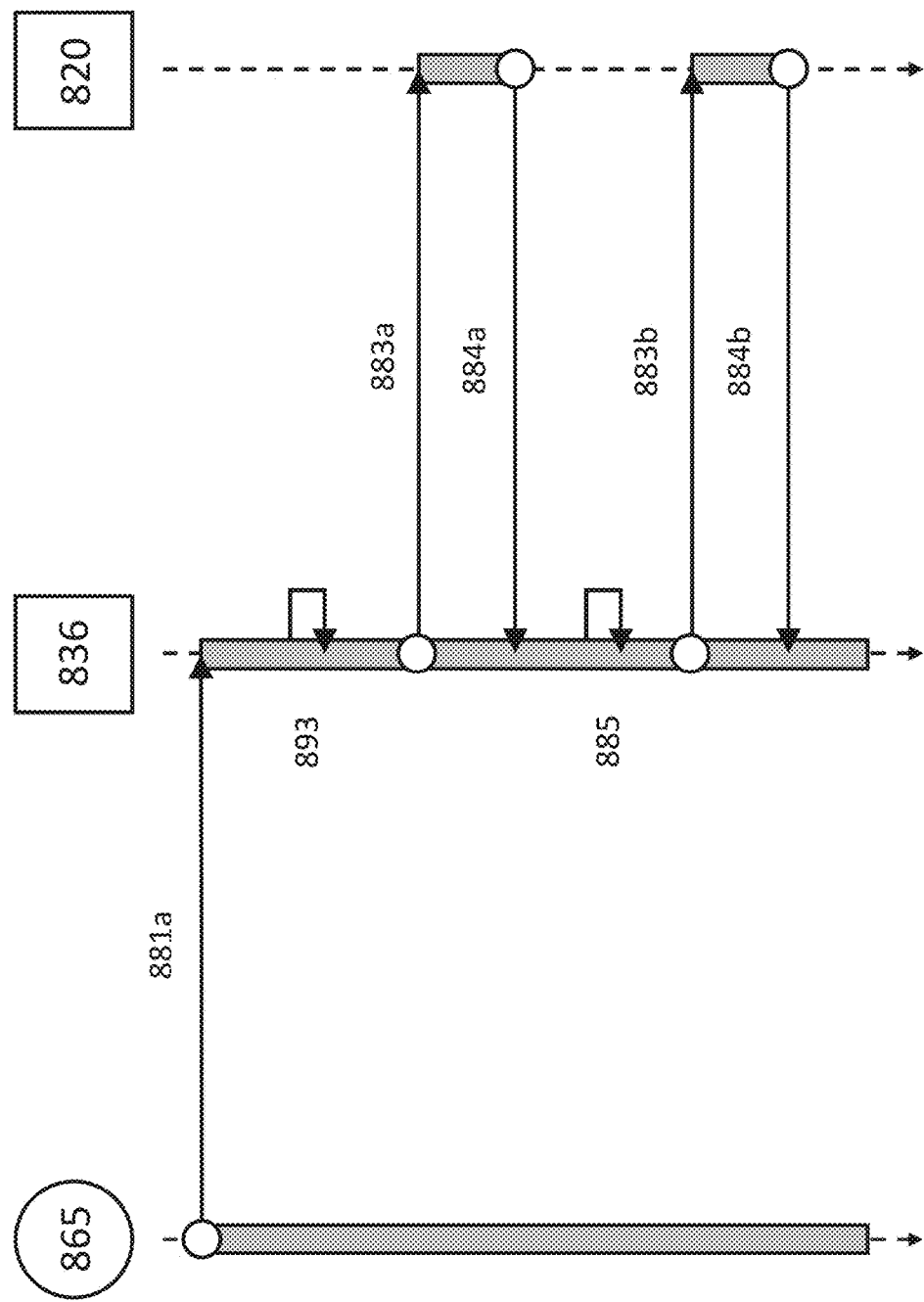
FIG. 8C depicts a third flow diagram of an authentication process in accordance with one embodiment.

In some embodiments, as mentioned above, the management portal and the enhanced data display are included in a standalone web application (e.g., an emergency response application). In some embodiments, as depicted by FIG. 8C, when an ESP personnel 865 logs into the standalone web application (such as by submitting a valid log in credentials 881*a*) at the ESP console 836, the management portal identifies a role associated with the ESP personnel 865 and the emergency data fields or emergency data categories selected to be made accessible for the role. The management portal then returns one or more indicators 893 (e.g., tags) of the emergency data fields or emergency data categories selected to be made accessible for the role to the standalone web application. After the ESP personnel 865 logs into the web application at the ESP console 836, the ESP console 836 also sends an authentication request 883*a* to the EMS 820 and receives an authentication response 884*a* from the EMS 820, as described above. In some embodiments, as described above, the session token included in the authentication response 884*a* expires (token expiry 885) after a predetermined amount of time has elapsed from the time that the token is issued. The ESP console 836 can then transmit a new authentication request 883*b* to the EMS 820, which in turn returns a new authentication response 884*b*.

Authentication, Credentials & Roles

To ensure the security, privacy and integrity of the data provided to the ESP, proper authentication may be required at various steps. The authorization process may require the ESP member or user of the enhanced data display (shown in FIGS. 10A-B, 11A-C) to verify their identity through the use of credentials such as log-in password, config file (e.g., a configuration created in a third-party system), etc. In some embodiments, the ESP member provides fingerprint, voice command, etc. to log-in, which can be verified.

Various types of credentials may be utilized as a part of the authentication process. Credentials may be generated, stored, verified and validated by the EMS. In some embodiments, the credentials are generated, and must be verified (e.g., phone verification) before use. In some embodiments, the credentials are valid for a specific duration of time (e.g., 1 minute, 5 minutes, 1 hour, 24 hours, etc.). Some credentials are access keys, admin credentials, time-limited tokens, etc. In some embodiments, credentials are transmitted through secure pathways (e.g., using encryption).

In some embodiments, credentials are used in a two-step authentication process. As an example, the authentication requires: (i) a log-in and password for the ESP member to log-in the ESP system (e.g., FIG. 8A) and (ii) a time-limited access token to be generated based on an authentication request. In some embodiments, a role (as described above) may be combined with the credentials and access token to create a three-step authentication process. For example, an administrator of the ESP could have designated roles for various ESP members and selected specific emergency data fields to be made accessible for each role.

In contrast to system-generated credentials which must be created, stored and managed in specific ways, roles can be assigned by the admin to each member of the ESP. Examples of roles include admin, agent, call taker, supervisor, manager, and other ESP personnel. In contrast to credentials, roles do not need to be verified by system as they are usually admin-defined. In addition, the admin can update the role of an ESP member to accurately reflect changes in jobs, positions and responsibilities. In this way, the use of the roles allows the admin to customize the management portal to reflect the organizations under their supervision. In some embodiments, an ESP member has multiple admin-defined roles. In some embodiments, default roles are provided by the management portal for ESP administrators to choose between for a member of an ESP under the authority of the ESP administrator. For example, in some embodiments, the management portal provides two default roles, an admin role and an agent (or staff) role. The default roles have different pre-assigned sets of emergency data fields and emergency data categories to be made accessible for specific roles.

In some embodiments, the authentication of the data request is carried out through the use of a credential, which is included in the data request (e.g., in the header of the request). When the emergency clearinghouse receives the request, the credential (e.g., a token) is verified to ensure that it is valid and has not expired. In some embodiments, the data request also includes an identifier for the admin-defined role for the ESP member. In some embodiments, the data request also includes the emergency data fields or emergency data categories, or indicators (e.g., tags) of the emergency data fields or emergency data categories, that are accessible for the requesting party. In some embodiments, the data request includes the account name or organization name, which may be used to pull up the associated geofence of the requesting party.

Due to the diversity of ESP members (e.g., call dispatcher, PSAP manager, police, paramedic) and the need for accurate and relevant data, there are specific challenges for emergency response. Although system-defined credentials may also be used to restrict access to emergency data, admin-defined roles were incorporated to allow the customization needed for different ESP members. In this way, the present system allows for both secure authentication and significant customizations for managing access to emergency data for various members of the organization.

With technological advances, the amount and types of data generated about emergencies have exploded, e.g., sensor data, Iot data, environmental data, health data, etc. Some of the data may be so critical, it should be always accessible to emergency personnel. Although it is obvious to make all available data to be made accessible, some of the data may be redundant or distracting and may hamper emergency response. As a result, it is important for each ESP organization with diverse roles and organization structures, to be able to manage data access to ESP users.

Emergency Data Retrieval

Figure 9:
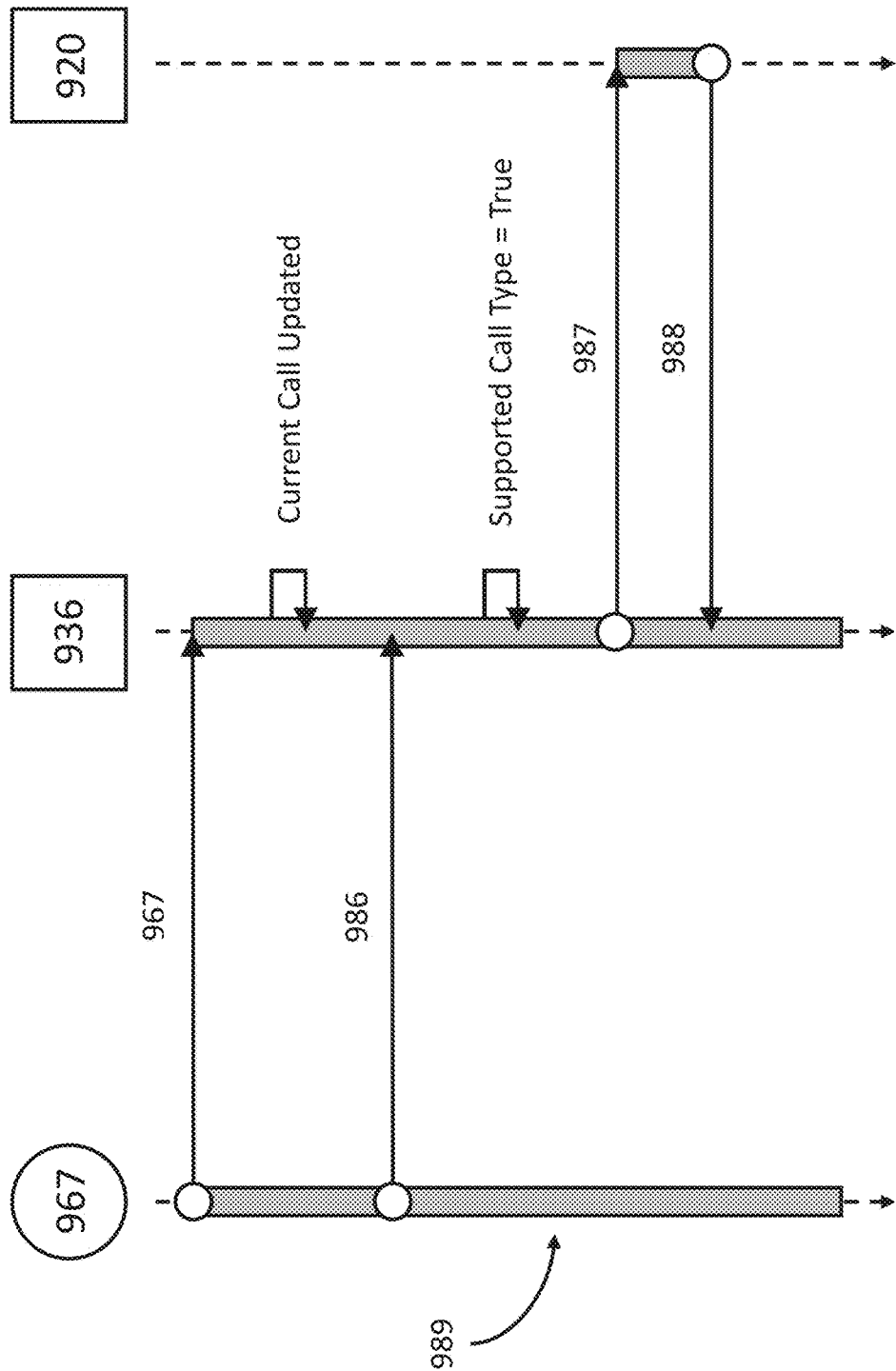
FIG. 9 depicts an flow diagram of an emergency data retrieval process in accordance with one embodiment.

FIG. 9 depicts a flow diagram of an emergency data retrieval process in accordance with one embodiment. In some embodiments, when an emergency alert 967 is received by the ESP (e.g., when a PSAP receives a 911 call), the emergency alert 967 is presented to the ESP console 936. In some embodiments, the ESP console 936 verifies the call type (e.g., wireless voice call, text call, landline call, or emergency callback). After receiving the emergency alert 967, an ESP personnel handling the emergency request (e.g., logged into the ESP console 936 that received the emergency alert 967) requests emergency data associated with the emergency alert 967 from the EMS 920, as described above. For example, in some embodiments, the ESP personnel select a Request Emergency Data button at the ESP console 936. In response to the selection of the Request Emergency Data button, the ESP console 936 transmits an emergency data request 987 to the EMS 920. In some embodiments, the emergency data request 987 is automatically sent to the EMS 920 from the ESP console 936 in response to receiving or detecting the emergency alert 967. In some embodiments, the emergency data request 987 is an HTTP GET request, as described above. In some embodiments, as described above, the emergency data request 987 includes an identifier associated with the emergency alert 967. For example, in some embodiments, the emergency alert 967 is a 9-1-1 call made by a cell phone and the identifier associated with the emergency alert is the phone number of the cell phone. In some embodiments, the emergency data request 987 is sent using a data window URL received from a third-party network, as described above. In some embodiments, the data window URL includes an address of the EMS server and an identifier of the emergency alert 967 in the form of https://[EMS_Server]?[Alert_ID] (e.g., https://api.rapidsos.com?caller_id={0}, wherein [EMS_Server] (EMS Server)=api.rapidsos.com and [Alert_ID] (emergency alert identifier)=caller_id={0}). In some embodiments, the identifier of the emergency alert 967 includes an 11-digit phone number (also referred to as a CPN) (e.g., caller_id=72743767911, wherein 72743767911 is the phone number associated with the emergency alert 967). In some embodiments, the data window URL additionally includes the session token.

In some embodiments, the emergency data request 987 is an HTTP request that includes the following parameters or information in the header of the request:

Authorization—a session token (e.g., an access token)

X-RapidSOS-Role—the role assigned to the requesting ESP personnel within the management portal In some embodiments, after receiving an emergency data request from the ESP console 936, the EMS 920 verifies the session token and role included in the emergency data request. After successfully verifying the session token and role included in the emergency data request, the EMS 920 gathers any and all emergency data associated with the emergency alert 967 (e.g., emergency data tagged with the same phone number or email associated with the emergency alert 967), as described above. In some embodiments, after gathering emergency data associated with the emergency alert, the EMS 920 returns to the ESP console 936 only the emergency data 988 associated with the emergency alert 967 available for emergency data fields selected at the management portal to be made accessible for the role of the requesting ESP personnel, as described above. In some embodiments, the EMS 920 returns to the ESP console 936 only the emergency data associated with the emergency alert 967 available for the emergency data fields selected at the management portal to be made accessible for the requesting ESP, as described above. In some embodiments, the EMS 920 returns all of the available emergency data associated with the emergency alert 967 to the ESP console 936. In some embodiments, before gathering emergency data associated with the emergency alert 967, the EMS 920 verifies that the call type is a call type supported by the EMS 920 or the ESP console 936. In some embodiments, the EMS 920 only returns emergency data to the ESP console 936 during the duration of an emergency session 989 associated with an emergency alert. In some embodiments, the EMS 920 only returns emergency data to the ESP console 936 after the ESP has received data from an ALI database 986.

In some embodiments, after authenticating an ESP or ESP personnel, the EMS 920 automatically returns appropriate emergency data to the ESP console 936 in response to detecting an emergency alert 967 presented to the ESP console 936, without receiving an emergency data request from the ESP or ESP personnel. In some embodiments, the EMS 920 additionally automatically provides a new or updated return of appropriate emergency data to the ESP console 936. In some embodiments, the EMS 920 provides a new or updated return of appropriate emergency data to the ESP console 936 in real-time when new or updated emergency data associated with the emergency alert 967 is received by the EMS 920. In some embodiments, the EMS 920 provides a new or updated return of appropriate emergency data to the ESP console 936 according to a predetermined time interval.

In some embodiments, a system for managing access to emergency data for emergency service providers comprises: a) a management portal implemented as one or more software modules on a computing system comprising a processor and a non-transitory computer readable storage medium and configured to: i) establish a first role that can be selected for one or more users within an ESP; and ii) define a first set of emergency data fields to be made accessible for the first role from a plurality of emergency data fields; b) an emergency response application implemented as one or more software modules on a computing system comprising a processor, a display, and a non-transitory computer readable storage medium and configured to: i) allow an ESP user to login to the emergency response application, wherein the ESP user is associated with the first role; ii) generate an emergency data request comprising an identifier associated with an emergency alert; and iii) transmit the emergency data request to an emergency management system; and c) the emergency management system, implemented as one or more software modules on a cloud computing system comprising a processor and a non-transitory computer readable storage medium and configured to: i) receive the emergency data request from the emergency response application; ii) gather, using the identifier associated with the emergency alert, emergency data associated with the emergency alert available for the first set of emergency data fields made accessible for the first role; and iii) securely transmit the emergency data associated with the emergency alert available for the first set of emergency data fields made accessible for the first role to the emergency response application for display on of the computing system. In some embodiments, the management portal is further configured to: a) establish a second role that can be selected for one or more users within the ESP; and b) define a second set of emergency data fields to be made accessible for the second role from the plurality of emergency data fields, wherein the first set of emergency data fields and the second set of emergency data fields comprise different sets of emergency data fields. In some embodiments, defining the first set of emergency data fields comprises defining one or more emergency data categories, wherein each emergency data category comprises at least one emergency data field. In some embodiments, the emergency data request comprises one or more tags indicative of the set of emergency data categories to be made accessible for the first role; and the emergency management system is further configured to determine the set of emergency data categories to be made accessible for the first role using the one or more tags. In some embodiments, the emergency response application is further configured to detect the emergency alert when the emergency alert is received by the ESP and autonomously generate the emergency data request in response to detecting the emergency alert. In some embodiments, the emergency response application is further configured to generate the emergency data request in response to user input at the emergency response application. In some embodiments, the management portal further comprises a graphical user interface displayed at a display of the computing system on which the management portal is implemented and wherein the management portal is further configured to: a) display the plurality of emergency data fields on the display; and b) receive choice of the set of emergency data fields from the plurality of emergency data fields by an administrator of the ESP through the graphical user interface. In some embodiments, the emergency data request comprises one or more tags indicative of the set of emergency data fields to be made accessible for the first role; and the emergency management system is further configured to determine the set of emergency data fields to be made accessible for the first role using the one or more tags. In some embodiments, the emergency data request comprises an identifier of the first role; and the emergency management system is further configured to determine the set of emergency data fields to be made accessible for the first role by querying the management portal using the identifier of the first role. In some embodiments, the emergency response application is further configured to detect the emergency alert, wherein the emergency alert is generated by an electronic device and wherein the identifier associated with the emergency alert is a phone number associated with the electronic device. In some embodiments, the emergency alert is an emergency all made to the ESP by the electronic device. In some embodiments, the set of emergency data fields to be made accessible for the role comprises location data and wherein the emergency data associated with the emergency alert comprises a location. In some embodiments, the emergency management system is further configured to: a) obtain a location associated with the emergency alert; b) access a geofence associated with the ESP; and c) determine if the location falls within the geofence associated with the ESP. In some embodiments, the emergency management system further comprises a software module configured to ingest data from at least one electronic device associated with the emergency alert.

In some embodiments, a system for managing access to emergency data for emergency service providers comprises: a) a management portal implemented as one or more software modules on a computing system comprising a processor and a non-transitory computer readable storage medium and configured to: i) establish a first role that can be selected for one or more users within an ESP; and ii) define a first set of emergency data fields to be made accessible for the first role from a plurality of emergency data fields; and b) an emergency response application implemented as one or more software modules on a computing system comprising a processor, a display, and a non-transitory computer readable storage medium and configured to: i) allow an ESP user to login to the emergency response application, wherein the ESP user is associated with the first role; ii) generate an emergency data request comprising an identifier associated with an emergency alert; iii) transmit the emergency data request to an emergency management system; iv) receive emergency data associated with the emergency alert available for the first set of emergency data fields made accessible for the first role from the emergency management system; and v) display the emergency data on the computing system.

In some embodiments, a system for managing access to emergency data for emergency service providers comprises: a) a management portal implemented as one or more software modules on a computing system comprising a processor and a non-transitory computer readable storage medium and configured to: i) establish a first role that can be selected for one or more users within an ESP; and ii) define a first set of emergency data fields to be made accessible for the first role from a plurality of emergency data fields; and b) the emergency management system, implemented as one or more software modules on a cloud computing system comprising a processor and a non-transitory computer readable storage medium and configured to: i) receive an emergency data request comprising an identifier associated with an emergency alert from an account of an ESP user associated with the first role at the ESP; ii) gather, using the identifier associated with the emergency alert, emergency data associated with the emergency alert available for the first set of emergency data fields made accessible for the first role; and iii) securely transmit the emergency data associated with the emergency alert available for the first set of emergency data fields made accessible for the first role to the ESP for display at a computing system within the ESP.

In some embodiments, a method for managing access to emergency data by an emergency management system comprises: a) receiving selection of a role for an emergency service provider (ESP) user at a management portal by an admin user; b) displaying, within the management portal, a first set of data fields comprising data fields for selection and deselection; c) receiving a second set of data fields to be made accessible for the role from the first set of data fields, wherein the second set of data fields is a subset of the first set of data fields; d) receiving an emergency data request comprising an identifier associated with an emergency alert, wherein the emergency data request is generated in response to a query by the ESP user; e) gathering emergency data associated with the emergency alert available for the second set of data categories using the identifier associated with the emergency alert; and f) securely transmitting, to the ESP, the emergency data associated with the emergency alert available for the second set of data categories in response to receiving the emergency data request, wherein the emergency data associated with the emergency alert available for the second set of data categories is displayed at an electronic device associated with the ESP user.

In some embodiments, a method for managing access to emergency data by an emergency management system comprises: a) displaying, within the management portal, a first set of data categories comprising data categories for selection and deselection by an admin user of the emergency service provider; b) receiving a second set of data categories to be made accessible to a plurality of users of the ESP from the first set of data categories, wherein the second set of data categories is a subset of the first set of data categories; c) receiving an emergency data request comprising an identifier associated with an emergency alert from an ESP user; d) gathering emergency data associated with the emergency alert available for the second set of data categories using the identifier associated with the emergency alert; and e) securely transmitting, to the ESP, the data associated with the emergency alert available for the second set of data categories in response to receiving the emergency data request, wherein the data associated with the emergency alert available for the second set of data categories is displayed at an electronic device associated with the ESP user.

In some embodiments, a method for managing access to emergency data for emergency service providers by an emergency management system comprises: a) receiving at least one role from an emergency service provider (ESP) at a management portal; b) displaying, within the management portal, a first set of data categories for selection or deselection; c) receiving a second set of data categories to be made accessible for the role form the first set of data categories, wherein the second set of data categories is a subset of the first set of data categories; d) detecting an emergency alert; e) autonomously generating an emergency data request comprising an identifier associated with the emergency alert; f) gathering emergency data associated with the emergency alert available for the second set of data categories using the identifier associated with the emergency alert; and g) securely transmitting, to the ESP, the data associated with the emergency alert available for the second set of data categories in response to receiving the emergency data request, wherein the data associated with the emergency alert available for the second set of data categories is displayed at an electronic device associated with the ESP for providing an emergency response.

Data Source Restrictions

In some embodiments, as described above, the ingestion modules 258 tag data received by the clearinghouse 250 based on the data source (e.g., device name or type, application name, user name, phone number, corporate account, etc.). In some embodiments, the EMS 920 restricts emergency data returned to an ESP to a particular data source. For example, in some embodiments, the EMS 920 restricts emergency data returned to an ESP to data received from the electronic device that generated the associated emergency alert. In some embodiments, the EMS 920 restricts data returned to an ESP to data generated by the electronic device that generated the associated emergency alert 967. In some embodiments, the EMS 920 restricts data returned to an ESP to data received from a mobile application from which the associated emergency alert 967 was generated. However, the EMS 920 may also exclude data returned to an ESP based on data source. Differentiating between different data sources may be useful as user consent, privacy considerations, trustworthiness, and usefulness of the data can vary between sources can vary between sources.

For example, in some embodiments, the EMS 920 can exclude data from a particular data source that would otherwise available for an emergency data request. For example, in one embodiment, the EMS 920 tags data with a phone number as an identifier of a user associated with the phone number. In this example, John Doe is associated with the phone number (555) 555-555. John Doe has an Apple iPhone, an Apple Watch, and a ride sharing app (e.g., Uber or Lyft). Within the ride sharing app, John Doe has submitted his home address and work address as user submitted addresses, which have been received by the EMS 920, tagged with the identifier (555) 555-5555, and tagged with the data source "ride sharing app." In this example, if John Doe generates an emergency alert 967 through the ride sharing app (e.g., by selecting a panic button in the app if John Doe thinks his driver is endangering him), and an ESP sends the EMS 920 an emergency data request associated with (555) 555-5555, the EMS 920 can return the user submitted locations as well as locations generated by or received from John Doe's iPhone or Apple Watch to the ESP. However, in this example, if John Does generates an emergency alert 967 by dialing 9-1-1, and an ESP sends the EMS 920 an emergency data request associated with (555) 555-5555, the EMS 920 can return only the locations generated by or received from John Doe's iPhone and Apple Watch and exclude the user submitted locations because they were received by the EMS 920 from the ride sharing app.

Emergency Data Subscription

As described above, in some embodiments, an emergency management system (EMS) maintains a clearinghouse that obtains and shares emergency data to aid emergency service providers (ESPs) in responding to emergencies. During an emergency, an ESP can send an emergency data request to the EMS, and, in response, the EMS can send any available emergency data associated with the emergency to the requesting ESP. In some embodiments, as described above, the ESP includes an identifier associated with an emergency alert in the emergency data request. The EMS can then use the identifier associated with the emergency alert to retrieve emergency data associated with the emergency alert from the clearinghouse. For example, as described above, an ESP (e.g., a public safety answering point (PSAP)) can receive an emergency alert in the form of a 9-1-1 phone call (representative of an emergency or potential emergency) from a mobile phone associated with a phone number (e.g., (555) 555-5555)). The ESP can then send an emergency data request including the phone number (i.e., the identifier of the emergency alert) to the EMS, which can then retrieve any emergency data within the clearinghouse associated with the phone number and return the available emergency data to the requesting ESP. This process of returning emergency data to an ESP in response to an emergency data request is referred to as "pulling" emergency data from the clearinghouse.

However, in some embodiments, the EMS can "push" emergency data from the clearinghouse to an ESP (i.e., the EMS can send emergency data to an ESP without receiving an emergency data request). In some embodiments, the EMS pushes emergency data to ESPs using an emergency data subscription system. Using the emergency data subscription, a recipient (or potential recipient) of emergency data from the clearinghouse can subscribe to the clearinghouse for a particular device identifier or user identifier (hereinafter, "subscription"). After subscribing to a subscription, the recipient (e.g., an ESP or an ESP personnel) may automatically receive updates regarding the subscription without first sending an emergency data request. For example, in some embodiments, if an ESP subscribes to a phone number, whenever the clearinghouse receives updated emergency data associated with the phone number, the clearinghouse can automatically send the updated emergency data associated with the phone number to the ESP, without first receiving an emergency data request including the phone number. For example, in some embodiments, if a recipient is subscribed to a particular phone number, and the clearinghouse receives a new or updated location associated with the particular phone number, the clearinghouse will instantly and automatically push the new or updated location associated with the particular phone number to the recipient the moment that the new or updated location is received by the clearinghouse, without the recipient having to send an emergency data request. In some embodiments, the EMS establishes a websocket connection with an ESP in order to push emergency data regarding a subscription to which the ESP is subscribed to the ESP. WebSocket is a type of computer communications protocol. A websocket connection is a longstanding internet connection between a client and a server that allows for bidirectional communication between the client and server without the client needing to send data requests to the server, which differentiates the WebSocket computer communications protocol from other types of computer communications protocols such as the HyperTextual Transfer Protocol (HTTP). The WebSocket protocol is often used by chat clients to facilitate user to user webchats. In some embodiments, the EMS establishes a websocket connection with an ESP in response to receiving an emergency data request. In some embodiments, the EMS establishes a websocket connection with an ESP when an ESP personnel logs into an ESP console. In some embodiments, the EMS establishes a websocket connection with an ESP when an ESP personnel logs into the emergency response application. In some embodiments a websocket connection established between the EMS and an ESP is maintained by the EMS for the duration of the ESP personnel's log-in session.

In some embodiments, the EMS automatically subscribes a recipient to a subscription (e.g., a particular device identifier or user identifier) in response to receiving an emergency data request including the subscription or an identifier of the subscription. For example, in some embodiments, when an ESP personnel sends an emergency data request including a phone number to the EMS through their ESP console, the EMS subscribes the ESP personnel to the phone number and establishes a websocket connection with the ESP console. Then, whenever the clearinghouse receives updated emergency data associated with the phone number, the EMS can automatically push the updated emergency data associated with the phone number to the ESP console. For example, an ESP personnel logs into an emergency response application in communication with the EMS on the ESP personnel's ESP console. Subsequently, the ESP personnel receives a 9-1-1 call from a mobile phone and then generates and sends an emergency data request including the phone number of the mobile phone to the EMS through the emergency response application. The EMS then uses the phone number of the mobile phone to retrieve the most recent location associated with the mobile phone received by the clearinghouse and returns the most recent location associated with the mobile phone to the ESP personnel through the emergency response application. The EMS simultaneously subscribes the ESP personnel to the phone number of the mobile phone and establishes a websocket connection between the EMS and the ESP console and automatically pushes any updated emergency data (e.g., locations) associated with the phone number received by the clearinghouse to the emergency response application as soon as the updated emergency data associated with the phone number is received by the clearinghouse.

Enhanced Data Display

Figure 10A:
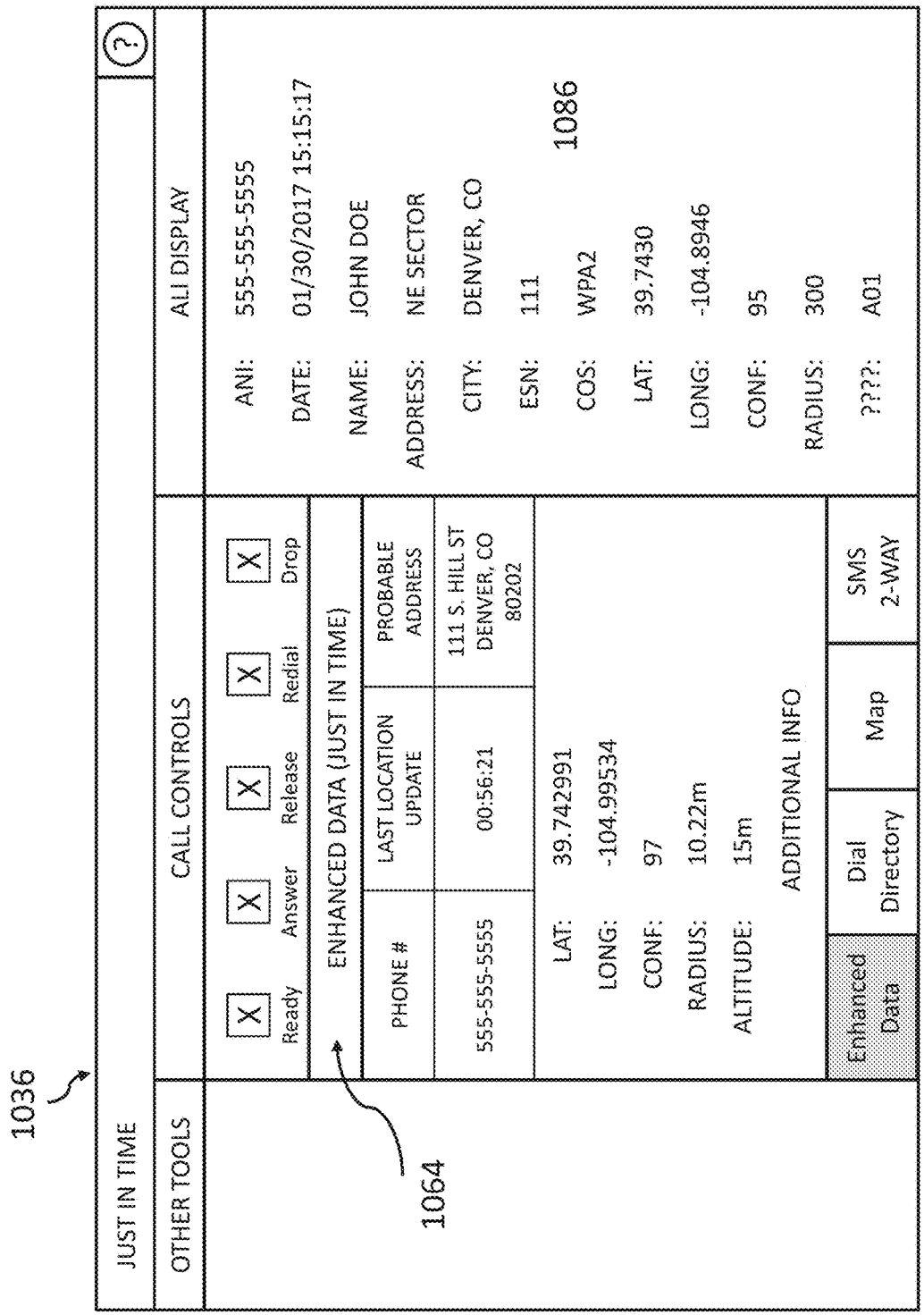
FIG. 10A illustrates an embodiment of an enhanced data display displaying location coordinates in accordance with one embodiment.
Figure 10B:
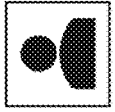
FIG. 10B illustrates an embodiment of an enhanced data display displaying demographic data in accordance with one embodiment.

FIGS. 10A and 10B illustrate embodiments of a tabular view of an enhanced data display in accordance with one embodiment. In some embodiments, the EMS returns the emergency data associated with the emergency alert by displaying the emergency data through the enhanced data display, as depicted by FIGS. 10A and 10B. In some embodiments, as depicted by FIGS. 10A and 10B, the enhanced data display 1064 is accessed in an embedded window within an existing ESP system console UI 1036, such as by selecting the enhanced data tab 1091. In some embodiments, the EMS only returns emergency data to an ESP console 1036 if the Enhanced Data Display tab button 1091 is selected. In some embodiments, the enhanced data display 1064 displays location information, as depicted by FIG. 10A, above additional data such as demographic data and profile picture, as depicted by FIG. 10B. The additional data may be in various formats including text, images, video, weblinks, etc. In some embodiments, the enhanced data display 1064 (including more accurate and comprehensive information) is displayed alongside basic data received from an ALI database 1086.

Figure 11A:
FIG. 11A illustrates an embodiment of an enhanced data display in accordance with one embodiment.
Figure 11B:
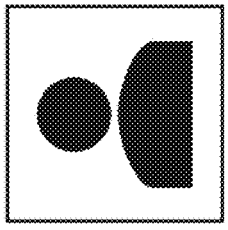
FIG. 11B illustrates an embodiment of an enhanced data display emphasizing demographic data in accordance with one embodiment.
Figure 11C:
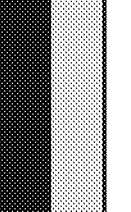
FIG. 11C illustrates an embodiment of an enhanced data display emphasizing contact information in accordance with one embodiment.

FIGS. 11A, 11B, and 11C illustrate embodiments of an enhanced data display in accordance with one embodiment. In some embodiments, the enhanced data display 1164 is a standalone window, as depicted in FIG. 11A, or a standalone application installed at the ESP system or console. In some embodiments, the enhanced data display 1164 displays emergency data returned from the EMS within discrete categories of emergency data. For example, in some embodiments, as depicted by FIG. 11A, the enhanced data display 1164 can separately display the "Demographics," "Contact Information," and "Addresses" emergency data categories in individual sections. In some embodiments, the "Demographics," "Contact Information," and "Addresses" emergency data categories (as described above) are displayed sequentially under a "Personal Information" (as described above) section of the enhanced data window 1164. In some embodiments, a "Medical Information" (as described above) section is displayed below the "Personal Information" section. For some roles with restricted access to medical data, the medical data is not displayed in this view. In some embodiments, the enhanced data display 1164 includes one or more tabs 1192 to filter emergency data categories. For example, as depicted in FIG. 11A, the enhanced data display 1164 can include a "Caller Information" tab, a "Location" tag, a "Caller-Provided Locations" tab, a "Devices" tab, and a "Directions" tab. In some embodiments, a "Directions" tab can be selected within the enhanced data display 1164 to render a map displaying directions from an ESP to a location of an emergency situation. In some embodiments, the map is capable of providing real-time or near real-time traffic updates.

In some embodiments, the enhanced data display (as shown in FIGS. 10A-B, 11A-C) includes one or more tabs such as a "location" tab, in which data pertaining to a specific topic (e.g., a particular emergency data category) is consolidated. In some embodiments, the data pertaining to location are marked or tagged as "location data" or saved as a part of an emergency data category or supergroup of emergency data categories in the clearinghouse 250 (see FIG. 2), as described in reference to FIG. 5B. In some embodiments, the data fields marked with a specific tag such as "location data" are selected by the administrator of the ESP, which optionally include one or more data fields pertaining to location. Thus, with one selection, the administrator allows access to several pieces of information that can be helpful for the emergency response.

An example of a list of data fields, which will be displayed in the location tab, include caller_id, location_time, latitude, longitude, uncertainty_radius, etc. In some embodiments, location-related data is included in the ingestion data, and are optionally hardwired not to be displayed as a data field for selection. A list of data fields can include: format_version (version of LEI format the data was rendered); created time (UNIX timestamp in UTC of when the location record was created); call_start_time (UNIX timestamp in UTC of when the emergency call began); source (input source that created the location record, e.g., Haven); etc. In other embodiments, the preceding data fields are included as an anchor data field (an emergency data field that cannot be unselected, as described above) or a selectable data field.

In some embodiments, the enhanced data display includes a "caller information" tab or group, in which personal information about the caller is consolidated. Examples of "Caller Information" data is depicted in Table 2.

TABLE 2

Caller Information Data of an Enhanced Data Display

| Data Field | Example |
| --- | --- |
| Address | Work |
| | Lat: 40.754475 |
| | Lon: −73989874 |
| | 234 W 39$^{th}$ St. |
| | New York, New York, US |
| | 10018 |
| | Apartment 105 |
| | Note: second building on the south side |
| Allergy | Nuts |
| | Fish |
| Birthday | May 5, 1978 |
| blood_type | B− |
| Comment | I am a dog-lover. |
| Disability | Hearing-impaired |
| Email | Personal: jdoe@rapidsos.com |
| | Note: I check this email hourly |
| emergency_contact | Mother: |
| | Name: Jane Doe |
| | Phone: (555) 555-5555 |
| | Email: mom@rapidsos.com |
| | Note: Call first in an emergency |
| Ethnicity | Hispanic |
| full_name | Jane Doe |
| Height | 5'2" |
| Language | English |
| | Klingon |

TABLE 2-continued

Caller Information Data of an Enhanced Data Display

| Data Field | Example |
| --- | --- |
| medical_condition | Diabetes |
| medical_note | epipen in car |
| medication | Metformin 5 mg |
| occupation | Clown |
| phone_number | Cell: (555) 555-5555 |
| | Note: This is my cell number, which may be unreachable |
| | when I am at a client site. |
| Website | Blog: https://infor.rapidsos.com |
| | Note: This is my business homepage |
| weight | 160 pounds |

In some embodiments, the enhanced data display (as shown in FIGS. 10A-B, 11A-C) includes a "device data" tab or group, in which data pertaining to one or more devices associated with a user is consolidated. In some embodiments, several devices of the user may be consolidated in one tab. In some embodiments, each device may have a dedicated section (e.g., a sub-tab). It is contemplated that device data may not be available in any cases.

In some embodiments, device data associated with one or more devices associated with a user (or a close loved one) is displayed if it is available. If such data is unavailable, the data categories will be collapsed in the enhanced data display. It is contemplated that the layout of the display may depend on the type of device, the type of data, the type of emergency, the priority or severity of the emergency, the likelihood that the information will be useful for the emergency response, etc. Examples of device data is depicted shown in Table 3.

TABLE 3

Sample Device Data

| Data Field | Example |
| --- | --- |
| airbags_deployed | Airbags Deployed |
| battery_power | (URL to data feed) |
| blood_glucose | (URL to data feed) |
| blood_oxygen_saturation | (URL to data feed) |
| body_temperature | (URL to data feed) |
| break_in_detected | Break-in detected |
| callback_phone | (819) 778-2053 |
| carbon_dioxide_detected | Carbon dioxide detected |
| carbon_monoxide_detected | Carbon monoxide detected |
| Classification | G |
| Color | Blue |
| Comment | This is an amazing device |
| crash_pulse | Crash image |
| | Note: This is recorded |
| crash_severity | Call a priest |
| device_name | Blue Bonnet |
| ekg12 | EKG 12 |
| ekg4 | EKG 4 |
| fire_detected | Fire Detected |
| flooding_detected | Flooding Detected |
| gas_detected | Gas Detected |
| hardware_description | Fit Bit |

In some embodiments, the enhanced data display (as shown in FIGS. 10A-B, 11A-C) includes a "caller-provided locations" tab or group, in which data pertaining to one or more locations provided by the user is consolidated. It is contemplated that caller-provided location may not be available in many cases. The caller-provided location is understood be different from the data in the "location" tab or group, which is the current location of the user. The data in the location tab or group may be validated and the likely or probable location of the user. Examples of caller-provided location data is depicted shown in Table 4.

TABLE 4

Sample Known Locations

| Data Field | Example |
| --- | --- |
| Address | Wax-On Wax-Off Karate |
|  | Lat: 40.754475 |
|  | Lon: −73989874 |
|  | 234 W 39$^{th}$ St. |
|  | New York, New York, US |
|  | 10018 |
|  | Apartment 412 |
|  | Note: third building on the south side |
| Animal | Service Animal |
|  | Name: Fluffy |
|  | Species |
|  | Note: Barks when blood sugar is low |
| Comment | I have Karate every Thursday at noon and wash cars |
|  | every other day |
| external_data_portal | Dojo: "https://info.rapidsos.com", |
|  | Note: This is my karate dojo |
| fixed_video_feed | Entrance |
|  | (URL to video feed) |
|  | Note: "Faces dojo main entrance" |
|  | Latitude: 40.754475 |
|  | Longitude": −73.989874 |
| Floorplan | Strip Mall Plan |
|  | Note: Dojo is middle of the building |
| locationcontact | Owner: |
|  | Name: Jane Doe |
|  | Phone: (555) 555-5555 |
|  | Email: mrmiagi@rapidsos.com |
| location_name | Wax-On Wax Off Karate |
| mobile_video_feed | (URL to video feed) |
|  | Latitude: 40.754475 |
|  | Longitude": −73.989874 |

In some embodiments, the enhanced data display (as shown in FIGS. 10A-B, 11A-C) includes a "service information" tab or group, in which data pertaining to one or more data providers are consolidated. It is contemplated that caller-provided location may not be available in many cases. Examples of service data fields include contact_url, data_provider_contact_address, data_provider_contact_phone, data_provider_contact_phone, data_provider_url, provider_id, service_environment, service_mobility, sevice_type, type_of_provider, etc.

Dynamic Visualization

In some embodiments, as depicted by FIGS. 11B and 11C, the EMS applies dynamic visualization elements to the emergency data displayed through the enhanced data display 1164. In some embodiments, the dynamic visualization elements include displaying content sequentially, moving content, separating content, etc. In some embodiments, the dynamic visualization elements include changing font type, font size, font face, font color or using highlighting, backgrounds, sounds icons, animations or images to emphasize or deemphasize content.

For example, in some embodiments, the EMS selectively emphasizes single emergency data fields or groups of emergency data fields. As an example, as depicted in FIG. 11B, the EMS emphasizes all of the emergency data fields within the "Demographics" emergency data category by enlarging and bolding the included emergency data fields. In another example, as depicted by FIG. 11C, the EMS emphasizes all of the emergency categories within the "Contact Information" emergency data category, by only bolding the included emergency data fields. In some embodiments, the EMS emphasizes an emergency data field by highlighting, bolding, enlarging, underlining, moving, or coloring the data field. In some embodiments, the EMS emphasizes an emergency data field using an animation such as by causing the data field to appear, fade in and out, fly or float in, flash, pulsate, rotate, translate (e.g., move laterally or vertically), change in size, grow and turn, change colors, wave, or bounce. It is contemplated that specific emergency data fields can be emphasized or deemphasized by various tools such as font type, font size, font face, font color, highlighting, background color or pattern, icons, or other ways. In some embodiments, one or more data fields are emphasized while others are deemphasized to further draw attention to the emphasized data. In some embodiments, the rule set is customized by an administrator and/or ESP personnel.

Dynamic visualization can be useful for emphasizing specific data fields when those data fields are most likely to be helpful to ESP personnel in responding to an emergency situation. In some embodiments, dynamic visualization is carried out according to a dynamic visualization scheme such as a set of one or more rules that determine when certain data fields are to be emphasized and how they are to be emphasized. In some embodiments, the EMS applies dynamic visualization to various emergency data fields or different groups of emergency data fields at different times. For example, in some embodiments, the EMS applies a dynamic visualization element to different groups of emergency data fields sequentially. For example, in some embodiments, the EMS first bolds all of the emergency data fields within the "Demographics" emergency data category (as depicted in FIG. 11B) and then sequentially bolds all of the emergency data fields within the "Contact Information" emergency data category (as depicted in FIG. 11C) while returning the emergency data fields within the "Demographics" emergency data category to their default or previous visualization. In some embodiments, the EMS sequentially applies dynamic visualizations to different emergency data fields or different groups of emergency data fields according to a predetermined timing schedule or rule set. For example, in one embodiment, upon transmitting emergency data to an ESP and displaying the emergency data through the enhanced data display 1164 (time (t) since displaying the emergency data=0 seconds (s)), the EMS bolds and enlarges the "name" emergency data field after two seconds (e.g., t=2 s), returns the "name" data field to its default visualization, bolds and enlarges the "languages" data field at t=5 s, returns the "languages" data field to its default visualization, holds and enlarges the "gender" data field at t=8 s, and finally returns the "gender" data field to its default visualization at t=10 s. Alternatively, as another example, the EMS bolds and enlarges both the "name" and "languages" data fields at t=2 s, and returns the "name" and "languages" data fields to their default visualizations while bolding and enlarging the "gender" data field at t=5 s. In some embodiments, the EMS sequentially applies dynamic visualizations to different emergency data fields at different times according to any schedule or visualization scheme.

In some embodiments, the EMS applies dynamic visualization to an emergency data field or group of emergency data fields in response to user input at an ESP. For example, in some embodiments, after sending an emergency data request to the EMS and receiving emergency data from the EMS through the enhanced data display 1164 at an ESP console, an ESP personnel (e.g., a PSAP call taker) selects a soft or hard button (e.g., press a key on their keyboard) to apply dynamic visualization to one or more emergency data fields. For example, in some embodiments, the EMS can sequentially apply dynamic visualizations to one or more emergency data fields according to a predetermined order. In some embodiments, the ESP personnel can step through the predetermined order using the arrow keys on their keyboard. For example, when the ESP personnel presses the right arrow, the EMS applies a dynamic visualization to the next emergency data fields or group of emergency data fields according to the predetermined order; if the ESP personnel presses the left arrow, the EMS can apply a dynamic visualization to the previous emergency data field or group of emergency data fields according to the predetermined order. Alternatively, for example, a specific key on the ESP personnel's keyboard is associated with applying a dynamic visualization to a specific emergency data field or group of emergency data fields. For example, in some embodiments, if the ESP personnel presses the 'M' key on their keyboard, the EMS applies one or more dynamic visualization elements to the one or more of the emergency data fields included in the "Medical Information" emergency data category.

In some embodiments, the EMS can apply dynamic visualization to an emergency data field or group of emergency data fields in response to contextual cues detected during an emergency session (e.g., during a 9-1-1 phone call between a 9-1-1 caller and a PSAP call taker). For example, during a 9-1-1 call, if the EMS detects the word 'name' spoken aloud (e.g., a PSAP call taker asks a 9-1-1 caller for their name), the EMS can automatically apply a dynamic visualization to the "name" data field. Or for example, during a 9-1-1, if the EMS detects the word 'location' spoken aloud (e.g., a PSAP call taker asks a 9-1-1 caller for their location), the EMS can automatically apply a dynamic visualization to the "addresses" group of emergency data fields.

In some embodiments, the PSAP call taker may request specific type of data (e.g., by pressing a soft button), which may be displayed with dynamic visualization elements. For example, if the call taker indicates that it is a medical emergency, the medical data may be emphasized by the use of one or more dynamic visualization elements. In some embodiments, the dynamic visualization may in the form of a feedback flow, where the PSAP may be prompted to provide feedback in a logical sequence. For example, after the PSAP call taker has selected a medical emergency, she may be prompted to select a type from a list (e.g., injury, chronic illness, unconscious, unknown, etc.) and specific medical data may be displayed and/or emphasized. If chronic illness is chosen, the user's available illnesses are displayed and/or emphasized. If injury is chosen, the location of the injury may be provided, previous injuries in the patient's medical history may be displayed and/or emphasized.

Figure 12:
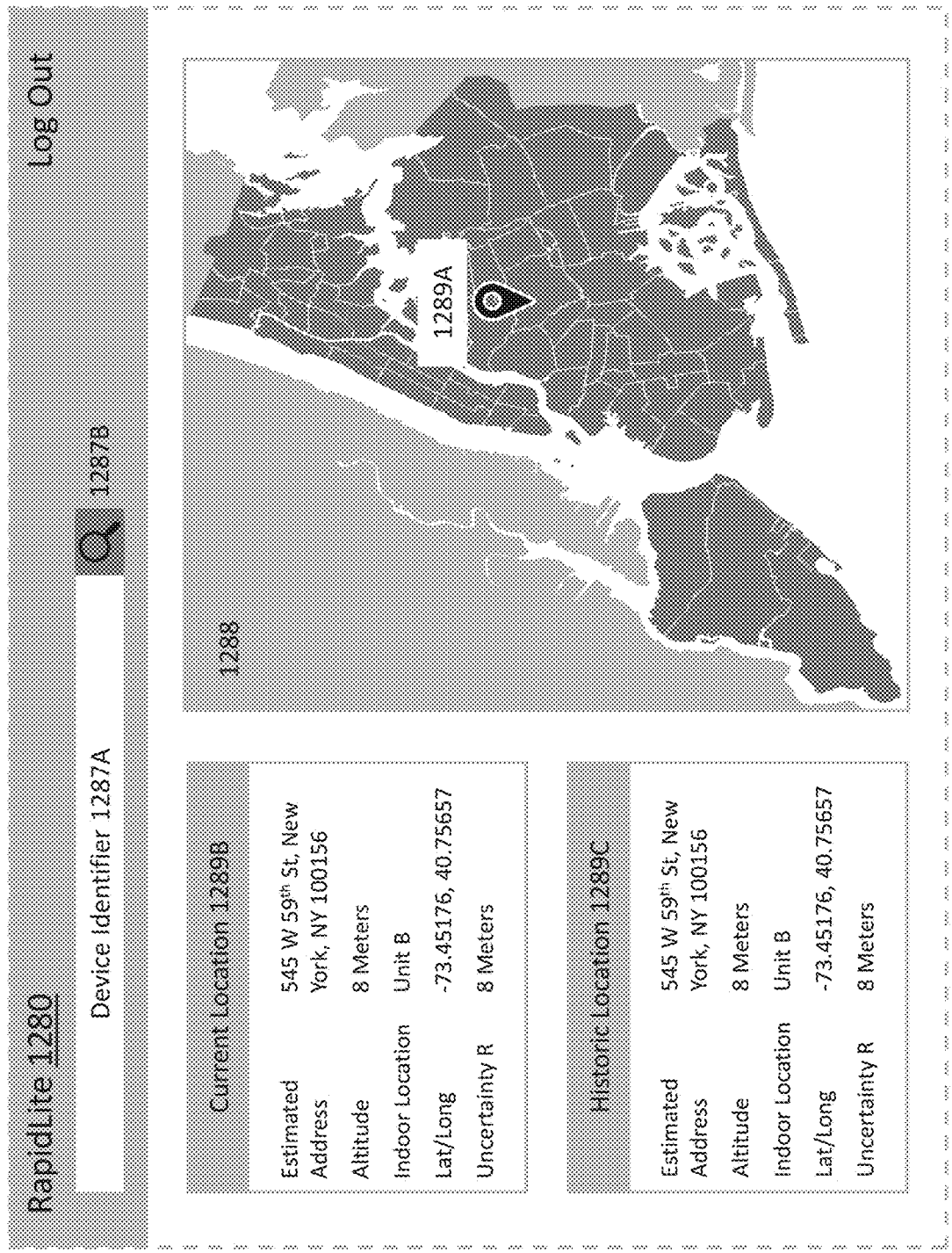
FIG. 12 illustrates an embodiment of an emergency response application in accordance with one embodiment.

FIG. 12 depicts an embodiment of a graphical user interface provided by an emergency response application in accordance with one embodiment. In some embodiments, FIG. 12 depicts an enhanced data display or dashboard provided by the emergency response application. The dashboard is a page within the GUI that provides interactive elements that allow a user to generate an emergency data request using the emergency response application. For example, in some embodiments, the dashboard includes an entry field 1287A through which a user can submit a device identifier, such as by typing or pasting the device identifier into the entry field 1287A. In some embodiments, after submitting a device identifier through the entry field 1287A, the user can prompt the emergency response application to generate and send an emergency data request by selecting a search button 1287B. In some embodiments, in response to a user submitting a device identifier into the entry field 1287A and selecting the search button 1287B, the emergency response application generates an emergency data request including the device identifier and a temporary access token to the clearinghouse, as described above. In some embodiments, the emergency response application automatically generates an emergency data request (e.g., without a user manually submitting a device identifier) in response to detecting an emergency alert, as described above.

In some embodiments, after receiving an emergency data request including a device identifier, the clearinghouse retrieves or gathers emergency data associated with the device identifier from one or more clearinghouse databases, as described above. In some embodiments, the emergency data associated with the device identifier includes one or more locations. In some embodiments, the emergency data associated with the device identifier includes a current location. In some embodiments, the emergency data associated with the device identifier includes one or more historical locations. In some embodiments, the clearinghouse determines which types of emergency data (e.g., emergency data fields or emergency data categories) that the requesting user is allowed to receive based on a role associated with the requesting user, as described above. In some embodiments, after retrieving or gathering the emergency data, the clearinghouse returns the emergency data to the emergency response application. The emergency response application can then display the emergency data within the GUI. In some embodiments, the emergency response application displays the emergency data within the dashboard, as depicted in FIG. 12. For example, in some embodiments, the emergency response application displays a graphical indicator of a current location 1289A returned from the clearinghouse within a map 1288 provided by the GUI. In some embodiments, the emergency response application displays a textual description of a current location 1289B within the GUI. In some embodiments, the emergency response application displays textual descriptions of one or more historical locations within the GUI 1289C. In some embodiments, the textual description of a current or historical location includes a time and date, an estimated address, altitude, latitude and longitude, and an uncertainty radius. In some embodiments, the textual description of a current or historical location includes an indoor location. In some embodiments, the textual description of a current or historical location additionally includes an amount of time elapsed since the current or historical location was received. In some embodiments, the textual description of a current or historical location additionally includes an amount of time elapsed since the current or historical location was generated.

Emergency Data Geofencing

Figure 13A:
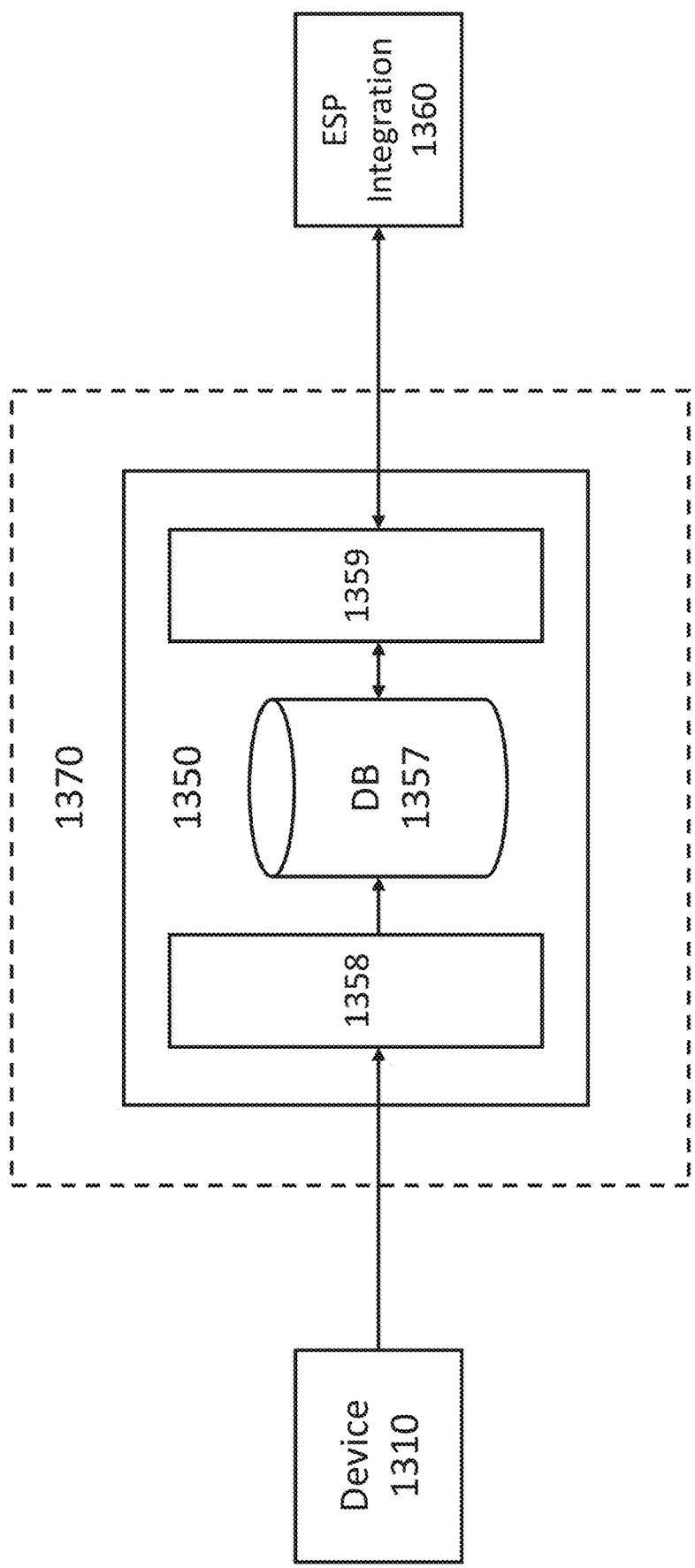
FIG. 13A and FIG. 13B depict diagrams of a geofence system applied to a clearinghouse for emergency data in accordance with one embodiment.

FIG. 13A depicts a diagram of a geofence applied to a clearinghouse for emergency data in accordance with one embodiment. As described above, in some embodiments, an administrator of an ESP is required to submit a geospatial representation (e.g., a geofence) of a region that the ESP serves. In some embodiments, the geofence bounds an authoritative jurisdiction, which is mandated by a higher authority (e.g., a PSAP jurisdiction). In some embodiments, the geofence bounds an administrative region (e.g., state highway troopers may serve areas near highways). In some embodiments, the geofence bounds an assigned jurisdiction (e.g., a police patrol). In some embodiments, the ESP may be a private police service, such as university campus and the jurisdiction are areas owned by the university.

In some embodiments, a geofence module 1370 is applied to the clearinghouse 1350 to protect potentially sensitive emergency data using geospatial analysis. In some embodiments, as described above with respect to FIG. 2, the clearinghouse 1350 includes a set of ingestion modules 1358 and a set of retrieval modules 1359. The set of ingestion modules can receive emergency data, or other information that can be useful in responding to an emergency, from a variety of sources. For example, in some embodiments, a smartphone sends emergency data to the clearinghouse 1350 in the form of an HTTP POST API call in response to a user of the smartphone initiating a 911 emergency call. As depicted in FIG. 13A, in some embodiments, when emergency data (e.g., an emergency location or additional emergency data) is sent from an electronic device 1310 to the clearinghouse 1350, the emergency data is first processed by a geofence module 1370 before being received by the set of ingestion modules 1358 within the clearinghouse 1350, as described below with respect to FIG. 13B. Similarly, in some embodiments, when an emergency data request is sent from a requesting party (e.g., an ESP), the emergency data request is processed by the geofence module 1370 before being received by the set of retrieval modules 1359 for display on at a computing device of the requesting party.

In some embodiments, as mentioned above, a geofence module is applied to the clearinghouse to protect potentially sensitive emergency data using geofences. Generally, a geofence is a virtual perimeter for a real-world geographic area. A geofence can be dynamically generated—as in a radius around a point location—or a geofence can be a predefined set of boundaries (such as school zones or neighborhood boundaries). The use of a geofence is called geofencing, and one example of usage involves a location-aware device of a location-based service (LBS) user entering or exiting a geofence. Entry or exit from a geofence could trigger an alert to the device's user as well as messaging to the geofence operator. The geofence information, which could contain the location of the device, could be sent to a mobile telephone or an email account.

For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

Geofences can be defined in various ways. For example, in some embodiments, a geofence comprises one or more of the following: a county boundary, a state boundary, a collection of postal/zip codes, a collection of cell sectors, simple shapes, complex polygons, or other shapes or areas. In some embodiments, geofences comprise approximations where the "approximated" geofence encloses an approximation of the authoritative region.

Updates to geofences may be required over time because the authoritative regions may change over time. Geofences may change over time (e.g., a new sub-division has cropped up) and require updates. In some embodiments, the systems and methods described herein allow geofences to be updated (e.g., a PSAP administrator can upload updated geofence GIS shapefiles).

For maintaining the privacy, security and integrity of the data, geofencing may be applied to emergency data. For example, applying geofence filters to the emergency data allows additional avenues for monitoring, both visibility and control, over the clearinghouse to detect anomalies/spikes and reduce the risk of security breaches.

Figure 13B:
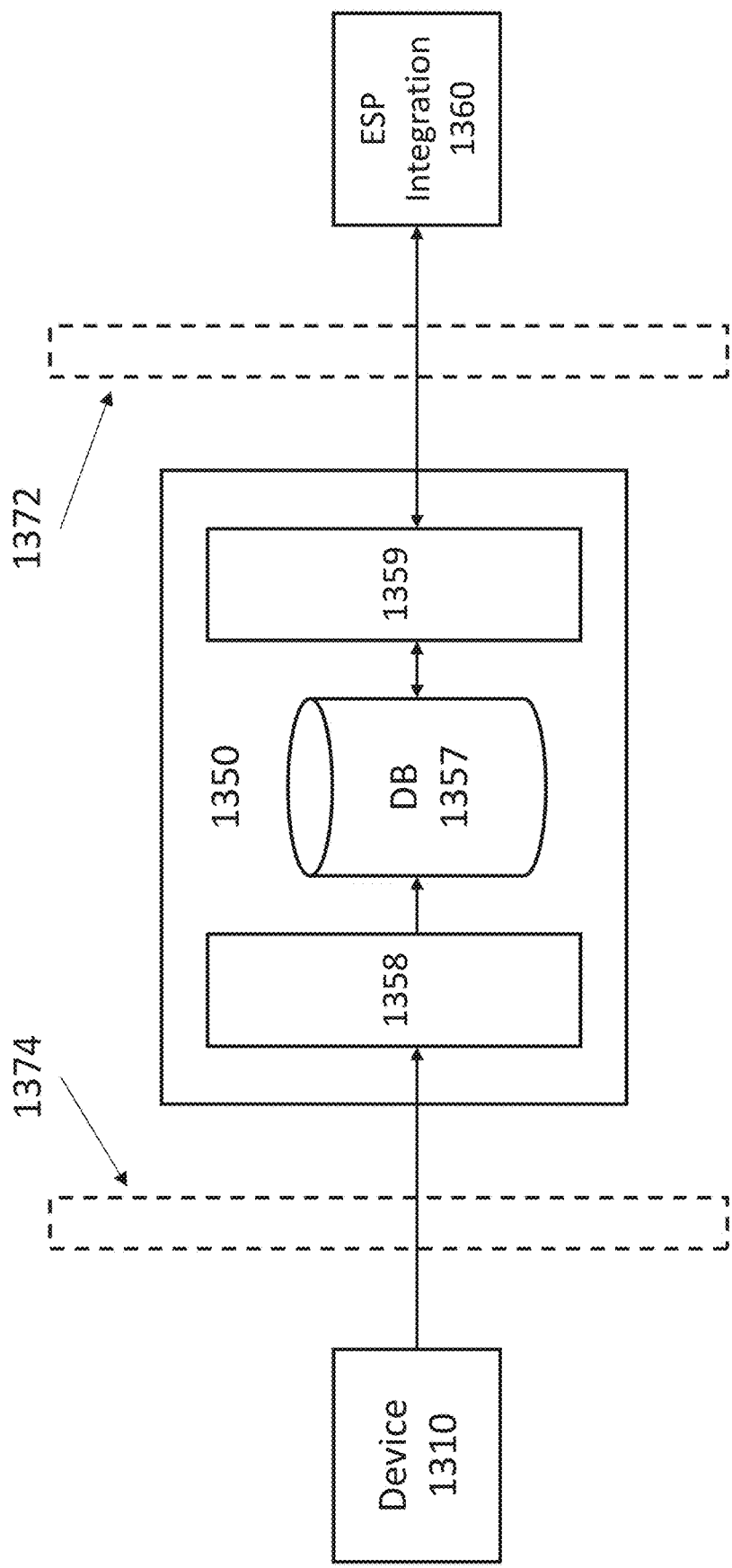

FIG. 13B depicts a diagram of ingestion and retrieval geofences applied to an emergency data clearinghouse in accordance with one embodiment. In some embodiments, the emergency data is obtained from device 1310 (also referred to as an "upstream data producing device"). On the retrieval side, an ESP accesses the clearinghouse 1350 by sending an emergency data request, through the ESP integration system 1360, to the clearinghouse 1350, as described above. An ingestion geofence 1374 (also referred to as "upstream filtering") is applied to restrict sending of data from devices 1310 to the clearinghouse 1350 from geographical areas that are not covered by the "combined authoritative jurisdiction" (i.e., covered one or more provisioned geofences in the geofence database (not shown)). In some embodiments, the ingestion geofence (also referred to as an "ingress filter") is applied to the ingestion module 1358 to protect against accidental breaches of privacy. In some embodiments, the ingestion module 1358 of the clearinghouse 1350 drops location payloads that do fall within the geographical region covered by the "combined authoritative region."

In some embodiments, the clearinghouse 1350 comprises one or more databases 1357 (e.g., a database storing emergency data). For example, in some embodiments, the retrieval module obtains emergency data from a clearinghouse 1350 database 1357 to send to an ESP in response to an emergency data request, as described above. In some embodiments, the retrieval geofence 1372 (also referred to as an "egress filter") is applied at the retrieval module 1359 of the clearinghouse 1350. Applying geofencing to retrieved emergency data will protect against abuse and limit the scope of security breaches in cases where credentials have been compromised. In some embodiments, one or more geofences are associated with one or more credentials associated with an ESP agency or organization. In some embodiments, the credentials associated with an ESP agency or organization confers authorization to access data such as emergency data from the clearinghouse. In some embodiments, specific authorization to access data is granted individually to members of a PSAP through tokens derived from the credentials for that PSAP.

In some embodiments, when the retrieval module 1359 checks the coordinates of current location data (within retrieved emergency data) associated with a device identifier with the geofence(s) associated with the credentials in an emergency data request. If the current location is within the geofence region (enclosed by the geofence(s)), the current location is returned to the ESP and displayed within the ESP console. If not, the module 1359 will return a "not found" message (as opposed to the retrieved location is outside the geofence) to protect privacy.

In some embodiments, geofences can be used for reporting results for internal metrics and monitoring the system. For example, the number of emergency data requests, locations provided, "no location found" etc., can be obtained for a geofence(s) associated with a PSAP. Using single or combined geofences, the emergency data can be obtained on county-wide, city-wide, postal code, course grid (rectangle overlay), state-wide, or country-wide basis. In some embodiments, ingress and egress counters (i.e., percent of emergency sessions where the location data was received, but not queried) and other similar metrics can be calculated and analyzed to identify problems and spikes. In some embodiments, different geofences are used for retrieval and for reporting.

In some embodiments, a buffer (e.g., +10 km) is added to the geofence(s) so that results within the buffer zone are also returned. In many cases, PSAPs have discretion and incentive to respond to emergencies that are beyond their authoritative jurisdiction. As an example, a geofence that is a circular area with a radius of 10 km would have an area of 100 π or ~314 km2, whereas the same area with a 10 km buffer around its circumference would have yield a combined radius of 20 km and a combined area of 400 π or ~1256 km2. In some embodiments, the buffer is from 0.5 km to 5 km, from 0.5 km to 10 km, from 0.5 km to 15 km, from 0.5 km to 20 km, from 0.5 km to 25 km, or from 0.5 km to 30 km. In some embodiments, the buffer is from 1 km to 5 km, from 1 km to 10 km, from 1 km to 15 km, from 1 km to 20 km, or from 1 km to 30 km. In some embodiments, the buffer is at least 0.1 km, at least 0.2 km, at least 0.3 km, at least 0.4 km, at least 0.5 km, at least 0.6 km, at least 0.7 km, at least 0.8 km, at least 0.9 km, at least 1 km, at least 2 km, at least 3 km, at least 4 km, at least 5 km, at least 6 km, at least 7 km, at least 8 km, at least 9 km, at least 10 km, at least 11 km, at least 12 km, at least 13 km, at least 14 km, at least 15 km, at least 16 km, at least 17 km, at least 18 km, at least 19 km, at least 20 km, at least 25 km, or at least 30 km. In some embodiments, the buffer is no more than 0.1 km, no more than 0.2 km, no more than 0.3 km, no more than 0.4 km, no more than 0.5 km, no more than 0.6 km, no more than 0.7 km, no more than 0.8 km, no more than 0.9 km, no more than 1 km, no more than 2 km, no more than 3 km, no more than 4 km, no more than 5 km, no more than 6 km, no more than 7 km, no more than 8 km, no more than 9 km, no more than 10 km, no more than 11 km, no more than 12 km, no more than 13 km, no more than 14 km, no more than 15 km, no more than 16 km, no more than 17 km, no more than 18 km, no more than 19 km, no more than 20 km, no more than 25 km, or no more than 30 km.

In some embodiments, a system for managing access to emergency data for emergency service providers comprises: a) a management portal implemented as one or more software modules on a computing system comprising a processor and a non-transitory computer readable storage medium and configured to: i) establish a first role that can be selected for one or more users within an ESP; and ii) define a first set of emergency data fields to be made accessible for the first role from a plurality of emergency data fields; b) an emergency response application implemented as one or more software modules on a computing system comprising a processor, a display, and a non-transitory computer readable storage medium and configured to: i) allow an ESP user to login to the emergency response application, wherein the ESP user is associated with the first role; ii) generate an emergency data request comprising an identifier associated with an emergency alert; and iii) transmit the emergency data request to an emergency management system; and c) the emergency management system, implemented as one or more software modules on a cloud computing system comprising a processor and a non-transitory computer readable storage medium and configured to: i) receive the emergency alert, wherein the emergency alert comprises a location; ii) access a geofence associated with the ESP; iii) determine if the location falls within the geofence associated with the ESP; iv) receive the emergency data request from the emergency response application; v) if the location is determined to fall within the geofence associated with the ESP, gather, using the identifier associated with the emergency alert, emergency data associated with the emergency alert available for the first set of emergency data fields made accessible for the first role; and vi) securely transmit the emergency data associated with the emergency alert available for the set of emergency data fields made accessible for the first role to the emergency response application for display at the computing system.

Figure 14:
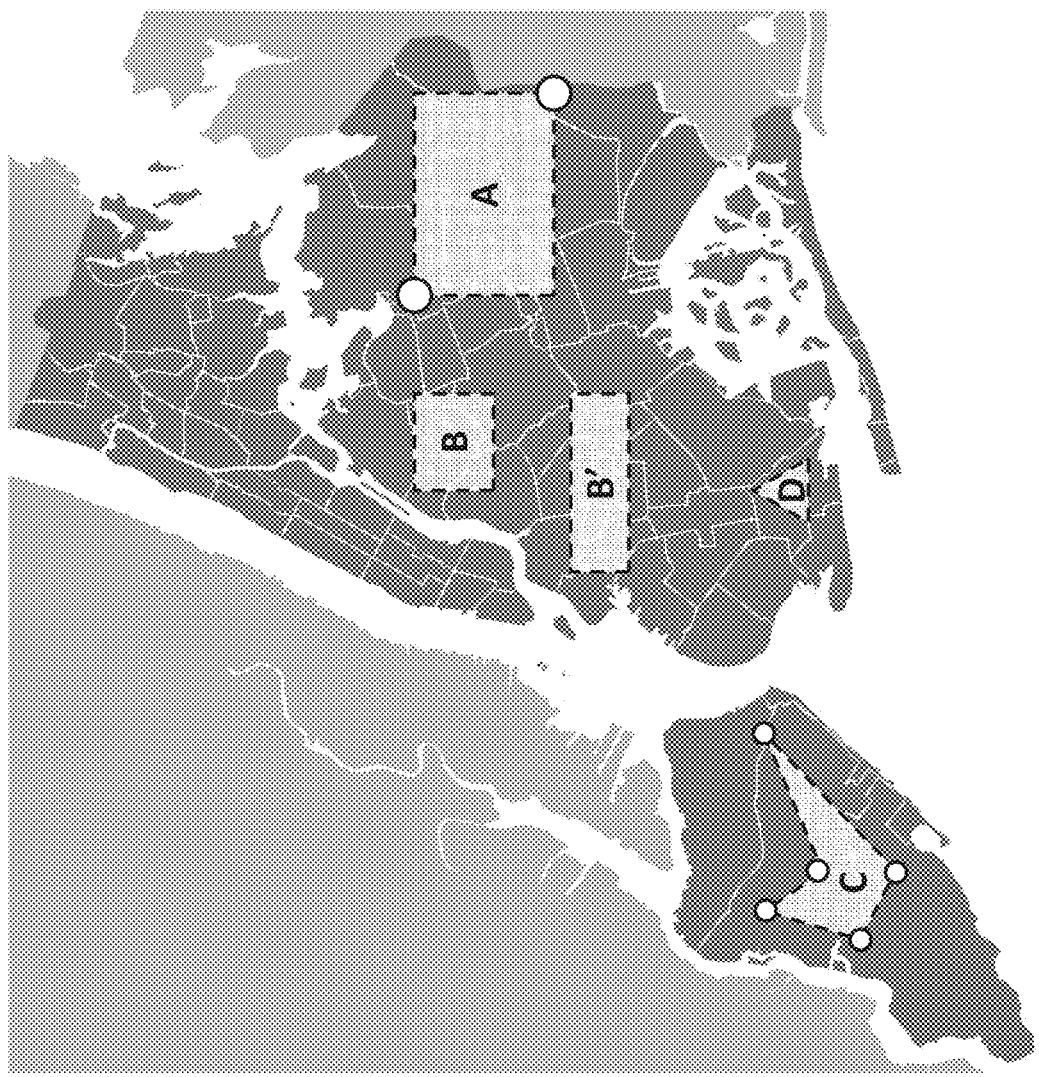
FIG. 14 depicts a diagram of an emergency response application system in accordance with one embodiment.

FIG. 14 illustrates examples of geofence approximations that can be submitted as an "authoritative jurisdiction" for a PSAP. One or more geofences enclose the geofenced region which is under the authoritative jurisdiction of a PSAP. In some cases, the geofenced region is a complex polygon, and is optionally approximated using an appropriate simpler shape. For example, a rectangle (A), two disjointed rectangles (B, B'), a polygon with several sides (C) and a triangle (D), may represent different geofenced regions (defined by one or more geofences).

In some embodiments, an administrator of a PSAP submits the complex authoritative jurisdiction as one or more approximate geofence(s) by specifying points. For example, the PSAP administrator can submit geofenced region A by specifying two points—the north-west corner and the south-east corner using a drawing tool provided by the GUI of the emergency response application. In this example, the two points of the geofenced region are set using two latitude-longitude coordinates. In another example, the multiple-sided polygon C is submitted by specifying the five corners. In some embodiments, a PSAP administrator approximates a geofence for a PSAP by drawing one or more polygons using a drawing tool provided by the GUI of the emergency response application. In some embodiments, a geofence is generated using a series of points that are connected (e.g., entering three longitude-latitude points on a map to form a triangular geofence).

Approximating a complex geofenced region has several advantages. The geofence(s) are simple and the calculations can be quicker and less cumbersome for applications where exact calculations are not needed.

In some embodiments, a PSAP administrator can submit a GIS file (e.g., a shapefile) that represents the actual authoritative jurisdiction of the PSAP, which may then be provisioned in a geofence database. It is appreciated that a GIS file defining the authoritative jurisdiction may be saved in one or more industry-acceptable formats such as a shapefile, a GeoJSON file, KML file, etc. In some embodiments, the GIS file includes one or more features such as points, lines, polygons, density, and other shapes. A GeoJSON is open standard GIS file representing geographical features and non-spatial attributes based on JavaScript Object Notation. Some features include points (such as addresses and locations), line strings (streets, highways and boundaries), polygons (countries, provinces, tracts of land), and multi-part collections of these types. A Keyhole Markup Language (KML) file includes geographic annotations and visualization on internet-based maps on Earth browsers. A shapefile is a vector data format for storing the location, shape, and attributes of geographic features. A shapefile is stored in a set of related files, each of which may contain one feature class (e.g., lines, points, polygons, etc.). In some embodiments, the shapefile is a file with extension .SHP in ESRI file format where SHP is the feature geometry, SHX is the shape index position and DBF is the attribute data.

Various embodiments of the geofence database are contemplated. In some embodiments, one or more databases are searchable using a PSAP identifier, credentials, or other information. In some embodiments, an emergency location is searched through several geofences in the geofence database. In some cases, the geofenced region is shrunk for ease of storage and to simplify calculations.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device. In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In some embodiments, the non-volatile memory comprises magneto resistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, trackpad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

EXAMPLES

The following illustrative examples are representative of embodiments of the invention described herein and are not meant to be limiting in any way.

Just In Time, an emergency response company, aids emergency service providers (such as public safety answering points (PSAPs) and first responders) by gathering emergency data from a variety sources and delivering the data directly to the emergency personnel. Traditionally, PSAPs are only technologically capable of receiving telephone calls with no additional data. Thus, when an emergency call is made to a PSAP from a mobile phone (with a dynamic and uncertain location), PSAP operators often must speak directly to a person implicated in an emergency to determine the person's location. Unfortunately, many people implicated in emergencies are unable to articulate their location or do not even know it—and even if they do, the time spent articulating their location to the PSAP operator can often be the difference between life and death. Similarly, PSAP operators and the first responders they send to respond to emergencies are forced to respond to emergencies with little or no information about the implicated persons (e.g., health data or medical histories) or emergency contexts (e.g., type of emergency, audio/video of the surroundings, etc.). Just In Time knows how critical it is to quickly and accurately provide locations and situational/contextual information during emergencies to emergency service providers.

To aid emergency personnel, Just In Time provides an Emergency Clearinghouse (hereinafter, "clearinghouse") that receives and stores data and information from a plurality of sources, such as mobile phones and mobile applications, IoT devices, intelligent vehicle systems and other electronic devices. While responding to an emergency, an emergency service provider can receive data relevant to the emergency directly from the Emergency Clearinghouse. However, while this additional information can improve an emergency service provider's ability to respond to an emergency, emergency service providers are often under tremendous pressure, and the decisions they make must be quick. Therefore, ineffective presentation of emergency data risks overwhelming an emergency service provider with too much information or presenting information at the wrong time. Additionally, because some types of information received by the Emergency Clearinghouse is sensitive (e.g., medical history), it may be inappropriate to send certain types of information to certain types of emergency service providers. Thus, to further aid emergency service providers, Just In Time provides an Emergency Data Management Portal (hereinafter, "management portal"), where an administrator can designate the appropriate access to members of their organization emergency data (e.g., by defining roles and selecting appropriate data categories). When the ESP member logs-in, he or she accesses an Enhanced Data Display for data relevant to the emergency response.

Example 1

In one instance, PSAP B has opted to receive location and additional data from the clearinghouse and integrated the enhanced data display into existing call-taking desktop applications on PSAP B computers. To activate the integration, the administrator of PSAP B (who also administers over PSAPs A and C) contacts Just In Time to verify his identity. After verifying his identity, Just In Time orally communicates (for added security) to the administrator of PSAP B a set of credentials to use to access the management portal. Using the set of credentials, the administrator of PSAP B accesses the management portal and creates separate keys for PSAP A, PSAP B, and PSAP C. Knowing that PSAP B employs a relatively flat hierarchy with only two roles within the PSAP—call-takers and supervisors—the administrator of PSAP B then creates two roles under the key for PSAP B, one for call-takers and one for supervisors. Although the administrator of PSAP B is excited to have Just In Time's additional information provided to all of the employees of PSAP B, he is wary of overwhelming call-takers. The administrator of PSAP B decides that it would be best to select only locations and contact information to be made accessible for the call-taker role, omitting other additional information such as health data, medical history, and demographics. However, for the supervisor role, the administrator of PSAP B selects all types of information in the clearinghouse to be made accessible. The administrator of PSAP B then assigns the "Production" enabled environment to the key created for PSAP B, thereby activating the clearinghouse integration for live emergency calls made to PSAP B.

Eric, a technology-loving middle-aged man from Pittsburgh, Pa. has a Samsung Galaxy S8 mobile phone that he pairs with a Samsung Gear S3 smartwatch. He has a health insurance app installed on his Galaxy S8, in which he has submitted his name, email address, home address, height, weight, and blood type. Eric also has an Amazon Echo smart home device paired with a Nest indoor smart camera installed in his home. The Amazon Echo is paired to his Galaxy S8. One day, while cutting open an avocado, Eric accidentally pierces his hand and, upon seeing blood gushing from his hand, he faints. Eric regains consciousness seconds after falling to the ground and hears his Gear S3 chirping. His smartwatch has detected his fall through the use of sensors including an accelerometer and a gyroscope (detecting a sudden acceleration and change in direction), and the screen of the smartwatch is now asking Eric if he needs emergency help. Eric, now bleeding profusely and thoroughly discombobulated, presses yes, which prompts his Galaxy S8 to initiate a 9-1-1 call, which is channeled through Eric's Amazon Echo speaker system. Over the Echo's speakers, Eric hears a PSAP call-taker at PSAP B answer his emergency call and begin to ask Eric what the nature of his emergency is.

Simultaneously with the initiation of the 9-1-1 call, Eric's Galaxy S8 automatically generates an emergency alert associated with Eric's phone number and delivers it to Just In Time. The Emergency Clearinghouse then automatically gathers all information pertinent to Eric's emergency, including a device-based hybrid location from both Eric's smartphone and smartwatch, Eric's current heartrate detected by his smartwatch, his name, home address, email address, height, weight, and blood type from his health insurance app, and a live stream video of his home from his smart camera. Although the information is gathered from different sources, each piece of information is tagged with Eric's phone number to associate the information with Eric and his emergency. Additionally, the Emergency Clearinghouse automatically tags the locations from Eric's smartphone and smartwatch and his home address from Eric's insurance app as "caller-provided locations,"; tags his height, weight, and blood type as "medical information,"; tags his heartrate as "health data,"; tags his name, email address, and phone number as "contact information,"; and tags the live stream of his home as "other data."

Eric tells the PSAP call-taker that he has accidentally stabbed his hand with a knife and subsequently fainted. The call-taker assures Eric that they will get him help and asks Eric what his location is. Eric tells the call-taker that he is at home, but he is lightheaded from a loss of blood and cannot recall his home address. While the call-taker asks Eric for his home address, the call-taker also selects a Just In Time "Enhanced Data" button within the Enhanced Data Display on the call-taker's computer, which sends an emergency data request to Just In Time that automatically includes the caller's (Eric) phone number and the role of the call-taker (the "call-taker" role created by the administrator of PSAP B at the Management Portal). The emergency data request also includes a clearinghouse access token automatically generated for the PSAP call-taker. After receiving the emergency data request from the PSAP call-taker, the Emergency Clearinghouse then references the "call-taker" role with the management portal to determine which types of additional data have been made accessible for the "call-taker" role by the administrator of PSAP B. In this case, as noted above, only caller-provided locations and contact information were selected to be made accessible for the "call-taker" role. Thus, although a slew of other additional information is available for Eric's emergency, the Emergency Clearinghouse instantly returns only the locations generated by Eric's smartphone and smartwatch and the home address from Eric's insurance app along with Eric's name, email address, and phone number. However, this additional data gives the PSAP call-taker exactly what he needs. The PSAP call-taker sees that the locations generated by Eric's smart devices and the home address provided by the insurance app are in agreement. Without hesitation, and without waiting on Eric to recall his address, the PSAP call-taker dispatches an ambulance to Eric's home. The PSAP call-taker then tells Eric that the PSAP has Eric's home address on file and help is on the way.

Example 2

Three months after the events of Example 1, Eric uses a ridesharing mobile application (e.g., Uber or Lyft) to call a ride to work. During the intervening months, the supervisors at PSAP B have been extremely satisfied with Just In Time's additional emergency information, and have urged the administrator of PSAP B to make all of Just In Time's additional information accessible to all of the employees of PSAP B, including those with the "call-taker" role. The administrator of PSAP B obliged, again using his credentials provided by Just In Time to log into the Management Portal, select to edit the key for PSAP B, select the "call-taker" role, and select to make all of types of information to be made accessible for the "call-taker" role as well as the "supervisor" role.

Eric's ridesharing mobile app is also integrated with Just In Time and provides information to the Emergency Clearinghouse regarding rides facilitated by the ridesharing app, such as personal information about the drivers and passengers, user submitted locations, and the current location of a ride. However, for liability reasons, the company that provides the ridesharing app has chosen that information provided by the app only be made available for emergency alerts generated from the ridesharing app. Unfortunately, during Eric's ride to work, another car runs a red light and collides with back left side of Eric's ride, directly hitting Eric. Eric's driver, a little shaken up but otherwise okay, notices that Eric has been hit directly, is significantly injured, and has lost consciousness. The driver then immediately selects the panic button within the ridesharing app, generating an emergency alert and initiating a 9-1-1 call to PSAP B.

A PSAP call-taker at PSAP B answers the 9-1-1 call and asks the driver what the nature of her emergency is. The driver tells the call-taker that her car has been hit from the side and that her passenger (Eric) was hit directly and is in grave condition. The call-taker immediately selects the Enhanced Data button on her computer while asking the driver where her location is. The Emergency Clearinghouse instantly and automatically gathers all of the information stored in the clearinghouse pertaining to the emergency. Because the emergency alert was generated from the ridesharing app and associated with Eric's ride, the emergency alert is associated with both Eric's phone number and the driver's phone number. The Emergency Clearinghouse can then find all information within the clearinghouse associated with the driver's phone number and with Eric's phone number, which includes (as noted above in Example 1), locations generated from both Eric's smartphone and smartwatch, Eric's current heartrate detected by his smartwatch, his name, home address, email address, height, weight, and blood type from his health insurance app. The Emergency Clearinghouse also gathers the ride's current location, the name of the passenger(s) and driver (Jessica), the ride's origin, and the ride's destination from the ridesharing app. The Emergency Clearinghouse then returns all of the information to the call-taker, because all types of information have been selected to be made accessible for the call-taker role. The call-taker then asks if she is speaking to the driver Jessica who responds in the affirmative. The call-taker then asks if Jessica is injured, to which Jessica says no. The call-taker then asks if the injured passenger is Eric, and if their location matches the ride's current location provided by the ridesharing app. Jessica responds yes to both.

Without hesitation, and without needing further confirmation from the driver, the PSAP call-taker dispatches an ambulance to the ride's current location. The call-taker then hits the 'H' button on her computer, which instantly highlights and moves Eric's health data to the top of her screen. Because all of the information in the Emergency Clearinghouse has been returned to the call-taker, the call-taker can see (from information generated by Eric's smartwatch) that Eric still has a pulse but that his pulse is weakening. The call-taker can also see Eric's blood type, provided by Eric's health insurance app, and tells the ambulance which type of blood to have on hand. The ambulance quickly arrives at the scene of the crash with the knowledge that Eric is losing blood and prepared to administer a blood transfusion in the ambulance or upon arriving at a hospital. By instantly knowing Eric's precise location and health data, the emergency responders were able to save Eric's life.

Example 3

In order to provide access to the information stored within the clearinghouse to ESPs as quickly and easily as possible, Just In Time develops and provides an emergency response application in the form of a webpage or web application that is accessible through a standard web browser over public networks. Just In Time calls the web application Nick Of Time. Any ESP administrator may request access to Nick Of Time by navigating to the Nick Of Time website through any standard web browser and registering themselves and their ESP. The Nick Of Time web application is in communicably coupled to the Just In Time Emergency Clearinghouse and includes both a management portal and an enhanced data display.

The administrator of a PSAP in Georgia, Joe, learns of the helpful and potentially life-saving information stored within Just In Time's clearinghouse—such as accurate emergency locations and medical histories (hereinafter, "emergency data")—and that the PSAP may access the emergency data through a web application (Nick Of Time) without needing any special hardware or software. Accordingly, Joe types in the Nick Of Time URL into his web browser at his PSAP computer and loads the Nick Of Time website. The Nick Of Time website then presents to Joe a graphical user interface (GUI) and prompts Joe to submit information about himself and his PSAP in order to register and request access to Nick Of Time. Nick Of Time requires Joe to enter his name, email address, password, and a non-emergency hardline phone number for the PSAP. Nick Of Time also requires Joe to provide a geofence of the jurisdiction of the PSAP, which Joe can submit as a preexisting GIS file or generate using an interactive map within the Nick Of Time GUI. Once Joe submits the request, the information regarding Joe and his PSAP is sent to Just In Time for review and verification.

Once Just In Time verifies the information provided by Joe, Joe is sent an email from Just In Time notifying him that his request has been granted. Joe then logs into Nick Of Time with his email address and password. Joe can then create Nick Of Time accounts for any number of other members of his PSAP to use to access Nick Of Time. When Joe creates a new account for one of the Georgia PSAP call-takers, Jane, the Nick Of Time web application prompts Joe to select a role for Jane. Nick Of Time presents two default roles, the Admin role and the Agent role, for Joe to select from. The Admin role is allowed to receive all types of emergency data from the Emergency Clearinghouse. The account that Joe created for himself when he signed up for Nick Of Time was automatically given the default Admin role because Joe is a verified PSAP administrator. The Agent role is the default role given to members of an ESP who are not administrators and is allowed to receive fewer types of emergency data from the Emergency Clearinghouse than the default Admin role. In this case, for example, the default Agent role is allowed to receive a 911 caller's personal information (such as demographic information) and location but is not allowed to receive a caller's medical information. Nick Of Time also presents Joe an option to create a new role within the management portal for the new account that he is creating for Jane. Joe selects the default Agent role for Jane. However, Joe does want Jane to be able to receive medical information from the Emergency Clearinghouse. So, after Joe finishes creating the new account for Jane, Joe navigates to the management portal user interface within Nick Of Time and selects the default Agent role to edit the types of emergency data that the Agent role is allowed to receive from the Emergency Clearinghouse. The management portal interface within Nick Of Time then displays all of the different categories of emergency data available from the Emergency Clearinghouse and which of those different categories of emergency data have already been selected for the default Agent role. Joe sees that the personal information category of emergency data (which includes data types such as name, age, and phone number) is already selected for the default Agent role. Joe also sees that the location category of emergency data is permanently selected for the default Agent role and cannot be unselected. Joe then finds the unselected medical information category and selects the medical information category to now be received by the Agent role. Joe also sees that the contact information category of emergency data is unselected, and he decides to leave it unselected. Finally, Joe selects a save button to save his edits to the Agent role, which is no longer the default Agent role, because it has been customized by Joe.

Later, Jane logs into the Nick Of Time web application at her computer at the Georgia PSAP using a username and password sent by Just In Time to Jane's email address, which Joe provided to Just In Time when creating the new Nick Of Time account for Jane. When Jane logs in, Nick Of Time references the management portal using Jane's email address and determines that Jane's account is associated with the Georgia PSAP and that Jane's account has been given the Agent role that Joe had customized. The management portal also provides Nick Of Time with tags indicating which emergency data categories that Jane's role (the customized agent role) is allowed to receive from the Emergency Clearinghouse. Nick Of Time also communicates with Just In Time's backend system to receive a short-lived access token for Jane's login session. Nick Of Time then presents a dashboard to Jane through the Nick Of Time GUI, where Jane can send requests for emergency data to the clearinghouse whenever Jane is responding to an emergency call. Jane soon receives an emergency call from a man named Steven, whose phone number is (555) 444-6666. To send an emergency data request to the clearinghouse, Jane simply types Steven's phone number into an entry field within the dashboard and clicks submit. In response, Nick Of Time generates an emergency data request including Steven's phone number, the short-lived access token, an identifier of the Georgia PSAP, and the tags indicating the emergency data categories that the customized Agent role is allowed to receive. Nick Of Time then sends the emergency data request to Just In Time's Emergency Clearinghouse.

When the clearinghouse receives the emergency data request, the clearinghouse uses Eric's phone number to retrieve all of the emergency data associated with Eric's phone number stored within the clearinghouse. The clearinghouse finds a current location for Eric sent to the clearinghouse from Steven's phone, in addition to Steven's demographics (age, height, weight, etc.), Steven's medical history, and a phone number for Steven's mother, who is listed as Steven's emergency contact. The clearinghouse then uses the identifier of the Georgia PSAP to retrieve the geofence submitted by Joe during the Nick Of Time registration process. The clearinghouse then determines whether or not Steven's current location is within the geofence. For security purposes, the clearinghouse does not return emergency data to requesting parties if a current location included in the emergency data is not within a geofence associated with the requesting party. However, the clearinghouse determines that Steven's current location is within the geofence provided by Joe. The clearinghouse then uses the tags indicating the emergency data categories that Jane's role (the customized Agent role) is allowed to receive to determine that Jane is allowed to receive location information, personal information, and medical information. Thus, the clearinghouse returns Steven's current location, Steven's demographics, and Steven's medical history to Nick Of Time to be displayed at Jane's computer. The clearinghouse does not return Steven's mothers phone number, however, because Jane's customized Agent role is not allowed to receive contact information.

The Nick Of Time dashboard displays a graphical representation of Steven's current location within a map and a textual description of Steven's current location (e.g., latitude and longitude) within a text box. The emergency data is returned in an instant after Jane sends the emergency data request. In response to receiving Jane's emergency data request for Steven's phone number, the clearinghouse also establishes a websocket connection with Jane's computer and subscribes Jane's Nick Of Time account to Steven's phone number for the duration of Jane's login session. While Jane is talking with Steven, attempting to ascertain the details of his emergency, Steven's location moves, because it turns out that Steven is actually inside of a moving vehicle. Five seconds after Jane received Steven's original location, the clearinghouse receives an updated location from Steven's phone, which is associated with Steven's phone number within the clearinghouse. Because the clearinghouse subscribed Jane's Nick Of Time account to Steven's phone number, the clearinghouse is able to instantly push updated emergency data associated with Steven's phone number (including Steven's updated location) to Jane's computer through the Nick Of Time web application, without Jane having to send an additional emergency data request. Jane continues to receive updated locations for Steven from the clearinghouse every five seconds until the vehicle that Steven is in comes to a stop. Jane then dispatches emergency help to Steven's most recent location, and the emergency help is able to find Steven at the location that Jane provided them.

What is claimed is:

1. A method of processing emergency call data, the method comprising:
  receiving, at a cloud-based emergency management system, emergency call data related to an emergency call received at a public safety answering point (PSAP) call taking module, the emergency call data comprising an automatic location identification (ALI) location;
  receiving emergency data, related to the emergency call data, at the cloudbased emergency management system, the emergency data comprising a device-based hybrid location;
  formatting the emergency data into a standard format comprising a plurality of data fields relating to the emergency call data received at the PSAP for display in an enhanced data window; and
  providing, to the PSAP, from the cloud-based emergency management system, an ALI data window displaying the ALI location and the enhanced data window displaying the emergency data comprising the device-based hybrid location with the plurality of data fields in the standard format via an internet protocol connection, wherein the enhanced data window is separate from the ALI data window.

2. The method of claim 1, wherein formatting the emergency data into a standard format comprising a plurality of data fields relating to the emergency call, comprises:
formatting the emergency data into a National Emergency Number Association (NENA) standard format.

3. The method of claim 1, wherein receiving emergency data, related to the emergency call data, at the cloud-based emergency management system, comprises:
receiving emergency data related to the emergency call received at the PSAP call taking module.

4. The method of claim 1, wherein formatting the emergency data into a standard format comprising a plurality of data fields relating to the emergency call, comprises:
formatting the emergency data into the plurality of data fields comprising: a service data reference field, a full name field, an email field, an emergency contacts field, an addresses field, and a language field.

5. The method of claim 1, wherein the ALI data window and the enhanced data window are displayed within a graphical user interface simultaneously.

6. A method of processing emergency data, the method comprising:
receiving first data at a cloud-based data management system, the first data comprising emergency data comprising device-based hybrid location data;
receiving second data related to the first data at a public safety answering point (PSAP) call taking module, the second data comprising automatic location identification (ALI) location data related to an emergency calls received at the PSAP call taking module;
sending a portion of the second data, from the PSAP, to the cloud-based data management system;
formatting the first data into a standard format comprising a plurality of data fields relating to the second data received at the PSAP; and
sending at least a portion of the first data from the cloud-based data management system to the PSAP over a network connection in response to receiving the portion of the second data at the cloud-based management system, wherein the at least a portion of the first data comprising the device-based hybrid location with the plurality of data fields in the standard format is displayed in an enhanced data window, and the second data comprising the ALI location data is displayed in an ALI data window, the enhanced data window separate from the ALI data window.

7. The method of claim 6, wherein sending a portion of the second data to the cloud-based data management system, comprises:
sending the portion of the second data to the cloud-based data management system in a request for the first data.

8. The method of claim 6, wherein sending at least a portion of the second data to the cloud-based data management system, comprises:
sending the automatic location identification (ALI) data to the cloud-based data management system in a request for the first data.

9. The method of claim 6, wherein formatting the first data into a standard format comprising a plurality of data fields relating to the second data, comprises:
formatting the first data into a National Emergency Number Association (NENA) standard format.

10. The method of claim 6, wherein formatting the first data into a standard format comprising a plurality of data fields relating to the second data, comprises:
formatting the first data into the plurality of data fields comprising: a service data reference field, a full name field, an email field, an emergency contacts field, an addresses field, and a language field.

11. The method of claim 6, wherein the ALI data window and the enhanced data window are displayed within a graphical user interface simultaneously.

12. A method of processing emergency call data, the method comprising:
receiving emergency call data related to an emergency call generated by an electronic device and received by a public safety answering point (PSAP) at a call taking module, the emergency call data comprising an automatic location identification (ALI) location;
receiving, at a cloud-based emergency management system, emergency data generated by the electronic device and related to the emergency call generated by the electronic device, the emergency data comprising a device-based hybrid location;
formatting the emergency data into a standard format comprising a plurality of data fields relating to the emergency call received by the PSAP for display in an enhanced data window; and
providing, to the PSAP, an ALI data window comprising the ALI location and an enhanced data window comprising the emergency data comprising the device-based hybrid location with the plurality of data fields in the standard format via an internet protocol connection, wherein the enhanced data window is separate from the ALI data window.

13. The method of claim 12, wherein formatting the emergency data into a standard format comprising a plurality of data fields relating to the emergency call, comprises:
formatting the emergency data into a National Emergency Number Association (NENA) standard format.

14. The method of claim 12, wherein formatting the emergency data into a standard format comprising a plurality of data fields relating to emergency call, comprises:
formatting the emergency data into the plurality of data fields comprising: a service data reference field, a full name field, an email field, an emergency contacts field, an addresses field, and a language field.

15. The method of claim 12, wherein the ALI data window and the enhanced data window are displayed within a graphical user interface simultaneously.

16. A method for processing emergency data, the method comprising:
receiving emergency call data associated with an emergency call being handled by a call-handling application at an emergency service provider (ESP), the emergency call data comprising an automatic location identification (ALI) location;
receiving an emergency alert comprising emergency data associated with the emergency call being handled by the call-handling application at the emergency service provider (ESP), wherein the emergency data is formatted into a standard format and comprises a plurality of data fields comprising a phone number and a device-based hybrid location associated with an electronic device that generated the emergency call;
storing the emergency data from the plurality of data fields in one or more clearinghouse databases; and providing, through a website, an ALI data window comprising the ALI location and an enhanced data window comprising at least a subset of the emergency data associated with the emergency call, wherein the enhanced data window displays at least the phone number associated with the electronic device and the device-based hybrid location associated with the electronic device, wherein the enhanced data window is separate from the ALI data window.

17. The method of claim 16, wherein the ALI data window and the enhanced data window are displayed within a graphical user interface simultaneously.

\* \* \* \* \*